United States Patent
McClusky et al.

(10) Patent No.: US 11,392,651 B1
(45) Date of Patent: Jul. 19, 2022

(54) SYSTEMS AND METHODS FOR AUTOMATICALLY IDENTIFYING UNMET TECHNICAL NEEDS AND/OR TECHNICAL PROBLEMS

(71) Applicant: Newry Corporation, Lakewood, OH (US)

(72) Inventors: Mark Daniel McClusky, Rocky River, OH (US); David Scott Wylie, Lakewood, OH (US); Matthew Donald McClusky, Westlake, OH (US); Emily Elizabeth McClusky, Westlake, OH (US); Jonathan Nathaniel Fegely, Lakewood, OH (US)

(73) Assignee: Artemis Intelligence LLC, Lakewood, OH (US)

( * ) Notice: Subject to any disclaimer, the term of this patent is extended or adjusted under 35 U.S.C. 154(b) by 1018 days.

(21) Appl. No.: 15/953,606

(22) Filed: Apr. 16, 2018

Related U.S. Application Data

(60) Provisional application No. 62/485,589, filed on Apr. 14, 2017.

(51) Int. Cl.
*G06F 16/00* (2019.01)
*G06F 16/93* (2019.01)
(Continued)

(52) U.S. Cl.
CPC ............ *G06F 16/93* (2019.01); *G06F 16/338* (2019.01); *G06F 16/345* (2019.01); *G06F 16/906* (2019.01)

(58) Field of Classification Search
CPC .............................. G06F 16/93; G06F 16/906
See application file for complete search history.

(56) References Cited

U.S. PATENT DOCUMENTS

| | | |
|---|---|---|
| 5,371,673 A | 12/1994 | Fan |
| 5,907,840 A | 5/1999 | Evans |

(Continued)

FOREIGN PATENT DOCUMENTS

| | | |
|---|---|---|
| WO | 200237447 A2 | 5/2002 |
| WO | 2011025162 A2 | 3/2011 |

OTHER PUBLICATIONS

Getting Inspired by Unusual Relevant Sources; TRIZ & Patent Inspiration: New Insights, Inspiration and Ideas; Gijs Bakker & Gertjan Otto, Jun. 22, 2016.

(Continued)

*Primary Examiner* — Ajith Jacob
(74) *Attorney, Agent, or Firm* — Calfee, Halter & Griswold LLP

(57) ABSTRACT

Systems and methods are provided for automatically identifying and displaying unmet technical needs and/or technical problems, such as identifying and displaying serious technical issues in specific areas of technology. In some exemplary embodiments, the text of technical documents is automatically analyzed to determine whether the text of any document identifies or potentially identifies a technical problem. In exemplary embodiments, portions of a documents called "problem kernels" and their associated features are automatically identified, automatically scored, and automatically ranked, and a subset of the problem kernels and/or features of problem kernels are displayed to a user on a computer display.

23 Claims, 28 Drawing Sheets

(51) Int. Cl.
    *G06F 16/338*     (2019.01)
    *G06F 16/34*     (2019.01)
    *G06F 16/906*     (2019.01)

(56) References Cited

U.S. PATENT DOCUMENTS

| | | | |
|---|---|---|---|
| 6,078,914 | A | 6/2000 | Redfern |
| 6,088,692 | A | 7/2000 | Driscoll |
| 6,473,730 | B1 | 10/2002 | McKeown et al. |
| 7,386,535 | B1* | 6/2008 | Kalucha ............... G06Q 10/06 |
| 7,505,964 | B2 | 3/2009 | Tong et al. |
| 7,599,922 | B1 | 10/2009 | Chen et al. |
| 7,739,104 | B2 | 6/2010 | Berkan et al. |
| 7,752,204 | B2 | 7/2010 | Kao et al. |
| 8,037,062 | B2 | 10/2011 | Baris et al. |
| 8,086,601 | B2 | 12/2011 | Kim et al. |
| 8,126,883 | B2 | 2/2012 | Qiu |
| 8,145,617 | B1 | 3/2012 | Verstak et al. |
| 8,438,142 | B2 | 5/2013 | Wu et al. |
| 8,442,972 | B2 | 5/2013 | Ismalon |
| 8,589,373 | B2 | 11/2013 | Mayer |
| 8,606,796 | B2 | 12/2013 | Martin et al. |
| 8,631,001 | B2 | 1/2014 | Lawrence et al. |
| 8,650,186 | B2 | 2/2014 | Beck et al. |
| 8,700,620 | B1 | 4/2014 | Lieberman |
| 8,825,515 | B1* | 9/2014 | Hanson ................ H04L 65/403 705/7.32 |
| 8,874,569 | B2 | 10/2014 | Miller et al. |
| 8,909,627 | B1 | 12/2014 | Popovici et al. |
| 8,965,882 | B1 | 2/2015 | Popovici et al. |
| 8,965,904 | B2 | 2/2015 | Dinh et al. |
| 8,977,953 | B1 | 3/2015 | Pierre et al. |
| 9,058,394 | B2 | 6/2015 | Franks et al. |
| 9,177,319 | B1* | 11/2015 | Chheda ............... G06Q 30/016 |
| 9,542,259 | B1 | 1/2017 | McEwen et al. |
| 10,331,681 | B1* | 6/2019 | Chen ..................... G06Q 30/00 |
| 2003/0115191 | A1* | 6/2003 | Copperman ....... G06F 16/9038 |
| 2003/0130837 | A1* | 7/2003 | Batchilo ............... G06F 40/253 704/9 |
| 2006/0053098 | A1* | 3/2006 | Gardner ............... G06F 16/367 |
| 2006/0265646 | A1 | 11/2006 | Girolami Rose |
| 2008/0098300 | A1 | 4/2008 | Corrales et al. |
| 2009/0150827 | A1* | 6/2009 | Meyer ................. G06F 16/9535 715/810 |
| 2009/0240685 | A1 | 9/2009 | Costello et al. |
| 2014/0201203 | A1 | 7/2014 | Krishna et al. |
| 2014/0358890 | A1 | 12/2014 | Chen et al. |
| 2015/0294017 | A1 | 10/2015 | Zhang et al. |
| 2015/0356270 | A1 | 12/2015 | Devarakonda |
| 2016/0239487 | A1 | 8/2016 | Potharaju |
| 2016/0301771 | A1 | 10/2016 | Choudhari |
| 2017/0004205 | A1 | 1/2017 | Jain |

OTHER PUBLICATIONS

Patent Inspiration, Jun. 15, 2018.
Resolute Innovation Feb. 2017, Connect Your Company With Emerging Technology; Feb. 25, 2017; Accessed via archive.org.
Resolute Innovation Dec. 2017, Predict Every Future Product and Threat Long Before Its Commercialization With Cutting-Edge Artificial Intelligence; Dec. 22, 2017; Accessed via archive.org.
Citrine IO Overview, TomKat Center for Sustainable Energy, Stanford University, Citrine Informatics, (date unknown).
Citrine IO Feb. 2017, AI-Powered Materials Informatics Accelerating the Global 1000, Citrine Selected Into the 2017 AI100 by CBInsights; Feb. 14, 2017; Accessed via archive.org.
Resolute Innovation Oct. 2017, Connect Your Company With Emerging Technology; Oct. 6, 2017; Accessed via archive.org.
Citrine IO Feb. 2018, Data Is the Future of Materials Discovery: AI-powered data platform for faster materials development; Feb. 3, 2018; Accessed via archive.org.
Shaping Tomorrows Breakthrough Materials: Citrine Informatics brings big data to materials discovery; Stanford Graduate School of Business, Ian Chipman, Jun. 22, 2015.
Patent Inspiration Components, Accessed Between Apr. 27 and May 3, 2018.
Patent Inspiration Problems, Accessed Between Apr. 27 and May 3, 2018.
Kasey's Blog, "Using Data Science to Drive Innovation," available at http://newrycorp.com/blog/data-science-to-drive-innovation, from Mar. 8, 2017.
Citrine lends support to US government's Materials Data Challenge, Citrine Informatics, Jul. 7, 2015.
Non-Final Office Action for U.S. Appl. No. 15/488,675; dated Dec. 20, 2018.
Flowerdew, L. (2008). Corpus-based analyses of the problem-solution pattern: A phraseological approach (vol. 29). Amsterdam: John Benjamins Publishing.
Scott, M. (2001). Mapping key words to problem and solution. In Patterns of text: In honour of Michael Hoey Benjamins, Amsterdam (pp. 109-127).
Charles, M. (2011). Adverbials of result: Phraseology and functions in the problem-solution pattern. Journal of English for Academic Purposes, 10(1), 47-60.
Medlock, B., & Briscoe, T. (2007). Weakly supervised learning for hedge classification in scientific literature. ACL, Citeseer, 2007, 992-999.
Mohamad ali, Afida. (2007). Semantic fields of problem in business English: Malaysian and British journalistic business texts. Corpora. 2. 211-239. 10.3366/cor.2007.2.2.211.
Heffernan-Teufel, Apr. 6, 2018; Identifying Problems and Solutions in Scientific Text.
Final Office Action for U.S. Appl. No. 15/488,675; dated Jul. 15, 2019.
Shneiderman—Dynamic Queries for Visual Information Seeking, Software, IEEE; 1994; vol. 11; Issue: 6; pp. 70-77; DOI: 10.1109/52.329404.
Lee, et al.—Document Ranking and the Vector-Space Model, Software, IEEE; 1997; vol. 14; Issue: 2; pp. 67-75; DOI: 10.1109/52.582976.
Kaszkiel et al.—Efficient Passage Ranking for Document Databases, Sep. 1999 ACM Transactions on Information Systems (TOIS); Oct. 1999; vol. 17; Issue: 4.
Wu et al.—Towards a Highly-Scalable and Effective Metasearch Engine; Proceedings of the 10th international conference on World Wide Web; Mar. 2001.
Gelbukh et al.—Combining Sources of EVIDENCE for Recognition of Relevant Passages in Texts; Advanced Distributed Systems; vol. 3563 of the series Lecture Notes in Computer Science; pp. 283-290 (2005).
Liu et al.—An Extractive Text Summarizer Based on Significant Words; Computer Processing of Oriental Languages. Language Technology for the Knowledge-based Economy; vol. 5459 of the series Lecture Notes in Computer Science; pp. 168-178 (2009) (abstract only).
Gupta et al.—Document Summarization Based on Sentence Ranking Using Vector Space Model; International Journal of Data Mining, Modelling and Management; vol. 5; Issue: 4; DOI: 10.1504/IJDMMM.2013.057680 (2013).
Jayabharathy et al.—Multi-Document Summarization Based on Sentence Features and Frequent Item Sets; Advances in Computer Science, Engineering & Applications; vol. 166 of the series Advances in Intelligent and Soft Computing; pp. 657-671 (2012) (abstract only).
Non-Final Office Action for U.S. Appl. No. 15/488,675; dated Feb. 3, 2020.
Notice of Allowance dated Mar. 2, 2022 for related U.S. Appl. No. 15/488,675, filed Apr. 17, 2017.

* cited by examiner

Table I - Tagged Technology Elements
for an exemplary document,
including positive (+), negative (-),
and neutral treatment (φ).

| Technology Element | Location(s) | Textual Treatment | Relative Position re ProbKernel | Nearest ProbKernel |
|---|---|---|---|---|
| #1 | Loc1 | TT1 (+) | RelPos1 | PK1 |
| #2 | Loc2 | TT2 (-) | RelPos2 | PK2 |
| #3 | Loc3 | TT3 (+) | RelPos3 | PK3 |
| #4 | Loc4 | TT4 (φ) | RelPos4 | PK4 |
| #5 | Loc5 | TT5 (φ) | RelPos5 | PK5 |
| | | | | |
| #6 | Loc6 | TT6 (+) | RelPos6 | PK6 |
| #7 | Loc7 | TT7 (+) | RelPos7 | PK7 |
| #8 | Loc8 | TT8 (φ) | RelPos8 | PK8 |
| #9 | Loc9 | TT9 (-) | RelPos9 | PK9 |
| #10 | Loc10 | TT10 (-) | RelPos10 | PK10 |

Fig. 10

Table II – Sample of Tagged Technology Elements
for FIG. C exemplary document,
E.g., Negative Technology Elements

| Technology Element | Location(s) | Textual Treatment | Relative Position re ProbKernel | Nearest ProbKernel |
|---|---|---|---|---|
| NE1 | Loc1 | TT1 (-) | RelPos1 | A10 |
| NE1 | Loc2 | TT2 (-) | 0 | A10 |
| NE1 | Loc3 | TT3 (-) | 0 | A11 |
| NE1 | Loc4 | TT4 (-) | 0 | A12 |
| NE1 | Loc5 | TT5 (-) | RelPos5 | A12 |
| NE2 | Loc6 | TT6 (-) | RelPos6 | A10 |
| NE2 | Loc7 | TT7 (-) | RelPos7 | A11 |
| NE2 | Loc8 | TT8 (-) | RelPos8 | A11 |
| NE2 | Loc9 | TT9 (-) | RelPos9 | A11 |
| NE2 | Loc10 | TT10 (-) | 0 | A12 |

Fig. 11

Fig. 12 Intentionally Omitted

BACKGROUND OF THE INVENTION

...

[0004] The stiffness of the SUSPENSION plays a role in HANDPIECE "feel" during cutting, audible noise, and bearing life. Currently, the SUSPENSION RINGS in known HANDPIECES are made of various grades of Viton or Kel-F rubbers, and these materials degrade after 300-800 sterilization cycles. It is believed that this degradation is a key determinant of HANDPIECE life (before BEARING replacement is required). Degradation can take various forms, including:
(1) compression set, such that the suspension no longer provides the design BEARING pre-load, which increases noise and leads to BEARING failure; (2) changes in stiffness, which alters the dynamic response and "feel" of the HANDPIECE during cutting; and, (3) catastrophic failure of the ELASTOMER, leading rapidly to BEARING failure. Such degradation is often exacerbated by repeated use and repeated exposure to conventional sterilization practices, which will often include exposure to high temperatures and pressures.

[0005] A need exists for elastomeric HANDPIECE COMPONENTS that will withstand repeated sterilizations with increased resistance to such degradation. It has been found that COMPONENTS such as SUSPENSION RINGS, SEALS and VALVES made of perfluoroelastomers, such as Chemraz available from Green-Tweed, show demonstrably less of each degradation phenomena after repeated sterilization and therefore, results in longer usable life of the HANDPIECE.

...

SUMMARY OF THE INVENTION

[0008] It is therefore, an object of the present invention to provide an improved dental HANDPIECE.

[0009] It is another object of the invention to provide an improved dental HANDPIECE which is improved in regard to its ability to withstand repeated sterilization cycles.

Fig. 19

Basic Search User Interface

Enter Search Terms:

[User-entered search terms, such as technical terms; optional query operators]

[Search]

Fig. 20

Basic Results Display

| Search Statistics | Problem Expression 1 (displayed with user-selected display parameters) | Search Terms |
|---|---|---|
| • Stat 1 | | • Term 1 |
| • Stat 2 | Problem Expression 2 (displayed with user-selected display parameters) | • Term 2 |
| • Stat 3 | | • Term 3 |
| • Stat 4 | Problem Expression 3 (displayed with user-selected display parameters) | • Term 4 |
| | ... | |
| | Problem Expression n (displayed with user-selected display parameters) | |

Fig. 21

Search Statistics

| Assignees in search | Industries in search | Countries in search | Other statistics of search |

- Stat 1
- Stat 2
- Stat 3
- Stat 4

Fig. 22

Advanced Search User Interface

Enter Technical Search Terms:

| User-entered technical search terms; optional query operators |
|---|

Additional Filter Criteria:

| Start Date ▼ | End Date ▼ | Companies ▼ | Countries ▼ |
|---|---|---|---|
| Problem ▼ | Products ▼ | Industries ▼ | Other ▼ |

Sort by:

| 1st | Valuation ▼ | Select Valuation Algorithm(s) ▼ |
|---|---|---|
| 2nd | Intensity ▼ | Select Intensity Algorithm(s) ▼ |
| 3rd | ▼ | Select Algorithm(s) ▼ |
| 4th | ▼ | Select Algorithm(s) ▼ |
| 5th | ▼ | Select Algorithm(s) ▼ |

[Search]

Fig. 23

| Industry | Large Displays | Medical | Consumer Electronics |
|---|---|---|---|
| Materials | | | |
| Glass | | | |
| Metals | | | |
| Aluminum | | | |
| Process | | | |
| Room Temperature Bonding | | | |
| High Temperature Bonding | | | |
| Systems | | | |
| Flexible OLED | | | |
| AMOLED | | | |
| QD Dislay | | | |
| Electroluminescent Display | | | |
| Characteristics | | | |
| Hermeticity | | | |
| Transparency | | | |
| Strength | | | |
| Dirt Tolerance | | | |
| Problems | | | |
| Degradation | | | |
| Warping | | | |
| Misalignment | | | |

Fig. 30

SYSTEMS AND METHODS FOR AUTOMATICALLY IDENTIFYING UNMET TECHNICAL NEEDS AND/OR TECHNICAL PROBLEMS

CROSS-REFERENCE TO RELATED APPLICATIONS

This application claims priority to, and the benefit of, U.S. Provisional Patent Application Ser. No. 62/485,589, entitled "SYSTEMS AND METHODS FOR AUTOMATICALLY IDENTIFYING UNMET TECHNICAL NEEDS AND/OR TECHNICAL PROBLEMS" and filed Apr. 14, 2017, the entire contents of which are incorporated herein by reference, to the extent that they are not directly conflicting with the present application.

BACKGROUND

The present disclosure generally relates to the field of computer databases and searching, analyzing, and interpreting documents obtained from computer databases. Exemplary systems and methods automatically identify, analyze, and interpret unmet technical needs and/or technical problems in specific areas of technology. Other exemplary systems and methods automatically identify, analyze, and interpret unmet technical needs and/or technical problems across numerous areas of technology.

Some businesses thrive by being able to identify unmet customer needs and meet those needs. A promising technology might languish because a quintessential application for that technology has never been identified and/or matched to the promising technology. Identifying an application for that promising technology potentially makes that technology very valuable. As another example, some previously successful technologies can find new application (and perhaps profitable application) if a previously unmet need is identified and matched to that technology. Applicants can bridge the gap between a "technology push" and a "market pull" by intentionally identifying unmet customer needs in a specific technical area and matching available technologies with the unmet needs.

The task of identifying unmet customer needs in a specific technical area can be daunting, especially given the pace of innovation and myriad of complex technical systems in the world. Such tasks can often seem like searching for a needle in a haystack of innumerable documents, web pages, market reports, rumors, potential customer conversations, etc. Furthermore, distinguishing which problems are most important and valuable for the marketplace to solve and that also have the highest addressability for an organization or technology can be extremely difficult and resource-intensive. Thus, the present application provides a technological solution that overcomes a problem specifically arising in the realm of computer databases and networks: the shear multitude of documents and volume of text available on the Internet, third-party document portals, internal company document databases, etc. makes conducting ordinary search and analysis of such problems frustrating at best and completely useless at worst.

Applicants have appreciated that there is a need for advanced computer intelligence in searching documents to identify unmet technical needs and/or technical problems and their associated opportunities for new solutions.

SUMMARY

Systems and methods are provided for automatically identifying, analyzing, and displaying unmet technical needs, technical requirements, and/or technical problems from a variety of document sources. In some exemplary embodiments, "problem kernels," consisting of portions of text that indicate or potentially indicate the presence of a technical problem are automatically identified. In some exemplary embodiments, identified problem kernels and related text are automatically parsed into various "Technology Elements", and "problem elements" are identified, which are specific combinations of such Technology Elements associated with problem kernels. In some exemplary embodiments, problem kernels, Technology Elements, and/or problem elements in a document are automatically linked to Technology Elements, problem kernels, or problem elements from other documents, analyzed and scored on a variety of factors, and automatically sorted, and a subset of the problem kernels, Technology Elements, or problem elements are printed or displayed to a user on a computer display.

One exemplary embodiment of the present disclosure relates to a computer implemented method of identifying documents disclosing a problem kernel, comprising: providing a database of documents; using a deficiency recognizer, automatically identifying documents having problem kernels; accepting user search input, e.g., in the form of query search terms; identifying problem kernels associated with the user input, e.g., query search terms; and storing on a data storage device data corresponding to at least some of the identified documents or problem kernels associated with the user search input (or displaying them on a computer display or printing them as part of a report).

Another exemplary embodiment of the present disclosure relates to a computer implemented method of generating an image on an electronic display, comprising: providing technology element recognizers; providing a plurality of documents from a database of documents or one or more data streams; accepting user search input in the form of query search terms; identifying Technology Elements in the user search input; using a deficiency recognizer, automatically identifying documents in the plurality of documents having problem kernels; identifying problem kernels associated with the identified Technology Elements; and displaying on a computer display a display of, or printing a report showing, at least some of the identified documents or problem kernels responsive to the user search input (or storing them on a data storage device).

Still another exemplary embodiment of the present disclosure relates to a computer implemented method of generating an image on an electronic display, comprising: providing a database of documents; analyzing at least a subset of the database of documents to recognize key Technology Elements (e.g., systems, processes, characteristics, and materials) and storing analyzed documents with their corresponding key Technology Elements in the database; associating related Technology Elements within and across documents and organizing such associations into a set of ontologies; providing a database of technology element associations that link each Technology Element in the ontologies to their documents and link them to each other based on metrics of their co-occurrence in the documents; providing a deficiency recognizer that can identify key phrases, sentences, and/or paragraphs in the documents that reference a problem kernel (e.g., an technical deficiency or unmet technical need) and store them in a database of problems; accept user search input to identify specific problem kernels by querying any one or any two or more of: the raw text of documents in the database of documents and/or the database of problems and/or the database of technology associations for the document or problem databases by entering keywords and/or selecting Technology Elements in the various ontologies to find other highly-related Technology Elements, either within same ontology or other ontologies (e.g., Technology Elements most related to searched attributes, systems most related to searched characteristics and materials, systems most related to other systems and materials, etc.); and displaying on a computer display or printing a report showing the identified problem kernels responsive to the user search input (or storing them on a data storage device).

Yet still another exemplary embodiment of the present disclosure relates to a computer implemented method of identifying problem kernels within documents, comprising: providing a database including a plurality of previously identified problem kernels; accept user search input in the form of query search terms; identifying problem kernels associated with the user search input; and storing on a data storage device data corresponding to at least some of the identified problem kernels associated with the user search input (or displaying them on a computer display or printing them as part of a report).

Still yet another exemplary embodiment of the present disclosure relates to a computer implemented method of generating an image on an electronic display, comprising: providing technology element recognizers; providing a plurality of previously identified problem kernel text sections; accept user search input in the form of query search terms; identifying Technology Elements in the user search input; identifying problem kernels associated with the user search input; and displaying on a computer display a display of, or printing a report showing, at least some of the identified problem kernels responsive to the user search input (or storing them on a data storage device).

Yet still another exemplary embodiment of the present disclosure relates to a computer implemented method of generating an image on an electronic display, comprising: providing a database of Technology Elements that have been identified as being associated with negative tone that might indicate a technical deficiency; accept user search input in the form of query search terms; identify Technology Elements in the user search input; using at least the database of Technology Elements and the identified Technology Elements, identifying problem kernels associated with the user search input; and displaying on a computer display a display of, or printing a report showing, at least some of the identified documents or problem kernels responsive to the user search input (or storing them on a data storage device).

Still another exemplary embodiment of the present disclosure relates to a computer implemented method of analyzing documents and identifying at least one problem kernel, comprising: accessing a database of documents; identifying problem kernels using deficiency recognizer logic configured to identify subsets of documents that contain a problem kernel; and at least one of (a) displaying data corresponding to at least some of the identified subsets of documents that contain a problem kernel, (b) storing on a data storage device data corresponding to at least some of the identified subsets of documents that contain a problem kernel, and (c) transmitting to a computer data corresponding to at least some of the identified subsets of documents that contain a problem kernel.

Yet still another exemplary embodiment of the present disclosure relates to a computer implemented method of analyzing documents and identifying at least one problem element, comprising: accessing a database of documents; identifying problem kernels using deficiency recognizer logic configured to identify subsets of documents that contain a problem kernel; identifying problem elements for a plurality of the identified problem kernels; and at least one of (a) displaying data corresponding to at least some of the identified problem elements, (b) storing on a data storage device data corresponding to at least some of the identified problem elements, and (c) transmitting to a computer data corresponding to at least some of the identified problem elements.

Still another exemplary embodiment of the present disclosure relates to a computer implemented method of analyzing documents and identifying at least one problem kernel, comprising: accessing a database of documents; identifying problem kernels using deficiency recognizer logic configured to identify subsets of documents that contain a problem kernel; identifying Technology Elements within the identified problem kernels; linking the identified Technology Elements that are substantially identical; at least one of (a) displaying data corresponding to at least some of the identified problem kernels and linked Technology Elements, (b) storing on a data storage device data corresponding to at least some of the identified problem kernels and linked Technology Elements, and (c) transmitting to a computer data corresponding to at least some of the identified problem kernels and linked Technology Elements.

Yet still another exemplary embodiment of the present disclosure relates to a system for analyzing documents and identifying documents disclosing at least one Technology Element, comprising: at least one processor in communication with a memory, the processor configured to: access a database of documents; use deficiency recognizer logic configured to identify subsets of documents that contain at least one Technology Element; accept and apply a first user search input, including in the form of query search terms; identify at least one Technology Element associated with the user search input; store on a data storage device data corresponding to at least one of the identified Technology Elements associated with the user search input; score the at least one identified Technology Element according to the likelihood of identifying unmet technical needs, technical requirements, or technical problems; rank the at least one identified Technology Element according to the score; and display the at least one identified Technology Element, an associated score, and an associated ranking, on at least one computer display.

Still another exemplary embodiment of the present disclosure relates to a computer implemented method of analyzing documents comprising: accessing a database of documents, the documents having pre-identified problem kernels associated therewith; accepting user search input; applying the user search input to the pre-identified problem kernels; identifying subsets of the documents that contain problem kernels associated with the user search input; and at least one of (a) displaying data corresponding to at least some of the identified subsets of documents that contain a problem kernel associated with the user search input, (b) storing on a data storage device data corresponding to at least some of the identified subsets of documents that contain a problem kernel associated with the user search input, and (c) transmitting to a computer data corresponding to at least some of the identified subsets of documents that contain a problem kernel associated with the user search input. In an exemplary embodiment, virtually all of the US patents and US patent applications published from 2010 to the present have been analyzed and stored in a database along with at least one pre-identified problem kernel for each of them in a separate field. This database, including the pre-identified problem kernels, are searchable. In another exemplary embodiment, numerous global patents and global patent applications published from 2010 to the present (including US, EP, JP (machine translated), CN (machine translated), Australia, and the UK) have been analyzed and stored in a database along with at least one pre-identified problem kernel for each of them in a separate field. This database, including the pre-identified problem kernels, are searchable.

BRIEF DESCRIPTION OF DRAWINGS

FIGS. 10-11 are tables showing exemplary data structures.

FIG. 12 has been intentionally omitted.

FIG. 19 shows another exemplary display.

FIGS. 20-23 show exemplary user interfaces.

FIG. 30 is an exemplary view of user output according to exemplary embodiments.

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

Figure 1:
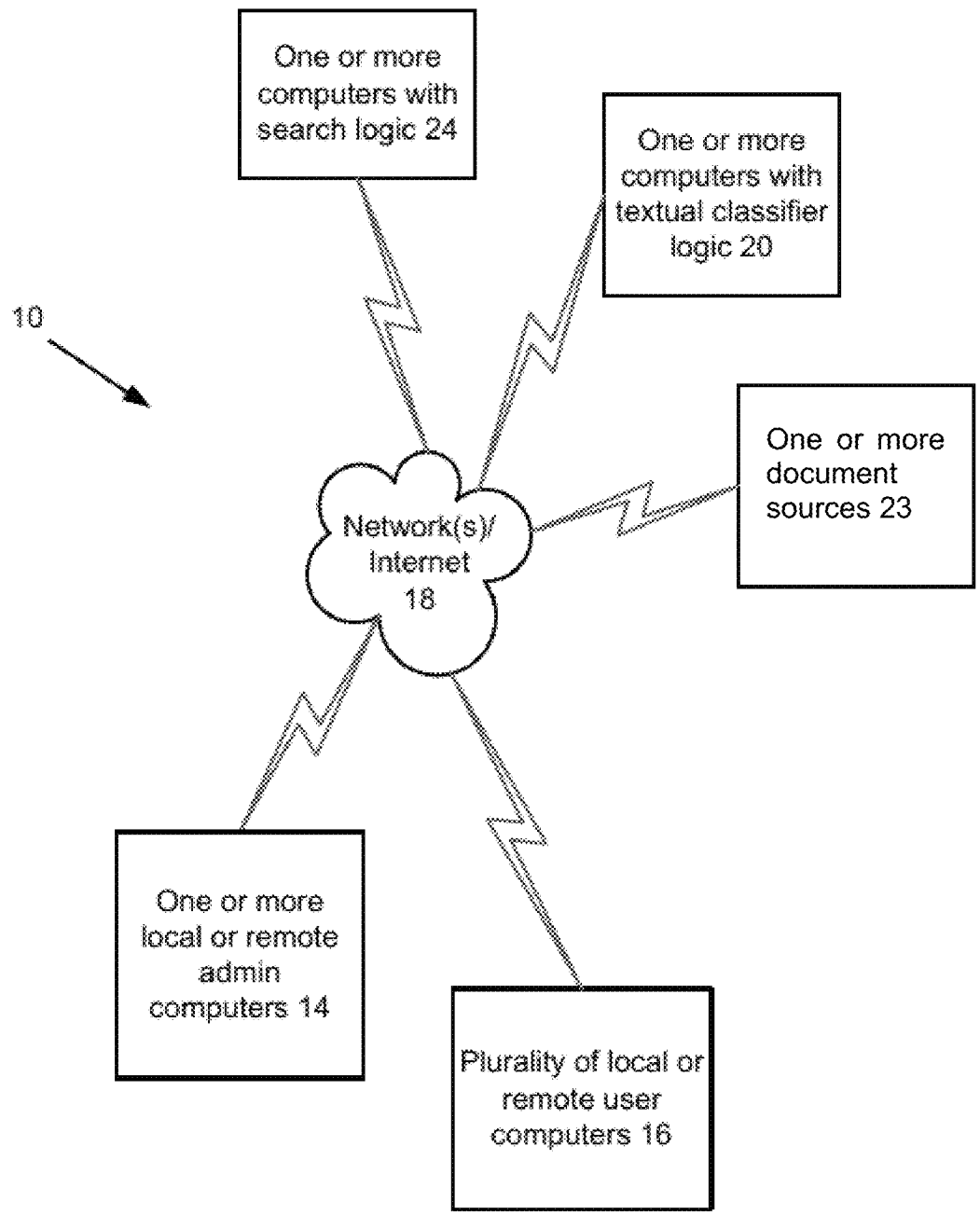
FIG. 1 is a schematic block diagram of an exemplary system.
Figure 2:
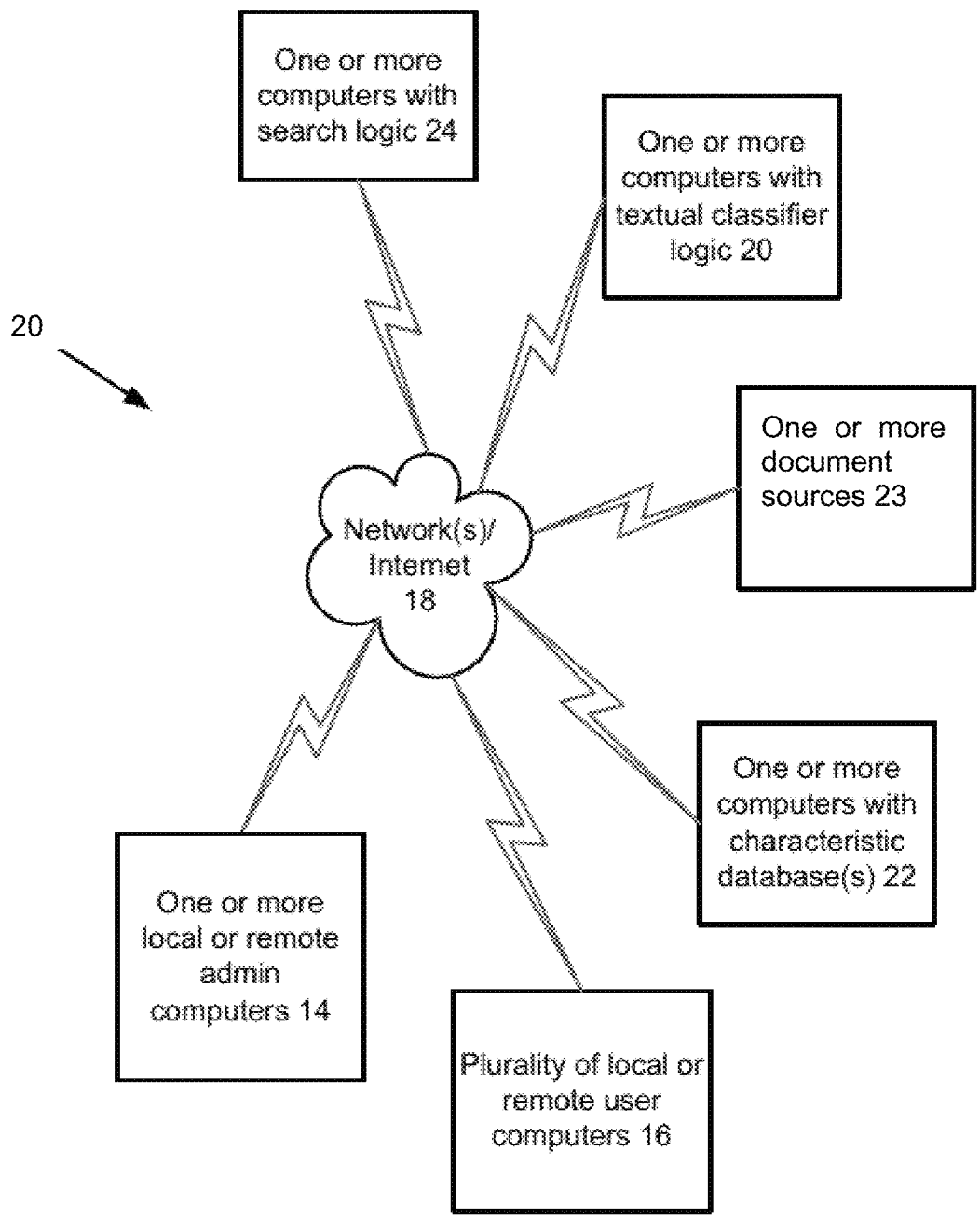
FIG. 2 is another schematic block diagram of the exemplary system of FIG. 1.

Referring now to FIG. 1 and FIG. 2, block diagrams of an exemplary system 10 are shown. Exemplary system 10 provides users with an interface for identifying unmet technical needs and/or technical problems. System 10 includes one or more local or remote admin computers 14 in communication with a plurality of local or remote user computers 16, via one or more wired or wireless communication networks 18, e.g., the Internet. The user computers 16 are also in communication with one or more computers with deficiency recognizer logic 20, and one or more computers with search logic 24, and perhaps one or more document sources 23. The term "document" as used herein is intended to broadly include any piece of written, printed, or electronic matter that provides information or evidence or that serves as an official record and includes writings, drawings, graphs, charts, photographs, sound recordings, images, and other data or data compilations stored in any medium from which information can be obtained. Exemplary documents include patents, patent applications, technical papers or journal articles, news articles, web pages, Facebook posts, Instagram posts, Twitter tweets, company annual reports or financial disclosure forms, product reviews, press releases, market reports, PowerPoint presentations, conference proceedings or presentations, earnings calls, product specification sheets, product announcements, blog posts, whitepapers, etc. The search logic 24 analyzes documents to identify unmet technical needs and/or technical problems, as discussed herein. For example, in exemplary embodiments, a plurality of technical documents are analyzed and each is scored based on technical elements within or proximate text having a desired textual tone (interpreted as negative or positive or either tone), in that document or each subset of the document (the terms subset of a document and portion of a document as used herein mean a contiguous portion of less than the whole document, such as the paragraph, a sentence, a clause, or a phrase) or a number of sequential subsets of the document (and perhaps their proximity). In some exemplary embodiments, documents or document subsets or associated features of those documents or document subsets with the highest score are then displayed on a user computer 16. "Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), tensor processing unit (TPU), reduced instruction set computing (RISC) processors, digital signal processors (DSPs), field programmable gate arrays (FPGAs), etc. Computers and processors may be located locally or remotely, e.g., in the cloud.

The computers 14, 16, 20, 24 have logic for performing the various functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

In some exemplary embodiments, the computers 14, 20, 24 are all implemented on a single computer (and accessed by separate remote user computers 16). In some embodiments, the computers 14, 16, 20, 24 are all implemented on a single computer. Any one or any two or more of the computers 14, 16, 20, 24 can be implemented on the same computer. All of the computers 14, 16, 20, 24 can be implemented on one or more separate computers. Virtually any of the computers, except perhaps computers 14, 16, can be implemented in the cloud.

In some embodiments, the software used by the computers 14, 16, 20, 24 to perform the various functions and processes herein is stored on one or more data storage devices local to those computers. As used herein, "data storage device" (synonymous with "memory") means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc. In some embodiments, computers 14, 16, 20, 24 (and the other computers herein) communicate with each other via network 18 utilizing, for example, a web browser or other client software stored in memory accessible by the computers 14, 16, 20, 24. For example, in some exemplary embodiments, admin computers 14 include client software specifically utilized for communication with computers 20, 24. Likewise, in some exemplary embodiments, user computers 16 have access to software that is utilized to communicate with computers 20, 24 via network 18.

FIG. 2 adds a computer with one or more materials databases 160, a computer with one or more technical system/component databases 162, a computer with one or more process databases 164, a computer with one or more characteristic databases 22, described herein. It is appreciated that in some embodiments, the computers 14, 16, 20, 24 are all implemented on a single computer. Any one or any two or more of the computers 14, 16, 20, 24 can be implemented on the same computer. All of the computers 14, 16, 20, 24 can be implemented on one or more separate computers.

Identifying Unmet Technical Needs and/or Technical Problems

Identifying Problem Kernels

In some exemplary embodiments, the various systems and methods identify technical needs and/or technical problems using textual analysis of documents. In some exemplary embodiments, the systems and/or methods identify "problem kernels" in such documents, or specific portions of text in documents that described or likely describe a technical problem or unmet technical need. The term "problem kernel" refers to at least one subset of a document that describes a technical deficiency, technical requirement, or unmet technical need. The term "subset of a document" refers to a clause, phrase, sentence, paragraph, or group of two or more consecutive clauses, phrases, sentences, or paragraphs. Herein the term "n-gram" refers to the set of all sequential characters or words found in text for a given value of n. For example, within "word" there are two 3-character grams: 'wor' and 'ord'. The term "automatically" as used herein is intended to broadly include any programming, algorithm, logic, or processor that performs one or more steps in a process on a plurality of documents with little or no direct human control.

In some exemplary embodiments, documents are analyzed using a type of textual classifier referred to herein as a Deficiency Recognizer to identify sections (e.g., clauses, phrases, sentences, groups of sentences, paragraphs, groups of paragraphs, etc.) of the document that include words that might indicate a technical deficiency (an example of "problem kernels"). In some exemplary embodiments, deficiency recognizer logic 20 uses algorithms to analyze both the words and the structure of the section of the document to identify possible problem kernels. In some exemplary embodiments, systems or methods automatically identify problem kernels leveraging various computer models and algorithms. For example, in some exemplary embodiments, labeled training data consisting of portions of text that indicate or describe a technical problem (e.g., words, word n-grams, phrases, sentences, paragraphs, etc.) and other portions of text that do not is provided to a variety of computer algorithms, potentially including but not limited to machine learning classifiers, such as probabilistic classifiers, e.g., Maximum Entropy Classifier, Naive Bayes Classifier, or Neural Networks, e.g., Probabilistic Neural Networks (PNN), Recurrent Neural Networks, or Convolutional Neural Networks (CNN) to create various predictive models. Alternatively, in the absence of labeled text, natural language processing algorithms such as TF-IDF, singular value decomposition, Word2Vec or other natural language transformations, can be used to rate the probability that a portion of text describes a technical problem based on similarity or co-occurrence of previously identified "problem words" or "problem sentences" with the portion of the text. For example, the cosine similarity between previously trained word, word n-gram, sentence, or paragraph vectors using, for example, Word2Vec, Glove, FastText, Sentence2Vec, or Paragraph2Vec processes to generate the vectors for "problem words" or "problem sentences" or "problem paragraphs," and vectors for unclassified portions of text can be calculated to score the probability that a portion of the text references a problem. In exemplary embodiments, the output of at least one of these natural language processing algorithms is used to create initial training data. Word or character n-gram vectors can also be created, if they were not created with the training data, and used to encode input for the classifier, as described above, to create a model. In some embodiments, a single Neural Network classifier, e.g., a CNN, is used to both encode the word or character n-gram vectors and perform the classification. In exemplary embodiments, such models are used to predict which other, unlabeled portions of text also have a high probability of indicating and describing a technical problem and which do not. In some exemplary embodiments, such predictions are then evaluated and accepted or refined based on various methods, including but not limited to meeting quantitative thresholds based on the estimated probability of the text indicating a technical problem from a single model, the correlation of such probabilities across multiple diverse models, human evaluation, using active learning to generate a set of portions of text the classifier is least certain about for further human evaluation (e.g., uncertainty sampling), etc. Text with predictions of their likely presence or non-presence of technical problems that meet various threshold criteria is then labeled as such and stored in a database. Surprisingly, we found that a neural network classifier was able to work significantly better than traditional approaches, e.g., keyword searches, for finding problem kernels by better dealing with the variety of ways unmet technical needs or requirements are expressed. In some exemplary embodiments, documents are analyzed using a sentiment analyzer to identify sections (e.g., words, word n-grams, clauses, phrases, sentences, groups of sentences, paragraphs, groups of paragraphs, etc.) of the document having negative tone or positive tone. The term "positive tone" refers herein to a score from a sentiment analyzer on a subset of a document that indicates that the subset of text refers to a solution, improvement, or positive outcome. Sentiment analysis can be performed on portions of the text using a variety of approaches including a traditional linear classifier or neural network and leveraging either keyword based searches or human annotated data as training data, similar to methods described above or averaging the score of words in a portion of the text based on a preset list of words and their scores. In exemplary embodiments, portions of the text that are scored as negative are then classified as problem kernels.

In certain exemplary embodiments, individual sentences are identified as a problem kernel, but displayed as full paragraphs (or summarized paragraphs) to the user to help provide more context about the potential problem. In exemplary embodiments, to quickly generate large scale training data across a variety of technical domains, a keyword-based search is used to automatically label sentences that contained at least one problem word from a manually generated list ("issue", "problem", "need", etc.) and one "problem strength" word from a manually generated list ("failure", "degrade", "catastrophic", etc.). In some exemplary embodiments, a "not problem" training set is used, wherein the "not problem" training set is compiled using sentences with starting prefixes that indicated they were not a problem. For example, document titles can be used to generate a "not problem" set. In exemplary embodiments, this initial training set is then used to create an initial Deficiency Recognizer that outputs scores between 0 and 1 for whether or not a sentence is a problem (1 is definitely a problem, 0 is definitely not). A variety of tools can be used to train the Deficiency Recognizer including convolutional neural networks (using character n-grams or word n-grams to encode the input), Sentence2Vec, fastText, etc. In exemplary embodiments, a subset of sentences receiving "borderline scores" from the initial Deficiency Recognizer (e.g., scores between 0.75 and 0.9) is manually evaluated and annotated as problems or not problems. In exemplary embodiments, the additional sentences identified as problem kernels are added to the training data, and a final version of the Deficiency Recognizer is trained on the full set of problem kernel sentences. In some exemplary embodiments, all input for the Deficiency Recognizer is generated with manual (human) annotation. In some exemplary embodiments, sentences with scores 0.9 and above from the Deficiency Recognizer are labeled as problem kernels (other thresholds can be used). Results may then be compared to a test set of sentences that has been manually annotated, but not used to train the Deficiency Recognizer. In some embodiments, sentences are broken into clauses using standard natural language processing techniques to uncover the syntax of a sentence or simple rules (e.g., clause 1 contains all text before the word 'and' and clause 2 is all text after 'and'). In such exemplary embodiments, the Deficiency Recognizer is trained with training examples comprised of problem kernel clauses, rather than full problem kernel sentences.

In exemplary embodiments, the documents or problem kernels can be grouped by related concepts or entities, e.g., companies or industries. Some of these related concepts are already linked to the document and commonly contained in metadata of the document. For example, in exemplary embodiments, the company, organization, or individual who authored or published a document is stored alongside the text of the document as metadata and can be used to associate a company entity with the document. The concepts or entities in the metadata can allow for further concepts to be associated with the document. For example, the geographic location of the entity can then also be associated with the document and added to the metadata. Further concepts can be associated with the document using a classifier. For example, an industry classifier can be used to associate an industry with the document. The industry classifier logic could make the determination based on a range of inputs including the text of the document, existing classifications of the document, e.g., CPC for patents, or the industries most commonly associated with the entities who authored or published the patent. Applicants have found that the title and abstract (where an abstract is available) are generally sufficient to classify the industry of a document with about 80% accuracy. Applicants have also found that a number of documents do not have a clear industry association even when the text is manually reviewed and believe that adding additional features, e.g., CPCs or company industry information, is integral to improving the accuracy of the classifier. In some exemplary embodiments, while generating training data for the industry classifier, the Deficiency Recognizer was also trained to also classify subsets of the document into additional classes, e.g., industry-related text, at the same time we trained it to recognize problem kernels. Identifying industry-related text helped generate a large initial training set for an industry classifier, preferably with manual (human) annotation of the resulting documents, although key-word based labeling of the training set may also work. In an exemplary embodiment, the industry classifier logic assigns industry labels based on the existence or frequency of Technology Elements in a document (described below). In some exemplary embodiments, document-level classifications are added to other databases. For example, for non-patent documents, transfer learning can be used to associate CPCs with documents by training a multi-label neural network classifier (using patent documents which have known CPC labels) to accept the abstracts of documents as input and to output predicted CPC labels. A similar process can be used to associate geography with a document by using the country in which it was published or the country its authors are from. The term "geography associated with" as used herein refers to the country, region, continent, or other geographical grouping that best describes where the document was original published and/or authored.

In exemplary embodiments, the predictive models are document type specific, i.e., they take into account specific language expected to be found in that type of document. For example, US patents often include language such as "object of the present invention is to provide an improved" or simply "object of the present invention" or "object of the present application" which may signal the presence of Technology Elements, e.g., products, materials, or of related concepts, e.g., industry. Similarly, patents, patent applications, journal articles, or other technical documents sometimes include headings such as "problem to be solved" that signify that a portion of text is a problem kernel. In exemplary embodiments, these "signifiers" are used to quickly create the initial training set for that document type. In exemplary embodiments, a document specific prediction model is created for different document types to improve the accuracy on that type of document. In other embodiments, a universal model, e.g., Deficiency Recognizer, is trained with input from multiple different types of documents and is used to recognize problem kernels across all documents. It is believed that ideally, at least a few thousand documents from each type of document that will analyzed are used to train such a universal Deficiency Recognizer for that type of document. In further exemplary embodiments, the problem kernels recognized by the Deficiency Recognizer can be further scored using a variety of metrics or analyses. For example, a sentiment analyzer can be used to score the "magnitude" of each problem kernel. Surprisingly, in an exemplary embodiment with a relatively modest set of labeled training data (tens of thousands of examples) a simple neural network was trained to accurately score the magnitude of problems from 0 to 4 with 4 being the most serious problems and 0 being the most minor problems (where human annotation was used to create the training and evaluation sets). In another exemplary embodiment directed toward simple technical documents, results from a sentiment analyzer that uses a simple word-score list and sums the individual word scores into a sentence score were also adequate, likely due to the straightforward, descriptive nature of technical documents text.

In exemplary embodiments, search logic 24 accepts user input in the form of query search terms and uses at least those query search terms and output from textual classifier logic, e.g., deficiency recognizer logic, to score each document/subset as a candidate for identifying unmet technical needs and/or technical problems (i.e., scoring to indicate the presence of a problem kernel in that document/subset).

In exemplary embodiments, search logic 24 performs a textual analysis of documents to score documents, or subsets of documents as part of scoring each document, as candidates for identifying unmet technical needs, technical requirements, and/or technical problems relevant to the query search terms. In some exemplary embodiments, search logic 24 includes (a) automatically identifying at least one subset of each document (called a "problem kernel" herein) that expresses a technical problem or an unmet technical need and (b) scoring each problem kernel based on at least relevance to user-entered query search terms. In some exemplary embodiments, a score associated with the negative tone in that problem kernel (obtained with a sentiment analyzer as described above) and/or in other parts of the document (and/or based on data external to the document) can be combined with the relevance score to create a final score for the document that ranks documents describing very negative problems more highly than documents describing minor problems. The term "negative tone" refers herein to a score from a sentiment analyzer on a subset of a document that indicates that the subset refers to a problem, deficiency, or negative outcome. Based on the score, negative tone can be further grouped into categories, e.g., minor problem, substantial problem, catastrophic problem. For example, the terms "catastrophic failure" and "substantial morbidity and mortality" both have a negative tone and would be classified as catastrophic problems while "relatively bulky" and "is uncomfortable" both have a negative tone and would be classified as a minor problem. In some exemplary embodiments, the magnitude of consequences and and/or magnitude of the deficiency are scored. A variety of techniques can be used for this including using manually scoring keywords and summing the results or having humans annotate examples of minor and major deficiencies, as discussed above. In some exemplary embodiments, problems are classified into different types, e.g., cost, manufacturing yield, safety, comfort, each of which have a specified severity score. Each problem kernel can contain one or more problem types. For kernels that contain more than one problem type, the scores for each individual problem type are averaged, the maximum problem type score within the problem kernel can be used as the score for the problem kernel, or certain problem combinations may have a specified score that can be used. The problem type classifier can be trained using a multi-label classifier, e.g., ensemble convolutional neural network, trained on positive and negative examples for each problem type from problem kernels. In some exemplary embodiments, the training data is created by performing a keyword search for each type of problem within a database of stored problem kernels as well as a keyword search for problems within the database of stored problem words that do not contain any of the keyword search string for the problem type. In other exemplary embodiments, human annotators manually review the problem kernels in the database that do not match the keyword searches for any of the problem types to both provide additional training data and determine if any additional problem types should be added to the problem type classifier. In some exemplary embodiments, one or two or more of the sentiment analysis score, magnitude of the consequence score, and problem type score are combined into a final score by methods including or not limited to: summing the scores, averaging the scores, weighting each score before summing, or weighting each score before averaging.

In some exemplary embodiments, problem kernels consist of a single paragraph from each document. In other exemplary embodiments, other subset sizes are used as problem kernels, e.g., clauses, phrases, sentences, groups of sentences, groups of paragraphs, n-grams, etc. An exemplary problem kernel consisting of several paragraphs is shown in paragraph of US patent application publication US2007/0238067A1, which is shown in annotated form in FIG. 19. This will be referred to as "Problem kernel 1" herein. A plurality of problem kernels are found in and around Problem kernel 1, e.g.: paragraph [0004] alone, paragraph alone, paragraphs [0004]-[0005] together, paragraph [0009], "bearing failure," "Viton . . . materials degrade," "Kel-F rubbers, and these materials degrade," "bearing replacement," "catastrophic failure of the elastomer," "need exists for elastomeric handpiece components," etc.

An exemplary problem kernel less than a full paragraph consisting of several sentences is found in a subset of paragraph [0042] of US patent application publication US2011/0293404A1:

> This potential pressure differential is problematic since it may induce leakage of lubricant out of the turbine into the surrounding water or, alternatively, seepage of water into the sealed-off chambers of the turbine. In the former case, leakage of lubricating oil into the water is potentially bad for the environment, although for this particular turbine, care has been taken to utilize an oil that is biodegradable and environmentally-friendly. Another problem with leakage of oil is that, overtime, the turbine will lose lubricant quantity and pressure, thus eventually degrading performance. Seepage of water into the sealed-off chambers of the turbine is also highly problematic as this dilutes the lubricant, changing its composition and efficacy. Therefore, it is highly desirable to minimize, if not outright eliminate, any pressure differentials between the inside chambers of the turbine and the ambient water.

This will be referred to as "Problem kernel 2" herein. As with Problem kernel 1, Problem kernel 2 has several problem kernels less than a full sentence therein, e.g., "Seepage of water into the sealed-off chambers of the turbine is also highly problematic," "potential pressure differential is problematic," "leakage of lubricating oil into the water is potentially bad for the environment," etc. Other examples of problem kernels include: U.S. Pat. No. 8,534,893 col. 1, lines 22-39; paragraph [0014] of U.S. Pat. Pub. No. US2011/0169934 A1; and paragraph [0003] of U.S. Pat. Pub. No. US2006/0114683 (all of which sections are incorporated by reference in their entireties). Subject matter as described above is illustrative of the problem kernels automatically identified by the various systems and methods of the present disclosure.

Figure 3:
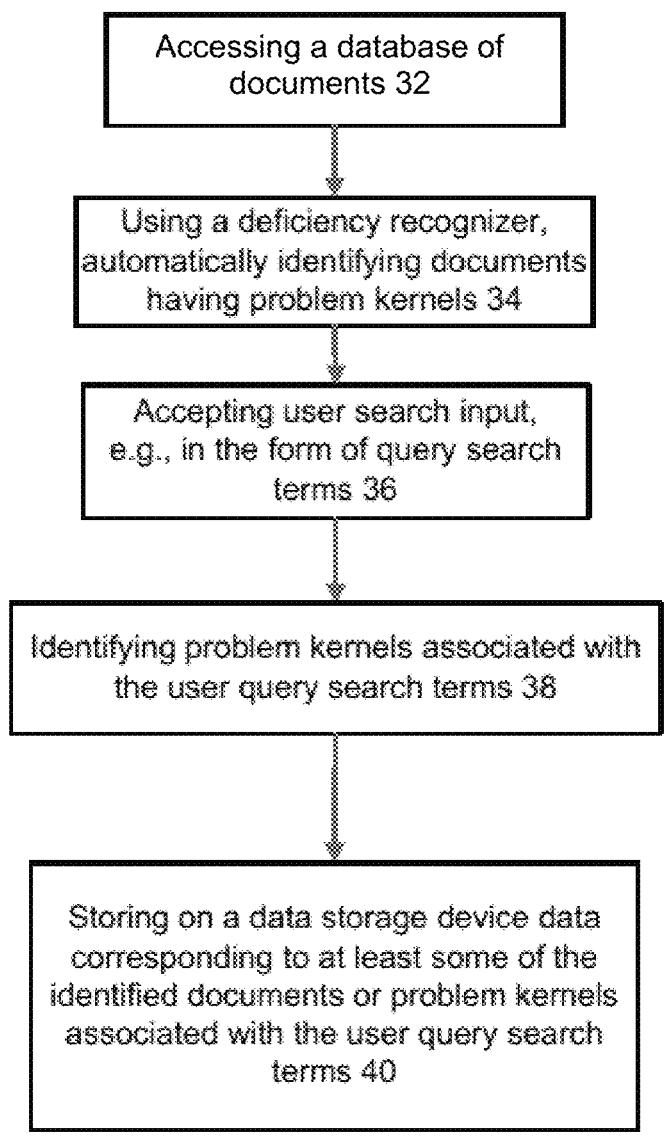
FIG. 3 is a schematic flow diagram of an exemplary method.

Referring now to FIG. 3, a flowchart of an exemplary method 30 is shown. An exemplary computer implemented method of identifying documents disclosing a problem kernel comprises accessing a database of documents, at 32. The document database 32 can be a third-party document database, such as the U.S. Patent Office patent database or IFI Claims, Elsevier, EBSCO, PubMed, DOE.gov, SBIR/STTR, SEC.gov, NIH/NSF, etc., or a database local to one or more of the computers 14, 16, 20, 24, such as the contents of any of the foregoing, e.g., the U.S. Patent Office patent database, stored locally or some other document database stored locally. It will be further appreciated that the document database 32 may be accessible over a network or a stream of documents or data from one or two or more sources or another database accessible over a network.

The exemplary method 30 also includes using a deficiency recognizer to automatically identify problem kernels within documents/subsets, at 34. Specific examples of this are described elsewhere herein. The exemplary method 30 also includes, at 36, accepting user search input, e.g., in the form of query search terms (or selection from a predefined plurality of categories of problems, e.g., high temperature effects), input via one of the computers 16. The term "user search input" as used herein refers to a search query input by a user, e.g., "elastomer" or "elastomer within 3 words of failure." At 38, the method continues with identifying problem kernels associated with the user query search terms (or other user input), e.g., on one of the computers with search logic 24. Steps 34 and 36 need not be done proximate in time. In some exemplary embodiments, a plurality of documents have been analyzed and stored in a database along with at least one pre-identified problem kernel for each of the documents, with the pre-identified problem kernels stored in a separate field for each document. This database, including the pre-identified problem kernels, are searchable. In an exemplary embodiment, virtually all of the US patents and US patent applications published from 2010 to the present have been analyzed and stored in a database along with at least one pre-identified problem kernel for each of them in a separate field. This database, including the pre-identified problem kernels, are searchable. In another exemplary embodiment, numerous global patents and global patent applications published from 2010 to the present (including US, EP, JP (machine translated), CN (machine translated), Australia, and the UK) have been analyzed and stored in a database along with at least one pre-identified problem kernel for each of them in a separate field. This database, including the pre-identified problem kernels, are searchable. Thus, an exemplary method includes steps 32-34 to create a database with pre-identified problem kernels and another exemplary method includes searching the database at steps 36-40.

In some exemplary embodiments, the documents are analyzed with one or more Technology Element recognizers to identify Technology Elements within the documents. Such Technology Elements can be expressed as a sequence of one or more characters or one or more words. The term "Technology Element recognizers" refers herein to one or more named entity recognizer that can recognize segments of the text that refer to Technology Elements and a classifier or multiple classifiers that can classify those segments of text into different types of Technology Elements. The term "Technology Elements" refers to subsets of a document (most commonly a set of characters, word, set of words, clause, or individual sentence) that names and/or describes the systems, materials, technical processes, associated attributes, and scalars for a given technology. In other exemplary embodiments, the text of sections interpreted as having positive tone and/or negative tone in the documents are analyzed with Technology Element recognizers to identify Technology Elements in those sections (or proximate to those sections). In exemplary embodiments, the same Technology Element recognizer can also be used to recognize Technology Elements in the user search query. In exemplary embodiments, query rewriting is then used to improve results and/or reduce the amount of time it takes to query the database. Some exemplary embodiments of the Technology Element recognizer perform best on unprocessed natural language text that has been converted into vector word embeddings. In such embodiments, when a user inputs a search query, the search query is translated into the appropriate vector embeddings that are then run through the Technology Element recognizer. Any words not identified as Technology Elements are converted back into text, then preprocessing steps, e.g., stemming, are run on the remaining text (in some exemplary embodiments, stemming or other natural language processing techniques are applied to the text to improve search results). The query is operable to be run either by: (1) converting the Technology Elements into their term vectors, e.g., the simplest form that best matches how they appear in the database and adding these Technology Element term vectors to the preprocessed remaining text and then using the resulting text to query the database; or, (2) the Technology Elements are used as a separate keyed field within documents and are queried separately from the remaining user query text. It is appreciated that creating a separate keyed field for Technology Elements can deliver speed and accuracy increases. It is further appreciated that processing search text can differ based on user needs.

In some exemplary embodiments, Search Logic accepts user input containing query search terms and desired textual tone (negative or positive or either tone), identifies Technology Elements corresponding to the query search terms, and identifies (a) documents/sections having those Technology Elements within (or proximate) the sections having the desired tone, and/or (b) documents/sections having user search input within (or proximate) the sections having the desired tone, and/or (c) documents/sections having both user search input and those Technology Elements within (or proximate) the sections having the desired tone. The identified documents or problem kernels or Technology Elements are then output and displayed on a computer screen using any of the various display methods shown herein (or saved to a data storage device, printed, etc.).

In some exemplary embodiments, documents are analyzed using a type of textual classifier referred to herein as a Deficiency Recognizer to identify sections (e.g., clauses, phrases, sentences, groups of sentences, paragraphs, groups of paragraphs, etc.) of the document that might indicate a technical deficiency (an example of "problem kernels"). In some exemplary embodiments, the documents are analyzed with Technology Element recognizers to identify Technology Elements within the documents. In other exemplary embodiments, the text of problem kernels in the documents are analyzed with Technology Element recognizers to identify Technology Elements within the problem kernels (or proximate the problem kernels). In some exemplary embodiments, Search Logic then accepts user input containing query search terms, identifies Technology Elements corresponding to the query search terms, and identifies (a) documents/problem kernels having those Technology Elements within (or proximate) the problem kernels, and/or (b) documents/problem kernels having user search input within (or proximate) the problem kernels, and/or (c) documents/problem kernels having both user search input and those Technology Elements within (or proximate) the problem kernels. The identified documents/problem kernels are then output or displayed on a computer screen using any of the various display methods shown herein (or saved to a data storage device, printed, etc.).

Figure 5:
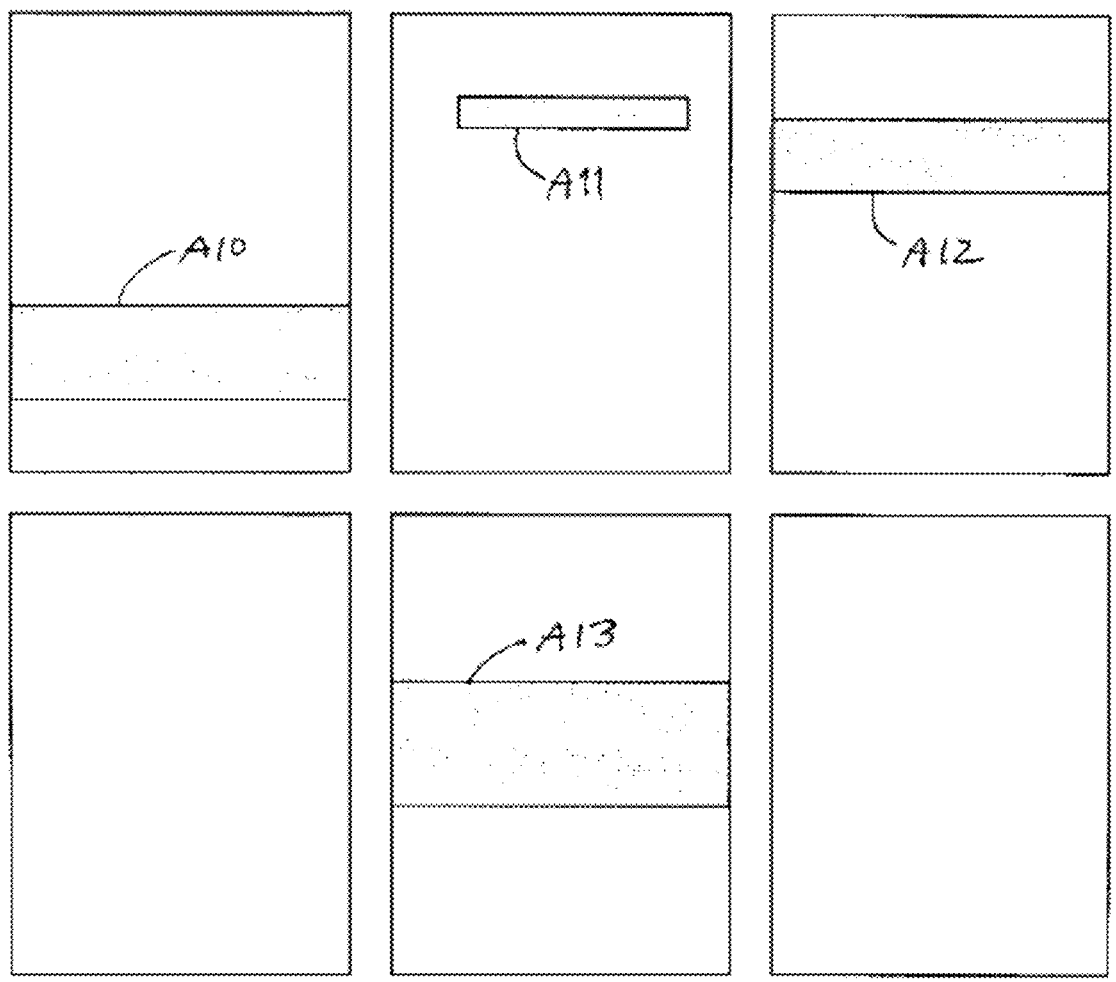
FIGS. 5-8 are schematic representations of an exemplary document.
Figure 6:
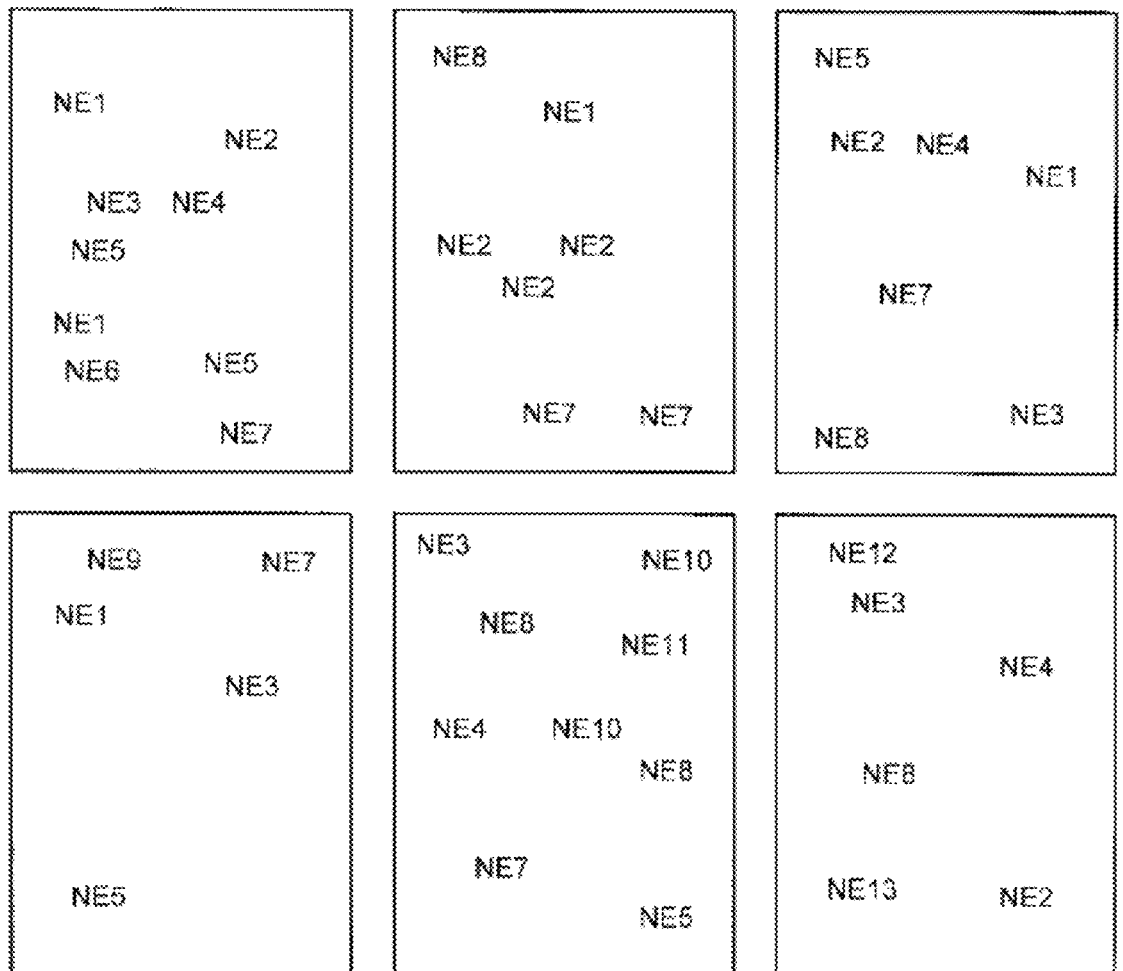
Figure 7:
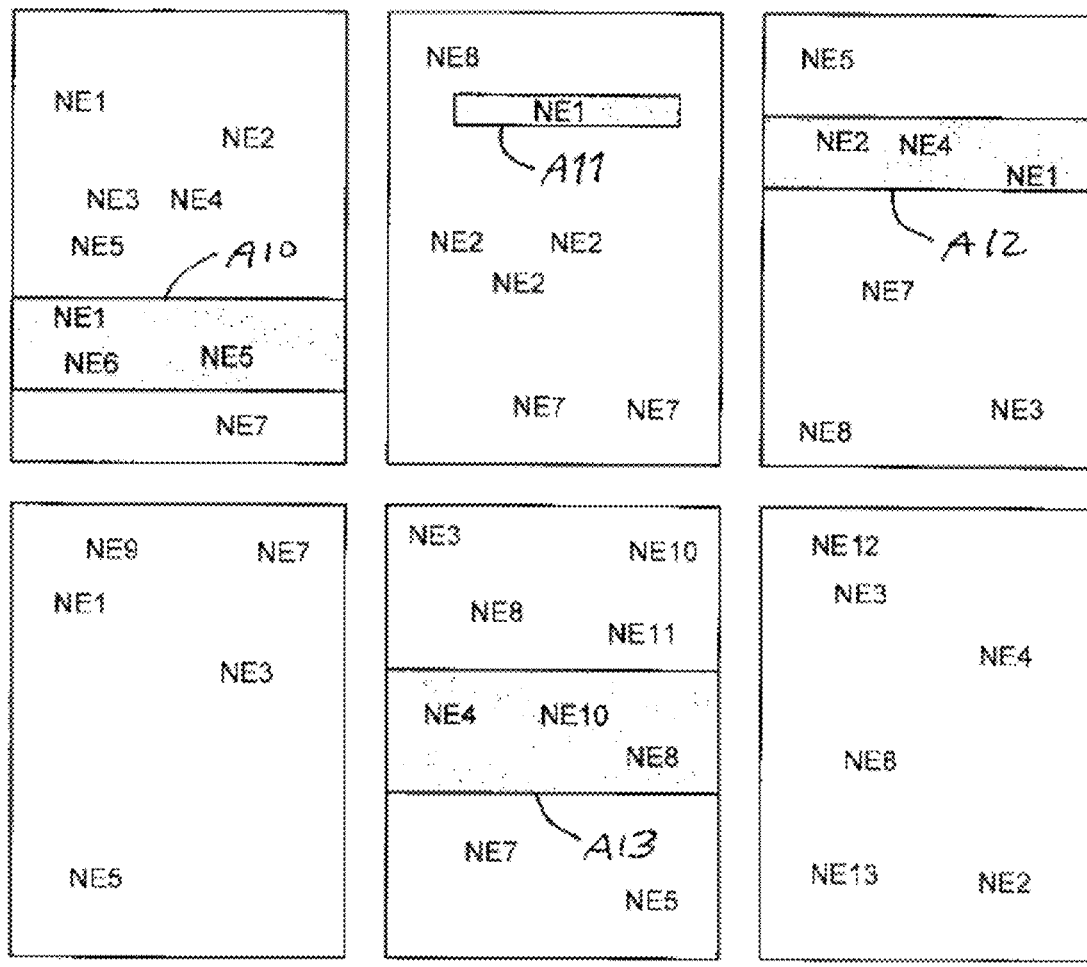
Figure 8:
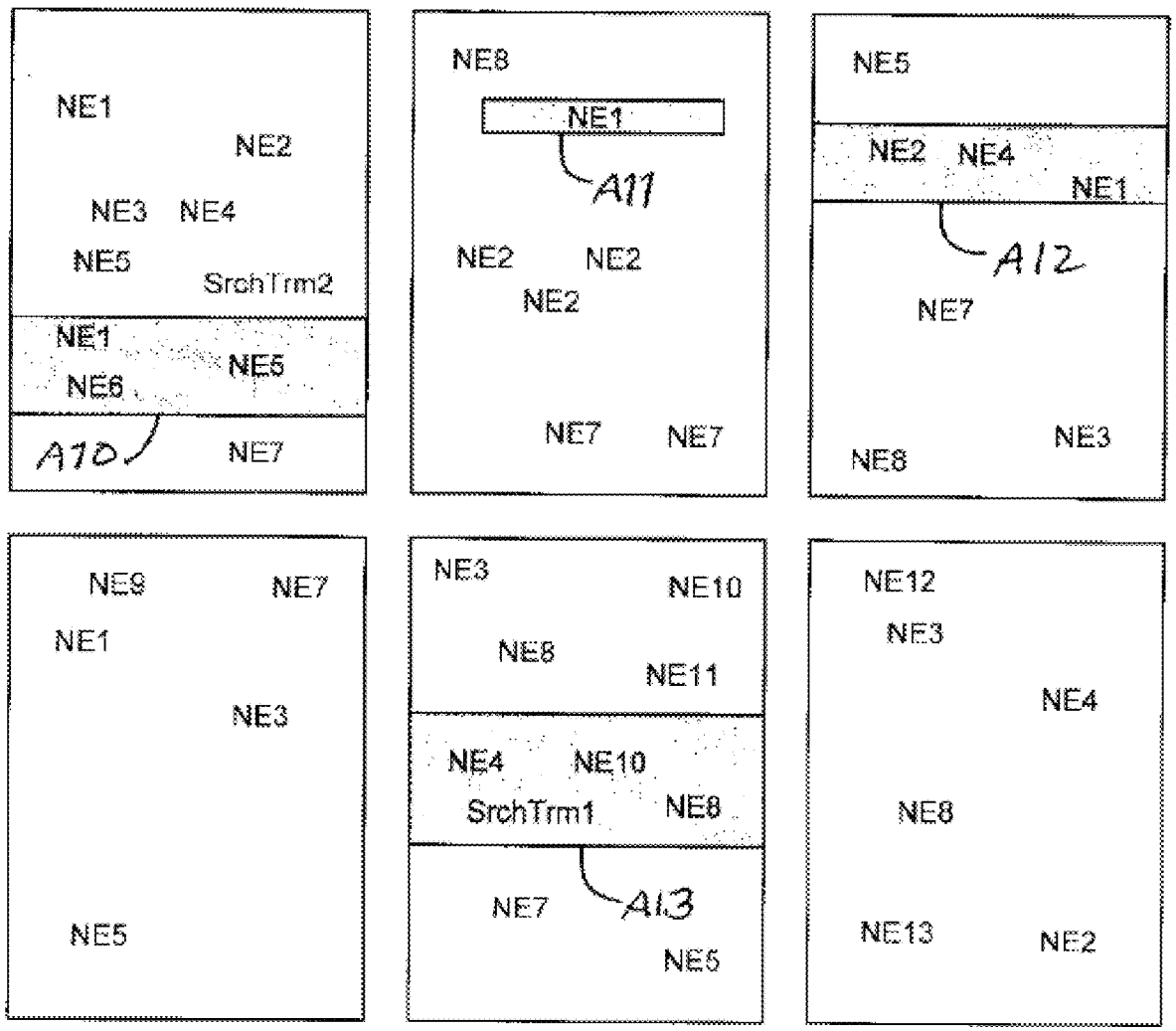

Referring now to FIGS. 5-8, schematic representations of an exemplary document are shown. As mentioned herein, in exemplary embodiments, documents are analyzed to identify document subsets containing a problem kernel, e.g., using a Deficiency Recognizer, sentiment analysis, or some other textual classifier. FIG. 5 shows six pages of an exemplary document that has been analyzed, e.g., using a Deficiency Recognizer and four regions A10, A11, A12, and A13 scored by a Deficiency Recognizer that might indicate problem kernels were identified. As mentioned herein, in exemplary embodiments, the documents are analyzed with Technology Element Recognizers to identify technology Elements within the documents or within the problem kernels (or proximate the problem kernels). FIG. 6 shows six pages of the same exemplary document that has been analyzed, e.g., using one or more Technology Element Recognizers and a plurality of Technology Elements NE1-NE13 were identified therein. In FIG. 7, the identified Technology Elements NE1-NE13 of FIG. 6 have been overlaid onto the six pages of FIG. 5 showing the Technology Elements NE1, NE2, NE4-NE6, NE8, and NE10 within the four regions A10, A11, A12, and A13 that were identified as problem kernels by the Deficiency Recognizer. FIG. 8 is the same as FIG. 7, except one user query search term SrchTrm1 is shown within region A13 and another user query search term SrchTrm2 is shown proximate, e.g., within X words of (but not within), region A10.

In some exemplary embodiments, a data structure is created for each document or section of a document that lists Technology Elements within each document or subset of a document, and, optionally, an indicator of the direction (positive or negative) and magnitude of the tone associated with each Technology Element, and, optionally, relative position with respect to one or more problem kernels, and the identity of the nearest problem kernel. Table I in FIG. 10 shows an example of such tagged Technology Elements for a hypothetical exemplary document, including positive (+), negative (−), and neutral treatment (φ); ten Technology Elements are shown along with their locations, textual treatment, which indicates the direction and magnitude of the tone associated with each Technology Element, and relative position with respect to one or more problem kernels. Table II in FIG. 11 shows an example of tagged Technology Elements for the example of FIG. 7, which has negative Technology Elements. In FIG. 7, NE1 occurs three times in three regions A10, A11, A12 which represent problem kernels; NE4 occurs twice in two regions A12 and A13 which represent problem kernels; and NE2, NE5, NE6, NE8, NE10 each occur once in a region which represent problem kernels, as shown in Table II of FIG. 11. In some exemplary embodiments users can search for specific Technology Elements only where they have a particular treatment, e.g., negative treatment. In other exemplary embodiments, users viewing the results of a search can also see a list of Technology Elements with the most negative treatment (e.g., by averaging or summing the magnitude of the tone for individual Technology Element instances). In other exemplary embodiments, problem kernels relevant to the user search query are displayed and beside each problem kernel is a list of Technology Elements contained within. In other exemplary embodiments, beside each problem kernel displayed to a user only Technology Elements with a particular treatment, e.g., negative treatment, are displayed. In other exemplary embodiments, users may select what tone of Technology Elements they want to see displayed. In other exemplary embodiments, users may select a "tone cutoff" for Technology Elements to be displayed (e.g., only Technology Elements with a 5 or higher negative tone will be displayed or only the top 10% most negative tone Technology Elements will be displayed). In other exemplary embodiments, users may specify as a query parameter a "proximate distance" from problem kernels to see all Technology Elements within that distance from a problem kernel (e.g., within 10 words, within 2 sentences, within the same paragraph, etc. of a problem kernel). In other exemplary embodiments, users may select as query parameters both a "proximate distance" from problem kernels and what tone of Technology Elements they want to see displayed. In other exemplary embodiments, the users may select as query parameters both a "distance cutoff" from problem kernels and a "proximate distance" for Technology Elements to be displayed.

In some exemplary embodiments, Search Logic then accepts user input containing query search terms, identifies Technology Elements corresponding to the query search terms, and identifies (a) documents/problem kernels having those Technology Elements within (or proximate) the problem kernels (FIG. 7), and/or (b) documents/problem kernels having user search input within (or proximate) the problem kernels (FIG. 8), and/or (c) documents/problem kernels having both user search input and those Technology Elements within (or proximate) the problem kernels (FIGS. 7-8). The identified documents/problem kernels are then output and displayed on a computer screen using any of the various display methods shown herein (or saved to a data storage device, printed, etc.).

Figure 9:
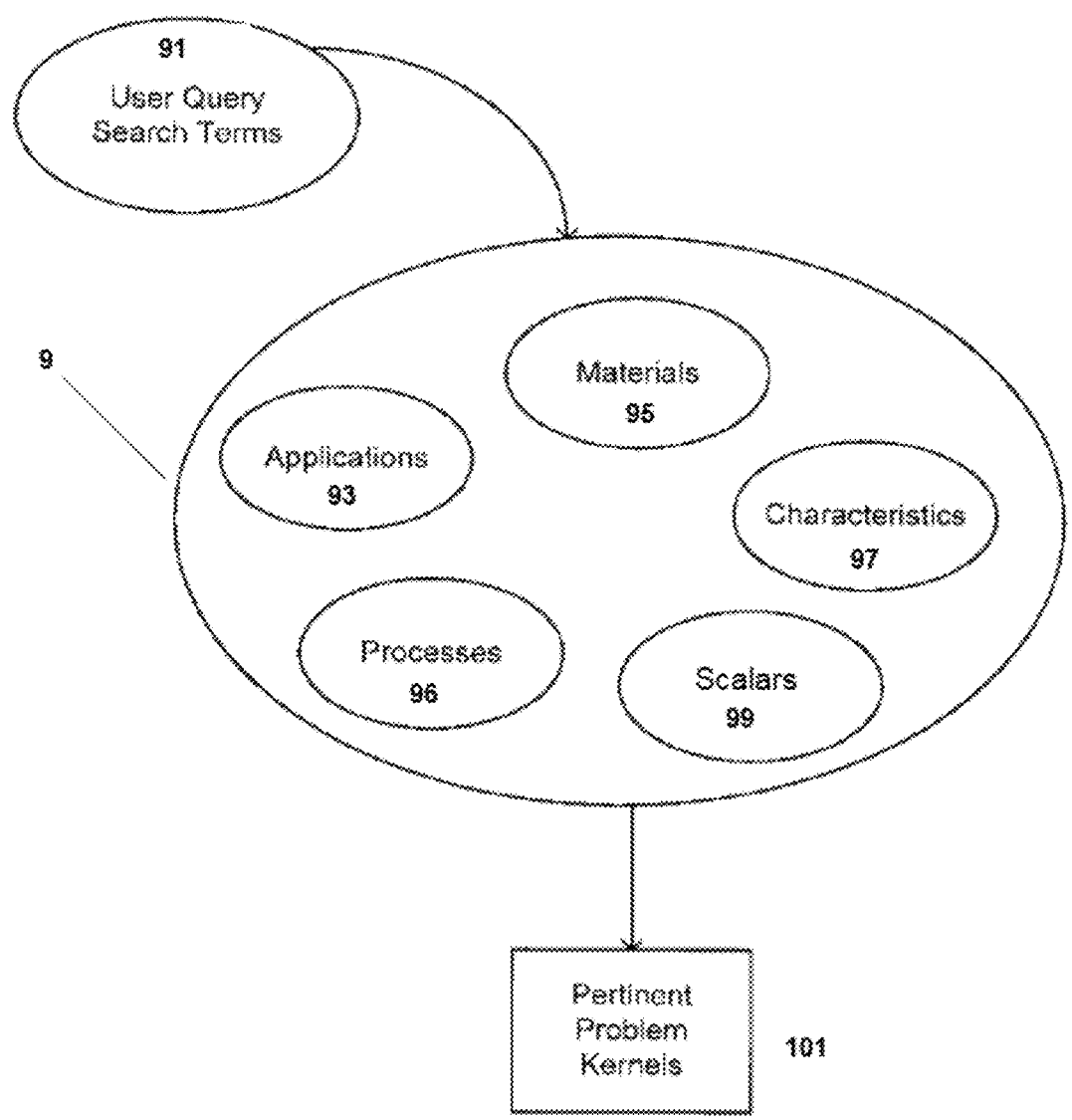
FIG. 9 is a schematic representation of exemplary systems and methods

With reference to FIG. 9, a schematic representation of exemplary systems and methods is shown. Specific types of Technology Elements (i.e. Applications 93, Materials 95, Processes 96, Characteristics 97, and Scalars 99) are used along with a Deficiency Recognizer 9 that recognizes problem kernels 101 based on input via User Query Search Terms 91. In some exemplary embodiments, Application Technology Elements 93 (or just "Applications") are nouns and Characteristic Technology Elements 97 (or just "Characteristics") describe technical attributes of Applications. Herein, "Applications" refers to a technical product (e.g., television), component of a technical product (e.g., backlight), or an application, or intended use, for a technical product (e.g., hospital patient television). While systems are made up of components and systems can be used in a variety of applications, in the context of Technology Elements, applications, systems, products, and components are all used synonymously. Applications 93 can exist at different levels of specificity or abstraction. For example, "information display" is a broad, abstract application that encompasses the more specific application of "flat screen LCD monitor." Herein, "Characteristics" are technical specifications, features, benefits, or attributes of a system, material, or process. These include both the technical attributes that might be listed on a material or product specification sheet as well as more narrative descriptions of a system's capabilities, e.g., ability to withstand repeated sterilization cycles. For example, in problem kernel 1, at least the following Applications are found: suspension, handpiece, suspension ring, bearing, seal, and valve. Similarly, in problem kernel 1, at least the following Characteristics are found: stiffness, noise, life, resistance to degradation, usable life, and ability to withstand repeated sterilization cycles. These are recognized by Technology Element Recognizers, as described herein.

Additional types of Technology Elements, e.g., Processes 96, Materials 95, and/or Scalars 99, are used along with a Deficiency Recognizer 9 that identifies problem kernels 101 are also shown in FIG. 9. The term "Process Technology Elements" (or just "Processes") refers herein to a manufacturing or processing step that is used on a product, e.g., polishing, cutting, mixing, particle separation. Processes 96 can be well-established, specific manufacturing processes or more general actions or conditions a material is subjected to. For example, "material removal" is a broad process that encompasses both "etching" and "grinding". The terms functions and processes are used synonymously herein. For example, in problem kernel 1, at least the following Processes are found: cutting, sterilization, and exposure to high temperatures and pressures. Material Technology Elements 95 (or just "Materials") are substances from which things are made. For example, in problem kernel 1, at least the following Materials are found: Viton, Kel-F rubber, elastomer, perfluoroelastomer, and Chemraz. Material Technology Elements 95 include generic or broad terms, e.g., glass, more specific terms, e.g., borosilicate glass, and brand names, e.g., BOROFLOAT. Scalar Technology Elements 99 (or just "Scalars") are numbers. For example, in problem kernel 1, at least the following Scalar is found: 300-800 (in the context of sterilization cycles). Scalar Technology Elements 99 function as numeric descriptors of another Technology Element (most commonly, Characteristics 97). In exemplary embodiments, scalar Technology Elements 99 are a single number, a range of numbers, or symbolic denotations of numeric values, e.g., the gravity of Earth is frequently described by the letter g and represents the numeric value 32.1737 feet per second squared. The terms scalars and metrics are used synonymously herein. Applications 93, Processes 96, Materials 95, Characteristics 97, and Scalars 99 are recognized by Technology Element Recognizers 9, as described herein.

Identifying Technology Elements

In some exemplary embodiments, a Technology Element Recognizer identifies Technology Elements (Applications, Materials, Processes, Characteristics, and Scalars) in documents, portions of documents, or identified problem kernels. Such Technology Elements can be expressed as a sequence of one or more characters or words and can be identified and labeled via various automated processes, including but not limited to entity recognition systems and other methods based on machine learning algorithms and other techniques. In some exemplary embodiments, separate Technology Element Recognizers are created for each different type of Technology Element (e.g., Application Technology Element Recognizer and Materials Technology Element Recognizer). In other exemplary embodiments, one Technology Element Recognizer recognizes all of the desired types of Technology Elements. To train the Technology Element Recognizer, technical word embeddings are created from as large a variety of documents to be processed. It is appreciated that a larger variety of documents may enhance the training of the Technology Element Recognizer. Various techniques for word embeddings are known in the art including GLOVE, FastText, W2V, Part-of-speech-tagged W2V. Any of these word embeddings processes are compatible with the systems and methods of the present disclosure. Training of the Technology Element Recognizer may also start with an initial ontology of Technology Elements created based on external sources, e.g., WordNet, MatWeb, or supplemented with manual input (i.e. additional knowledge and experience gained from speaking with experts in various technologies).

The term "ontology" herein refers to a complex arrangement of linked elements, preferably in a hierarchical format where sets of items that are described by another term are arranged into a subset of that term. For example, in an exemplary ontology, glass may have a subset that contains soda lime glass and borosilicate glass. Borosilicate glass may have additional subsets, one of which contains types of borosilicate glass, e.g., non-alkaline-earth borosilicate glass, alkaline-earth containing borosilicate glass, and high-borate borosilicate glass, and another subset containing borosilicate glass product names, e.g., BOROFLOAT, DURAN. In exemplary embodiments, these borosilicate glass product names are further linked to the type of borosilicate glass they contain. Simple ontologies, e.g., Linnaean taxonomy, can be imagined or visualized as a traditional taxonomy tree that shows their hierarchical nature, but more complex ontologies can contain multiple kinds of links between elements and may need to be imagined or visualized as a series of linked trees or a network diagram. The initial ontology contains the Technology Element name as well as alternative names or ways to refer to the Technology Element. The names and terms can be an individual word or group of words (n-gram). For example, television, TV, and TV set can all be grouped together to refer to the Application "Display: Television". The terms "associating . . . to create an ontology" herein refer to the process of creating an ontology of concepts based on their known relationships from external sources or their co-occurrence or similar usage within and across documents. Thus, the terms "associating" used in "associating Technology Elements to create an ontology" refer to herein to the process of creating an ontology of Technology Elements based on their known relationships from external sources or their co-occurrence or similar usage within and across documents. In some exemplary embodiments, where a sufficient number of documents exist, a simple list of linking words or phrases is created and the initial ontology is built of Technology Elements that are proximate to each other and have a linking word or phrase between them. These linking words or phrases signal a particular type of relationship between two or more Technology Elements. For example, for Application Technology Elements, relationships and linking words include: identical ("synonymous") or similarly grouped Technology Elements ("i.e.", "or other", "and other"), components of a product ("consisting of", "embedded in"), or Application Technology Elements that are a subset of another Application Technology Element ("more specifically", "such as", "that includes"). In some exemplary embodiments, the following are performed: associating a plurality of the identified Technology Elements to create an ontology of identified Technology Elements; and displaying the ontology of identified Technology Elements on at least one computer display. In some exemplary embodiments, when user search input includes at least one Technology Element, the Technology Element ontology is used to identify all Technology Elements that are subsets of the Technology Elements in the user search input and documents relevant to these subset Technology Elements are returned in addition to any documents relevant to the user search input. In some exemplary embodiments, users can choose whether to include subset Technology Elements in their search results.

Figure 31:
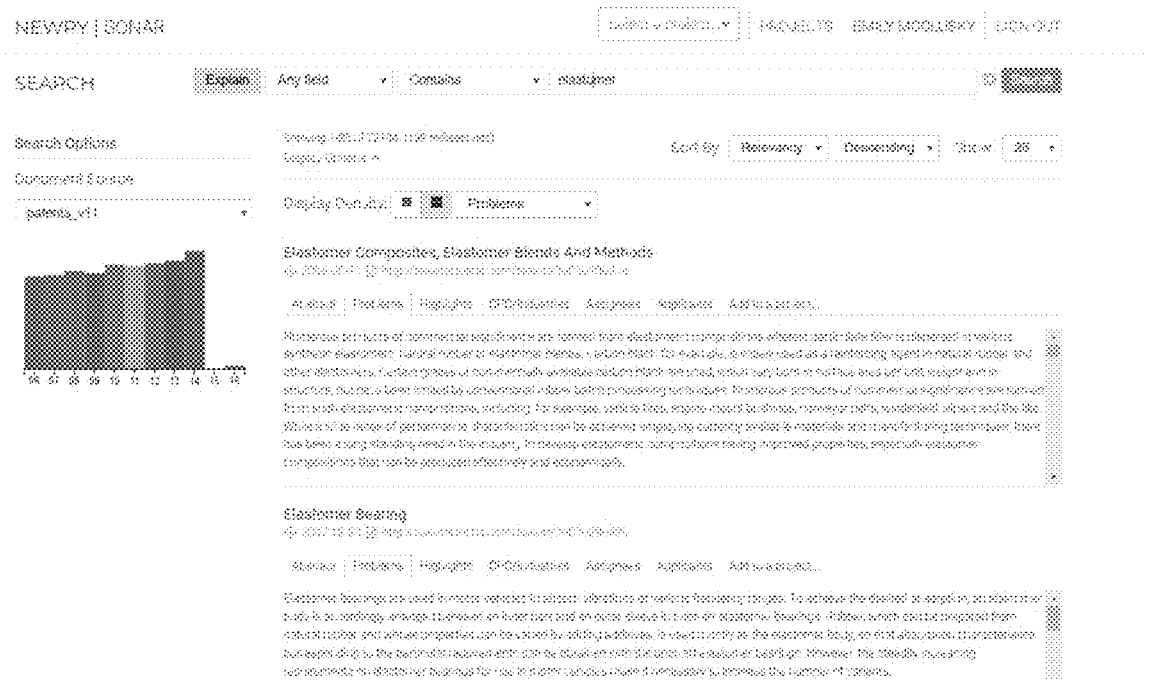
FIG. 31 is an exemplary view of a user search interface displaying relevant problem kernels to the user according to exemplary embodiments.
Figure 32:
FIG. 32 is an exemplary view of a user search interface where the user is searching relevant problem kernels according to exemplary embodiments.

In other exemplary embodiments, the Technology Element Recognizer may utilize an existing natural language processing package, e.g., Spacy, NLTK, CoreNLP, to identify part of speech for each word or n-gram in a sentence. Based on the structure of the sentence, pieces of the sentence are analyzed to determine if they are a Technology Element. In exemplary embodiments, to determine if they are a Technology Element, the word embeddings for these words or n-grams are then compared to the word embeddings for the initial taxonomy of Technology Elements. Word embeddings within a certain distance of any of the word embeddings in the list of terms for a Technology Element are then recorded and the name of the Technology Element can be substituted into the text of the document or added to a keyed Technology Element field. For further refinement, a human can review the associated word for any word embeddings that are added in this method and then accept them for inclusion and add the word to the Technology Element ontology list. In some exemplary embodiments, each Technology Element in the ontology is also associated with its synonyms, such that any piece of the sentence is compared to both the Technology Element name as well as it's synonyms. The pieces of the sentence to be analyzed can then be compared to the word vectors of each of the synonyms as well to determine if they are an instance of that Technology Element. In some exemplary embodiments, the average of the word vectors of a Technology Element and each of its synonyms are compared with pieces of the sentence to be analyzed. In other embodiments, the average of the word vectors of the Technology Element and all of its synonyms are compared with pieces of the sentence to be analyzed. Surprisingly, an exemplary embodiment of a simple named entity recognizer was created by feeding in a fairly comprehensive list of synonyms for each of the Technology Elements, then having a human quickly review the words with the closest word embeddings to those synonyms for each Technology Element. In other exemplary embodiments, the Technology Element Recognizer is a multi-input recurrent neural network where one input is the text from a sentence that precedes the proposed Technology Element and another input is the text following the proposed Technology Element, then one or more additional layers (e.g., one or more softmax layers for classification) process the outputs from the preceding two layers to generate a final decision on whether the proposed text might be a Technology Element. In other exemplary embodiments, the Technology Element Recognizer is a bi-directional Long Short-Term Memory ("LSTM") network where both forward and back LSTM layers provide input to a classifier, e.g., a convolutional neural network, softmax layer, random forest. In other exemplary embodiments, the bi-directional LSTM provides input to two stacked classifiers where the first layer determines if the word or clause is a Technology Element and the second layer determines what kind of Technology Element the word or clause is, e.g., material, application, process. In other exemplary embodiments, the bi-directional LSTM provides input to two or more classifiers where the final layer of one or more classifiers identifies the specific Technology Element being referenced, e.g., solar thermal collector (an application Technology Element), low pressure die casting (a process Technology Element). In other exemplary embodiments, the Deficiency Recognizer (or similarly built textual classifier) also identifies subsets of the text that describe applications, processes, characteristics, or materials and is used to reduce the number of clauses, sentences, or paragraphs analyzed by the named entity recognizer described above. In other embodiments, a simpler linear classifier using word embeddings or part-of-speech tags as inputs or a simpler neural network architecture could also help aid in reducing the number of clauses, sentences, or paragraphs passed to the named entity recognizer described above. In other exemplary embodiments, proposed Technology Elements are then compared to the Technology Element Ontology, the Technology Element synonyms, or the Technology Element term vectors, as described above, to label the Technology Elements found by the Technology Element Recognizer. In exemplary embodiments, a general-purpose Technology Element Recognizer of any of the types described above is created using training data from a variety of document types. This general-purpose Technology Element Recognizer can then be used on all types of documents, or, if needed, transfer learning can be performed by creating additional training data from a specific document type and updating the training of the Technology Element Recognizer using this new, more specialized training data to create a specialized Technology Element Recognizer for a particular type of document. FIG. 31 shows an exemplary embodiment with a user search tool in which users can enter queries and select a display option that causes every result to default to the "Problems" tab in the user view which displays the problem kernels for that document. FIG. 32 shows an embodiment where the user enters search queries to specifically search the "problems" field.

Materials: In some exemplary embodiments, one or more materials databases 160 include a stored list of materials words or n-grams indicating a material, e.g., glass, ceramic, aluminum alloy, thermoplastic elastomer, carbon, zirconium, Polybutylene Terephthalate, PTFE, etc. that are used for labeling materials words in documents. In some embodiments, materials databases could include specific material or brand names (e.g., Lexan, Kapton, Arton, etc.). The words in the materials database 160 are manually entered in some exemplary embodiments. In addition, or in the alternative, in some exemplary embodiments one or more of the computers can leverage knowledge-based approaches such as including logic to access existing publicly available or paid lexical knowledge databases, such as Freebase, DBPedia, Yago, etc. to identify materials words and n-grams. In addition, or in the alternative, in exemplary embodiments, one or more of the computers can have logic to automatically identify materials words within documents based on context utilizing machine learning techniques, as described. Exemplary systems use a named entity recognizer as described above, e.g., a bi-directional LSTM that feeds one or more classifiers, to determine if a word or clause might be a material Technology Element. Exemplary systems use classifier algorithms, e.g., a convolutional neural network, Naïve Bayes, Support Vector Machines, Maximum Entropy, Random Forests, to automatically identify materials words as follows: creating a training data set with a combination of identified materials words and n-grams (including their synonyms) and non-materials words and n-grams and a series of variables or "features" related to each word as used in a particular context, which will be treated as explanatory or independent variables, such as colocation and proximity to known materials words or n-grams, syntactic function and/or relation to other words in a sentence, and leveraging various algorithms to create a predictive model to estimate the probability that a newly-processed word or n-gram based on its variables, is a materials word or some other entity. In other exemplary embodiments, cosine similarity is used to compare material words or n-grams and the term vectors of the material Technology Elements and/or their synonyms and any words or n-grams with scores lower than a threshold value are labeled with the material Technology Element they are most similar to (i.e., where the score is closest to 0).

In some exemplary embodiments, such materials words or n-grams databases are structured as an ontology. For example, in some exemplary embodiments such materials databases could include a hierarchical taxonomy of materials where some materials are considered as broader categories of other, more specific "children", e.g., a category of "polymer" could contain subcategories of thermoset polymers, thermoplastic polymers, etc., which could include further subcategories of Polyester, Polyethylene, etc. In some exemplary embodiments, such materials databases could include various related terms all referring to the same material, e.g., Polyester, Polyethylene Terephthalate, PET, etc. In some exemplary embodiments, the materials ontology is created based on pre-existing information, e.g., MatWeb. In additional embodiments, the materials ontology is created using the documents database and a list of materials by using a hierarchical word embedding algorithm, e.g., Poincaré or other hyperbolic word embeddings, to translate the list of materials into word embeddings then view and translate the hierarchical structure of those word embeddings into an ontology or by using a hierarchical clustering algorithm, e.g., hierarchical agglomerative clustering, on traditional linear word embeddings for the list of materials to create a traditional taxonomy of materials.

Applications: In some exemplary embodiments, one or more application databases 162 include a stored list of words or n-grams indicating a system/component, e.g., turbine engine, electric motor, image sensor, lens, compressor, battery, o-ring, etc., that are used for labeling application words or n-grams in documents. In some embodiments, application databases could include specific product or brand names (e.g., Apple iPhone, Boeing 747, etc.). The words in the application database 162 are manually entered in some exemplary embodiments. In addition, or in the alternative, in some exemplary embodiments one or more of the computers can leverage knowledge-based approaches such as including logic to access existing publicly available or paid lexical knowledge databases, such as Freebase, DBPedia, Yago, etc. to identify application words and n-grams. In addition, or in the alternative, in exemplary embodiments one or more of the computers can have logic to automatically identify application words within documents based on context utilizing machine learning techniques, as described. Exemplary systems use a named entity recognizer as described above, e.g., a bi-directional LSTM that feeds one or more classifiers, to determine if a word or clause might be an application Technology Element. Exemplary systems use classifier algorithms, e.g., a convolutional neural network, Naïve Bayes, Support Vector Machines, Maximum Entropy, Random Forests, to automatically identify applications words as follows: creating a training data set with a combination of identified application, system, product, and components words and n-grams (including their synonyms) and non-application words and n-grams and a series of variables or "features" related to each word as used in a particular context, which will be treated as explanatory/independent variables, such as colocation and proximity to known application words or n-grams, syntactic function and/or relation to other words in a sentence, etc., and leveraging various algorithms to create a predictive model to estimate the probability that a newly-processed word/n-gram based on its variables, is a system/component word or some other entity. In other exemplary embodiments, cosine similarity is used to compare application words or n-grams and the term vectors of the application Technology Elements and/or their synonyms and any words or n-grams with scores lower than a threshold value are labeled with the application Technology Element they are most similar to (i.e., where the score is closest to 0).

In some exemplary embodiments, such application words/n-grams databases are structured as an ontology. For example, in some exemplary embodiments such application databases could include a hierarchical taxonomy of applications where some products are considered as broader categories of other, more specific "children" or components, e.g., a category of "cellular phone" could contain generic subsystems of touch screen, battery, antenna, speaker, etc., which could each include more specific types of subsystems, e.g., lithium-ion battery, projected capacitive touch screen, and/or underlying components, e.g., conductive film, electrode, etc. In some exemplary embodiments, such applications databases could include various related terms all referring to the same application (e.g., battery, electronic storage cell, etc.). In some exemplary embodiments, the applications ontology is created based on pre-existing information, e.g., Alibaba product listings. In additional embodiments, the applications ontology is created using the documents database and a list of applications by using a hierarchical word embedding algorithm, e.g., Poincaré or other hyperbolic word embeddings, to translate the list of applications into hierarchical word embeddings then translate the hierarchical structure of those word embeddings into an ontology or by using a hierarchical clustering algorithm, e.g., hierarchical agglomerative clustering, on traditional linear word embeddings for the list of materials to create a traditional taxonomy of applications.

Processes: In some exemplary embodiments, one or more process databases 164 include a stored list of words or n-grams indicating a technical process, e.g., autoclaving, tempering, polishing, mixing, coating, casting, forging, particle separation, coating deposition, etc., that are used for labeling processes words/n-grams in documents. The words in the process database 164 are manually entered in some exemplary embodiments. In addition, or in the alternative, in some exemplary embodiments one or more of the computers can leverage knowledge-based approaches such as including logic to access existing publicly available or paid lexical knowledge databases, such as Freebase, DBPedia, Yago, etc., to identify process words and n-grams. In addition, or in the alternative, in exemplary embodiments one or more of the computers can have logic to automatically identify process words within documents based on context utilizing machine learning techniques, as described. Exemplary systems use a named entity recognizer as described above, e.g., a bi-directional LSTM, to determine if a word or n-gram might be a process Technology Element. Exemplary systems use classifier algorithms, e.g., a convolutional neural network, Naïve Bayes, Support Vector Machines, Maximum Entropy, Random Forests, to automatically identify process words as follows: creating a training data set with a combination of identified process words and n-grams (including their synonyms) and non-process words and n-grams and a series of variables or "features" related to each word as used in a particular context, which will be treated as explanatory/independent variables, such as colocation and proximity to known process words/n-grams, syntactic function and/or relation to other words in a sentence, etc., and leveraging various algorithms to create a predictive model to estimate the probability that a newly-processed word/n-gram based on its variables, is a process word or some other entity. In other exemplary embodiments, cosine similarity is used to compare process words or n-grams and the term vectors of the process Technology Elements and/or their synonyms and any words or n-grams with scores lower than a threshold value are labeled with the application Technology Element they are most similar to (i.e., where the score is closest to 0).

In some exemplary embodiments, such process words/n-grams databases are structured as an ontology. For example, in some exemplary embodiments such process databases could include a hierarchical taxonomy of process where some processes are considered as broader categories of other, more specific "children", e.g., a category of "forming" could contain generic sub-processes of forging, casting, machining, extrusion, etc. each of which could each include more specific types of sub-processes (e.g. drop forging, cold forging, etc.). In some exemplary embodiments, such process databases could include various related terms all with high probability of referring to the same process (e.g., cutting, lacerating, slitting, slicing, etc.). In some exemplary embodiments, such process database is created based on pre-existing information, e.g., Wikipedia's list of manufacturing processes. In additional embodiments, the process ontology is created using the documents database and a list of processes by using a hierarchical word embedding algorithm, e.g., Poincaré or other hyperbolic word embeddings, to translate the list of materials into hierarchical word embeddings or by using a hierarchical clustering algorithm, e.g., hierarchical agglomerative clustering, on traditional linear word embeddings for the list of processes to create a traditional taxonomy of processes.

Characteristics: In some exemplary embodiments, one or more characteristic databases 22 include a stored list of characteristic words indicating a generic characteristic of something, e.g., stiffness, lifetime, temperature resistance, tensile strength, alter*, noise, usable life, repeat*, increas*, decreas*, resist*, withstand, longer, shorter, etc. (again, the * indicates any form of the word, e.g., alter, alters, altered, altering, etc.). The words in the characteristic database 22 are manually entered in some exemplary embodiments. In addition, or in the alternative, in some exemplary embodiments one or more of the computers can leverage knowledge-based approaches such as including logic to access existing publicly available or paid lexical knowledge databases, such as Freebase, DBPedia, Yago, etc. to identify characteristic words. In addition, or in the alternative, in exemplary embodiments one or more of the computers can have logic to automatically identify characteristic words within documents based on context utilizing machine learning techniques, as described. Exemplary systems use a named entity recognizer as described above, e.g., a bi-directional LSTM, to determine if a word or n-gram might be a characteristic Technology Element. Exemplary systems use classifier algorithms, e.g., a convolutional neural network, Naïve Bayes, Support Vector Machines, Maximum Entropy, Random Forests, to automatically identify characteristic words as follows: creating a training data set with a combination of identified characteristic words and n-grams (including their synonyms) and non-characteristic words and n-grams and a series of variables or "features" related to each word as used in a particular context, which will be treated as explanatory/independent variables, such as distance from a "qualifier word" (e.g., improved, reduced, etc.), a number, etc., syntactic function and/or relation to other words in a sentence, etc., and creating a predictive model to estimate the probability that a newly-processed word, based on its variables, is a characteristic word or some other entity. In other exemplary embodiments, cosine similarity is used to compare material words or n-grams and the word vectors of the material Technology Elements and/or their synonyms.

In some exemplary embodiments, such characteristic words/n-grams databases are structured as an ontology. For example, in some exemplary embodiments such characteristic databases could include a hierarchical taxonomy of characteristics where some characteristics are considered as broader categories of other, more specific "children", e.g., a category of "temperature" could include sub-categories such as "heat resistance", "operating temperature", "glass transition point", etc. In some exemplary embodiments, such characteristic databases could include various related terms all with high probability of referring to the same characteristic, e.g., "melting point", "liquefaction point", etc. In some exemplary embodiments, the characteristics ontology is created based on pre-existing information, e.g., MatWeb, product specification sheets from a variety of industries, applications, and materials. In additional embodiments, the characteristics ontology is created using the documents database and a list of characteristics by using a hierarchical word embedding algorithm, e.g., Poincaré or other hyperbolic word embeddings, to translate the list of characteristics into hierarchical word embeddings or by using a hierarchical clustering algorithm, e.g., hierarchical agglomerative clustering, on traditional linear word embeddings for the list of characteristics to create a traditional taxonomy of characteristics.

Scalars: In some exemplary embodiments, one or more scalar databases 22 include a stored list of scalars as well as the Technology Element they refer to (typically a characteristic). Identifying scalars can be performed with simple sentence parsing using general natural language tools, e.g., CoreNLP, Spacy, NLTK, to identify numeric values, i.e., scalar Technology Elements, within text. When these numeric values occur proximate to other Technology Elements, they can then be associated with the nearest Technology Elements in the database based on proximity and/or syntactic dependencies.

In some exemplary embodiments, systems and methods capture instances of Technology Elements used in document text and/or problem kernels and features about their relation to other Technology Elements and problem kernels in a database. The relationships between technology elements can be shown to the user, e.g., a user can input a material in the query box to see what systems most commonly appear in problem kernels with the material. In other exemplary embodiments, these relationships can be used to create links between multiple technology element ontologies where the number of co-occurrences or percentage of co-occurrence is above a threshold. For example, if the Material Technology Element glass co-occurs with the System Technology Element window more than 70% of the time that window is in a problem kernel, a link can be created between the two technology elements. Note that this link is unidirectional as window co-occurs with glass less than 70% of the time glass appears in a problem kernel. In some exemplary embodiments, when users search a technology element that is linked in this manner, e.g., window, the search results will also include documents related to the linked technology element, e.g., glass. In other exemplary embodiments, the user can click a checkbox to indicate whether they want to see related documents.

Transforming Technology Elements and/or Problem Kernels into Problem Elements:

In some exemplary embodiments, problem kernels are analyzed to identify "problem elements," which are the most basic expressions of a problem and consist of one or more word n-grams, phrases, or clauses contained within a problem kernel that describe one specific problem contained within. Each problem kernel can contain one or more unique problem elements. To identify problem elements, any pronouns in a problem kernel are replaced with the relevant antecedent noun to help with subsequent summarization. A variety of techniques or rules are used to replace the pronoun with the noun that they reference, for example, examining the previous sentence to identify the antecedent noun. In exemplary embodiments, where the antecedent noun is unclear (e.g., there are multiple possible antecedents), the entire paragraph is analyzed to identify how frequently each of the potential antecedent nouns appear, then select the most common. In exemplary embodiments, if multiple possible antecedent nouns have identical frequency, the antecedent noun that is most proximate to pronoun is selected, e.g., the antecedent noun that has the fewest number of words between it and the pronoun. After replacing pronouns, problem kernels that consist of more than one phrase, clause, sentences, or paragraphs are reduced to their summarized version, e.g., the version that includes the most relevant unique phrases, clauses, or sentences of the problem kernel. A variety of summarization techniques can be used, such as an attentional encoder-decoder RNN to perform abstractive summarization on the problem kernel. For certain problem kernels, the summary may be the same length as the original problem kernel if all of the problems or concepts expressed within are sufficiently unique. Once the summarized problem kernel is obtained, it is broken down into individual clauses using traditional natural language sentence mapping techniques, e.g., part-of-speech tagging, dependency parsing, noun chunking, keyword extraction, etc. via commonly used natural language processing packages like Spacy, NTLK, CoreNLP, etc. In some exemplary embodiments, a list of defined problems is created. In some embodiments, the list of defined problems is limited to general problem types, e.g., cost, manufacturing yield, downtime, safety, comfort, etc., as described above. In other exemplary embodiments, the list of problems includes industry specific problems. In other exemplary embodiments, the list of problems includes a list of verbs and adjectives that describe negative effects, e.g., "failure", "break", "crack", "degrade", "degradation", etc. In other exemplary embodiments, the list of problems is created by reviewing the unique adjectives and verbs found within a sample set of summarized problem kernels to generate a problem list. Once the list of problems is obtained, training data is created for each problem with sample clauses that contain and do not contain that problem. A Problem Element Recognizer Logic, e.g., a convolutional neural network or bi-directional LSTM+ classifier layer as described above, is trained. In other embodiments, any problem kernel clauses the Problem Element Recognizer Logic is unable to classify, e.g., where the score given to the top label from the Problem Element Recognizer Logic is below a certain threshold, e.g., 0.9, the unlabeled problem kernel clauses are manually reviewed and annotated to determine what label should be applied to them. After a certain number of examples have been gathered, the Problem Element Recognizer Logic can then be retrained on the human-corrected output to improve performance. In some embodiments, as part of the manual, additional problem elements may be discovered, and a new Problem Element Recognizer Logic may be trained that includes these additional problem elements.

In some exemplary embodiments, Technology Elements are used to help identify problem elements by examining the Technology Elements within problem kernel summary clauses, isolated as described above, that together describe the key factors of a technical problem. Any problem kernel summary clause that contains specific combinations of Technology Elements that includes at least one application, material, or process as well as an associated characteristic (e.g., "turbine lubricant"+"quality") can be considered a problem element. A problem element may also include a scalar or metric. For example, in Problem Expression 1, a variety of problem element appear including: "materials"+"degradation"+(opt.) "300-800 sterilization cycles", "Viton rubbers"+"degradation"+(opt.) "300-800 sterilization cycles", "Kel-F rubbers"+"degradation"+(opt.) "300-800 sterilization cycles", "suspension rings"+"degradation"+(opt.) "300-800 sterilization cycles", "handpiece suspension rings"+"degradation"+(opt.) "300-800 sterilization cycles", "suspension"+"noise", "bearing"+"failure", "handpiece"+"stiffness", "elastomer"+"failure". In some exemplary embodiments, the Technology Element ontologies are used to create additional problem elements that are added to the document as text or within a problem element keyed field. To create additional problem elements, all combinations of subset Technology Elements are combined, each of which is considered a new problem element. For example, in a problem element consisting of "plastic"+"cracking", materials that are a subset of plastic, e.g., "PET", would be used to create a new problem element, e.g., "PET"+"cracking", and that problem element would be added to the document. In other exemplary embodiments, a subset Technology Element is only used to create a new problem element if the remaining text of the document contains the subset Technology Element.

In other exemplary embodiments, problem elements are identified by finding problem kernel summary clauses that contain at least one Technology Element and have a negative sentiment score. In exemplary embodiments, a recursive neural network is used to evaluate the sentiment of specific pieces of sentence as well as map the relationships between the sentences. For example, see Stanford's Sentiment Treebank and corresponding papers, e.g., Recursive Deep Models for Semantic Compositionality Over a Sentiment Treebank.

In exemplary embodiments, substantially identical problem elements are linked. For problem kernels that are identified using a Problem Element Recognizer logic, the problem element labels are used to group substantially identical problem elements, e.g., problem elements that have the same label. The objects of these problem elements can then be linked as well according to the same process as application technology elements, discussed herein. As used herein, "substantially identical" in the context of problem elements, Technology Elements, etc. means the problem elements, Technology Elements, etc. describe the same problem, e.g., using the same words or the same Technology Elements or synonyms thereof. For problem kernels that were created based on the Technology Elements within them, the Technology Element ontology and/or synonym list can be also be used to identify substantially identical problem elements.

It is appreciated that problem elements can be hierarchical. For example, in Problem Expression 1, "bearing failure" is a consequence of "materials degrading" and these relationships can be identified and stored along with the problem element using common sentence dependency mapping techniques available in natural language processing libraries, e.g., Spacy, NLTK, CoreNLP. In some exemplary embodiments, these relationships are used to create a problem element ontology. In some exemplary embodiments, the problem element ontology is shown in response to a user query. In other exemplary embodiments, the user can select problem elements to view surrounding or related elements from the problem element ontology.

Analyzing and Scoring Problem Kernels, Problem Elements, and Technology Elements In some exemplary embodiments, problem kernels are analyzed to determine various metrics associated with their overall seriousness, criticality, or importance to a market or a set of users. Such metrics of "problem intensity" could include the recency of the document in which the problem kernels appears, the size, market power, or typical patenting behavior of the company that mentions the kernel, the monetary value of the industries and/or applications associated with the problem kernel, and the sentiment score for the kernel. Such metrics can be used to quantify or score problem kernels as a potential tool for ranking and prioritizing lists of problem kernels for display to a user, and/or metrics for analyzing different aggregations of problem kernels (e.g., by industry, company, or various Technology Elements). In some exemplary embodiments, such metrics are tested and refined over time to identify the most important set of variables to a set of users. In other exemplary embodiments, users can select metrics or groups of metrics and rate their relative importance in order to return a more customized set of problem kernels.

Figure 17:
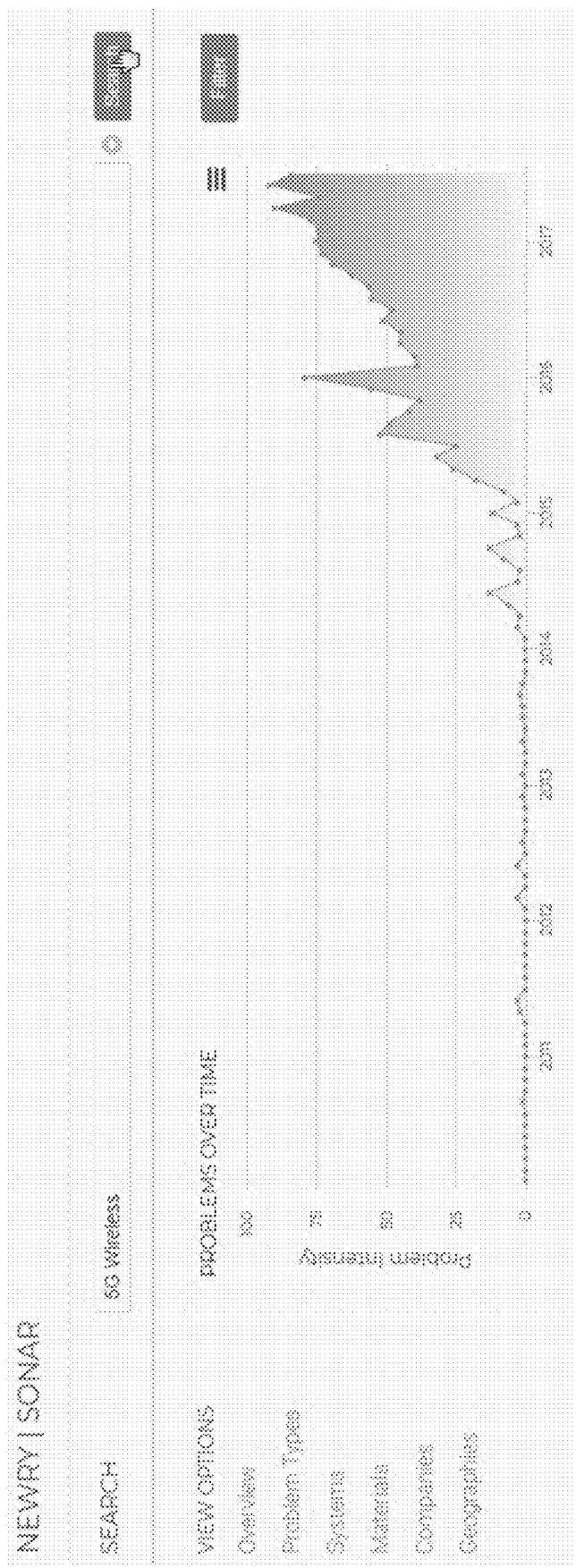
FIG. 17 shows an exemplary view of a display showing problems over time.

In some exemplary embodiments, problem elements are analyzed to determine various metrics associated with their overall seriousness, criticality, or importance to a market or a set of users. Metrics of problem intensity could include, but are not limited to, the number of instances such problem elements appear in a corpus of documents, how recently a problem element has appeared in a document, how long has a problem element been appearing in documents, whether a problem element is appearing more or less frequently in documents across time, the timing and various measures of the aggregate growth or decline of a problem element across such instances, the number of companies mentioning the problem element, the size, market power, or typical patenting behavior of companies mentioning such problem elements, the monetary value of the industries and/or applications involved in the problem element, how frequently the problem element appears in documents mentioning the related application or applications, the average sentiment score for the problem element, the number of highly-related problem elements mentioned within the documents (e.g., other problems in the same product or application), the sentiment of the problem element in comparison to highly-related problem elements, and the diversity of technology solutions being discussed in relation to the problem. Such metrics can be used to quantify or score problem elements as a potential tool for ranking and prioritizing lists of problem elements for display to a user, and/or metrics for analyzing different aggregations of problem elements (e.g., by industry, company, or various Technology Elements). In other exemplary embodiments, the problem intensity metric for all relevant problem kernels (e.g., all problem kernels that match a user's search input) is combined into a single problem intensity score. In FIG. 17, a sample user display is shown for a user search query of "5G Wireless" that displays the problem intensity over time for all of the related documents. In FIG. 30, a sample user display is shown that displays Technology Elements (materials, processes, systems, and characteristics) and problem elements by industry. Each square displays two metrics: (1) the background color represents the number of appearances of the Technology Elements or problem elements in each industry; (2) the arrows represent the change over time in the number of appearances. In some exemplary embodiments, related metrics are grouped together to create a single score relating to problem growth (problem element growth or change, recency of mentions), problem severity (average problem element sentiment, percentage of total documents containing the problem element), entity importance (number of entities or companies associated with, e.g., authoring documents the problem element, the average or cumulative size or market power, e.g., annual revenue, of those companies), and commercial relevance (industry or application value for industries or applications associated with the problem element). In some exemplary embodiments, problem elements are scored into quintiles or deciles for each metric or group of metrics and the average is taken of all of the quintiles or deciles to find the average score for the problem element. In some exemplary embodiments, such metrics are tested and refined over time to identify the most important set of variables to a set of users. In other exemplary embodiments, users can select metrics or groups of metrics and rate their relative importance in order to return a more customized set of problem elements.

In other exemplary embodiments, a "high change score" is calculated for each problem element or Technology Element. The "high change score" can be a qualitative or categorical name or can be a numeric score. In one exemplary embodiment, the high change score is a description of whether a kernel is growing or shrinking, allowing kernels to be classified into groups, e.g., no change, starting to grow, growing slowly, growing quickly, beginning to plateau, beginning to decline, declining slowly, or declining quickly. In some exemplary embodiments, the system analyzes whether problem elements are increasingly or decreasingly mentioned in documents. In such embodiments, problem elements are compared to an "ideal curve" or a reference curve, such as the portion of the sine wave (y=sin(x)) between x=0 and x=pi. To begin, the number of appearances of a problem element over time must be counted. Using the above methods to identify and associate problem elements with documents, it is possible to then run an aggregation query across the appropriate time frame to return the count of documents each problem element appears in within the given timeframe, e.g., each month for the past 5 years. In exemplary embodiments, an aggregation is performed by month across at least 3 years, e.g., preferably between 5 and 10 years, and analyzed.

In exemplary embodiments, the problem element count data is normalized by performing the following: (1) for each month in the time period, calculate the average number of problem element appearances in documents across all problem elements; (2) Calculate the standard deviation across the time period using the averages calculated in step 1; (3) Calculate the standard deviation from the mean for each problem element at each time period, e.g., for month 1, use the month 1 average problem element appearances, standard deviation, and number of appearances of problem element A to calculate problem element A's deviation from the mean in month 1; (4) calculate the rolling average of the documents per month, e.g., a 12-month average. In exemplary embodiments, the resulting "ideal curve" or reference curve is divided into sections that most accurately match descriptive category labels. A category label may then be associated with each problem element by: (1) Labeling each point in the time series with an incrementing number, e.g., 1, 2, 3 . . . n; (2) For each section of the "ideal curve" corresponding to a category label, the x-coordinates of that portion of the "ideal curve" are divided into the n equal pieces (e.g., each piece will be (0+i/n) for i between 1 and n); (3) Use a mathematical formula of curve similarity, e.g., Pearson correlation coefficient, to compare the problem element curve (using the rolling average of the standard deviation of the mean as the y-values) and the "ideal curve" (using the n-pieces as x-coordinates to generate the y-values); (4) Use the category label of the portion of the "ideal curve" with the highest Pearson correlation coefficient as the label for that problem element. In another embodiment, the slope of the normalized curve for each problem element is used to further differentiate problem elements within each category, e.g., identify the "growing quickly" category. In another embodiment, the slopes of different sections of the problem element curve, e.g., the slope of the entire curve, the slope of the most recent year in the time period, the slope of the first year in the time period, are calculated and then compared to each other to find the fastest growing problem element. In another embodiment, each slope calculation is divided into quintiles, and the quintiles of different slope calculation are added together or averaged together to give a final score which is then compared across problem elements.

In another embodiment, a similar process as described above is performed using Technology Elements, rather than problem elements. A "high change score" for each Technology Element (or a designated group of Technology Elements) is then calculated. These "high change scores" are calculated across all documents or for a subset of documents of interest, e.g., only documents from a timeframe or only documents relating to a particular Technology Element. For example, a "high change score" could be calculated for each of the materials appearing in documents containing the "Television" Technology Element (as identified by the Technology Element Recognizer) to help a user understand what materials are increasingly associated with "Televisions." Alternatively, the Deficiency Recognizer could be used to identify "problem kernels" within documents containing the "Television" Technology Element. The Technology Element Recognizer could then be used to recognize all of the materials mentioned in these television problem kernels. Finally, a "high change score" could be calculated, as described above, to help a user understand what materials are increasingly associated with problems in televisions.

In another embodiment, a "market maturity" score is calculated for Technology Elements or Problem Elements. The "market maturity score" is calculated similarly to the "high change score" described above, but uses the cumulative number of documents mentioning a Technology or Problem Element (rather than the rolling average of the standard deviation from the mean). For comparison, the "ideal curve" is an s-shaped curve, e.g., the curve described by the Bass Diffusion Model, rather than a sinusoidal curve. This s-shaped curve is used to group Technology or Problem Elements into different "market maturity" categories, e.g., emerging, growing, slowing growth, mature, using the same techniques described above (e.g., (1) dividing up the s-shaped curve into portions that accurately represent each category, (2) dividing up the x-values of these portions so they match the number of x-values in the Technology or Problem Element curve being compared, and (3) using the curve portion with the highest Pearson correlation coefficient with the Technology or Problem Element to categorize the Technology or Problem Element). In another embodiment, problem elements are scored based on "problem maturity" using the same techniques as described above.

Exploring Problem Kernels, Technology Elements, and/or Problem Elements Related to Technology Areas of Interest In some exemplary embodiments, individual documents indicating problems, problem kernels, technical elements, and/or problem elements are identified based on their relevance to a specific technical area in mind, e.g., elastomers, airplanes, electric drills, implantable medical devices, solar power generation, etc., and relevant individual documents, problem kernels, technical elements, or problem elements are analyzed and output or displayed in whole or in part on a computer display.

In some embodiments, relevance to a technology area is established by enabling a user to leverage common keyword search techniques, including but not limited to a user inputting words into a keyword search field and computer algorithms leveraging various keyword search relevance algorithms, potentially including various "bag-of-words" approaches such as TF-IDF, preprocessing both document text and user search input using common natural language techniques such as stemming and lemmatization, selecting areas of interest from search filters and/or menus leveraging various classification schema or taxonomies including allowing a user to explore the Technology Element ontologies and make selections from them, allowing a user to input keywords related to Technology Elements, and using the one or more Technology Element ontologies to suggest related Technology Elements, allowing users to input keywords and based on the keywords, suggest related problem kernels or problem elements (either based on keyword matches or on word vector similarity using word vector embeddings, e.g., W2V), allowing a user to enter input or select from a list of related entities, e.g., companies or organizations, individual scientists, or industries, to view related documents, problem kernels, Technology Elements, or problem elements, and various combinations of the above. In exemplary embodiments, user search queries are stored on a data storage device and users can access stored previous user search queries as another form of input to the database. In another exemplary embodiment, users can browse through previous queries and select previous queries as input to the database. These stored queries may have user-provided labels that can be searched or to allow for easier identification.

In some exemplary embodiments, users can explore the world of technical problems beginning with a specific problem kernel, problem element, or Technology Element of interest and find the most highly-related problem kernels, problem elements, or Technology Elements based on their similarity or distance from each other in a technology element instance database. Such relationships can be identified using a variety of techniques, including but not limited to natural language processing vector comparison techniques (using the word vectors developed as described above and standard distance metrics, e.g., Euclidean Distance or Cosine Similarity) or using a term-document matrix to identify frequently co-occurring terms (e.g., TF-IDF matrix). Such relationships can be explored by users in a variety of ways, including but not limited to a "similar results list" with filters for displaying various entities of interest (e.g., problem kernels, materials, processes, companies, industries, etc.), network visualizations with various elements on the network comprising different types of related entities (e.g., materials, processes, etc.), etc.

In some exemplary embodiments, users can further explore how entities of interest (e.g., problem elements, Technology Elements, companies, industries, etc.) relate by selecting an entity of interest from a list, typing the name in as input, or by selecting the term within a document (where entities of interest may be denoted for users via highlighting, underlining, or font colors, in order to draw a user's attention to them). Users can then explore the existing ontology of entities. For example, a user may select a Technology Element such as a material entity, e.g., polymer, and view a generated list of groupings of related systems, companies, or attributes.

In other exemplary embodiments, a variety of unsupervised or semi-supervised machine learning algorithms such as Latent Semantic Analysis, Latent Dirichlet Allocation ("LDA"), Hierarchical Topic Models, clustering algorithms, or Paragraph2vec are used to generate output creating connections between a user selected entity and other related entities or concepts. For example, in exemplary embodiments, LDA is used on the set of documents that contain the user selected entity to generate a list of topics contained within. It is appreciated that a number of different LDA models can be generated, enabling a user to choose the model that has the move even distribution of documents to topics. It is also appreciated that the desired distributions may be manually set, for example, but not limited to, setting the number of topics to 10% of documents if there are fewer than 500 documents, 5% if there are fewer than 1,000 documents and to 1% of documents if there are more than 1,000 documents. In exemplary embodiments, the list of words within each topic is then shown to a user or a label is assigned to each topic. In some embodiments, labels are creating using the first appearing bi-gram in the list of words in the topic or a combination of the first two or more words if no bigrams exist. The list of topics is then output and displayed to the user and the user could click on a topic to view the documents that relate to that topic ordered by the percentage of the document that is estimated by the LDA model to relate to that topic. In other exemplary embodiments, the user can choose a filter percentage and only view documents that contain or relate to that topic in the specified percentage.

Figure 14:
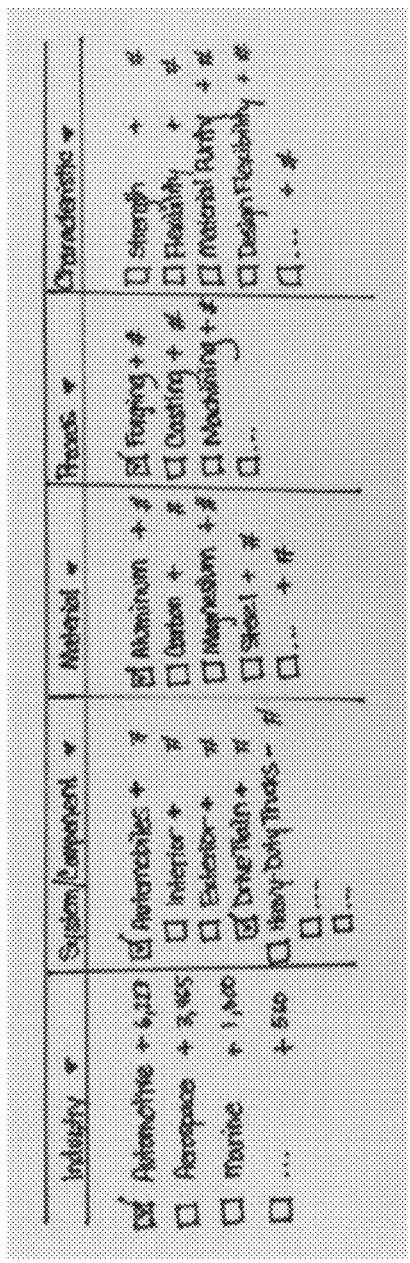
FIGS. 14-16 show exemplary user interfaces.

In some exemplary embodiments, a display like FIG. 14 is presented on a computer display in response to user input. In its most basic form, the display of FIG. 14 presents to the user, in response to user input, various categories of Technology Elements, with the highest scoring Technology Elements being displayed in ranked order by problem intensity (as discussed herein), perhaps being presented along with a numerical representation of problem intensity. In some exemplary embodiments, the Technology Elements are displayed in ranked order by the number of documents associated with the Technology Element. Clicking on any single one of the Technology Elements presented brings up a new display, e.g., the text of the highest-scored problem kernels or problem elements corresponding to the selected Technology Element. FIG. 14 also provides a user interface that allows a user to select a subset of the presented Technology Elements and actuate a user interface element, e.g., an icon (not shown), which causes the system to present a display corresponding go the selected Technology Elements, e.g., the text of the highest-scored problem kernels or problem elements corresponding to the selected plurality of Technology Elements.

In other exemplary embodiments, when the user selects a filter, and actuates a user interface element, e.g., an icon (not shown), it causes the system displays all of the documents corresponding to the selected Technology Elements. In other exemplary embodiments, when the user selects a filter, the system displays all of the documents corresponding to the selected Technology Element ranked by problem intensity. In other exemplary embodiments, the numbers next to each Technology Element or industry update automatically when a user makes a selection. For example, when the user selects "automotive," the documents being used to generate the problem intensity or other metric are limited to only documents associated with the "automotive" industry, so the metrics associated with other Technology Elements will change (e.g., flexibility may be mentioned infrequently or not at all in the "automotive" industry compared to other industries, so the associated problem intensity metric would be lower and the characteristic may appear in fewer documents). In some exemplary embodiments, the order of the other lists may also change as the metrics change, in order to maintain listing by the metric, e.g., problem intensity. Said differently, the display of FIG. 14 can be described as a cascading set of filters, where a user can choose what she or he wants to filter on and then the metrics shown will update to reflect the cross table of the user selected filters by each of the related other elements. For example, the system can present simply five lists (applications, processes, materials, and characteristics) of the Technology Elements or related concepts in order of their "problem intensity," or the user can choose to limit it by checking certain boxes.

Figure 13:
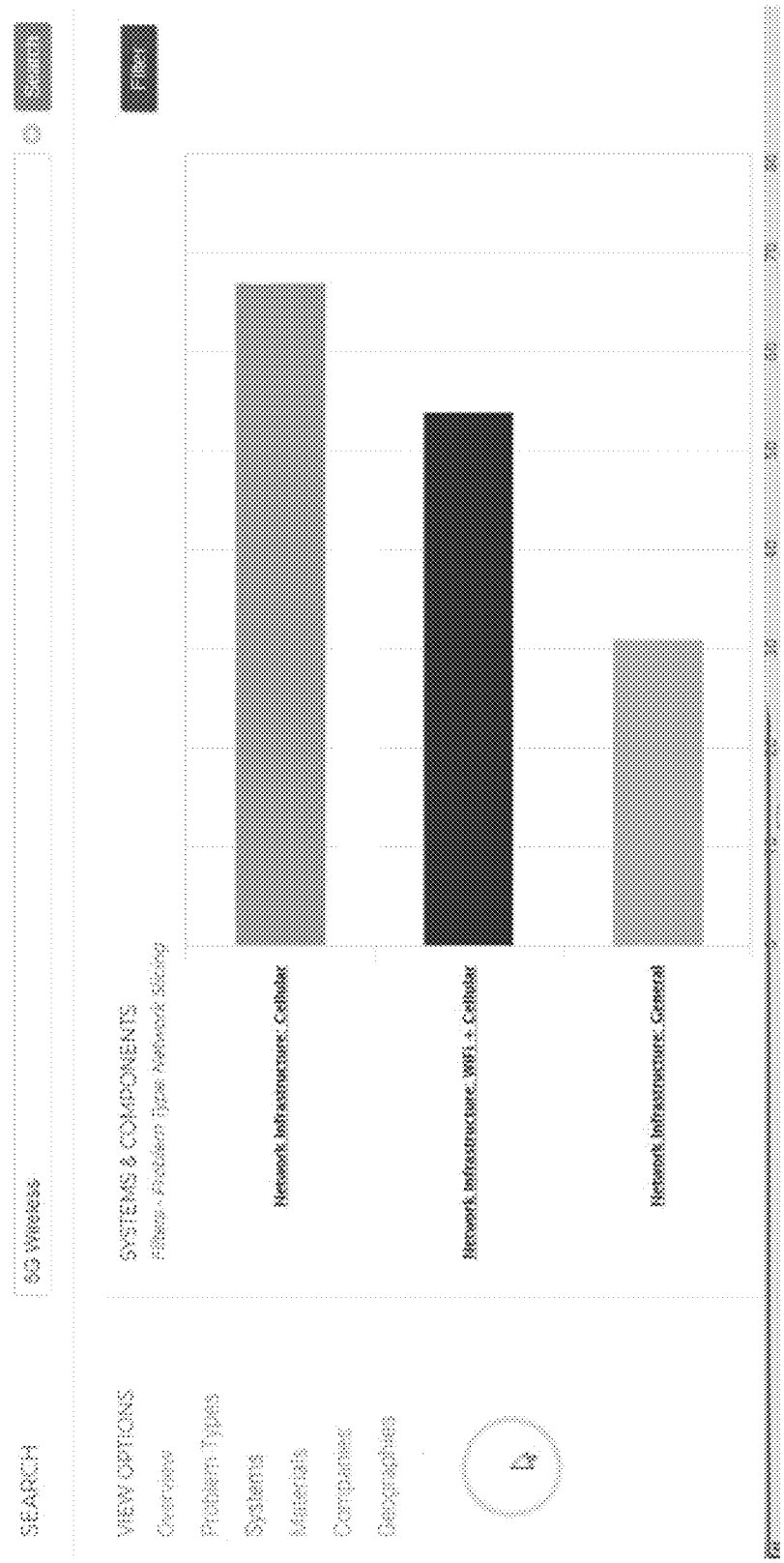
FIG. 13 is another exemplary display.
Figure 15:
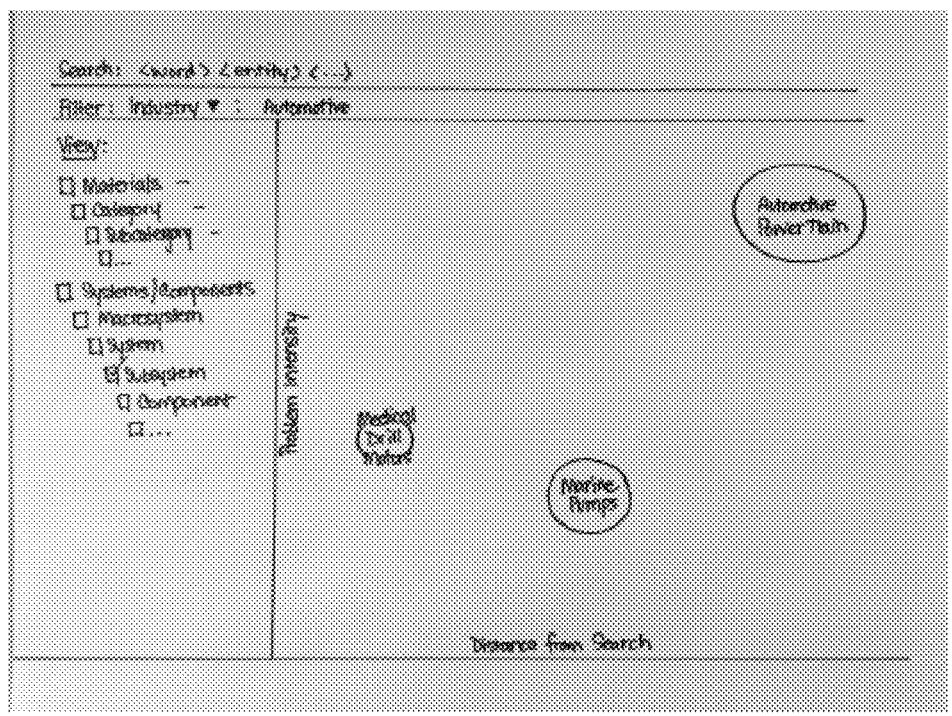
Figure 16:
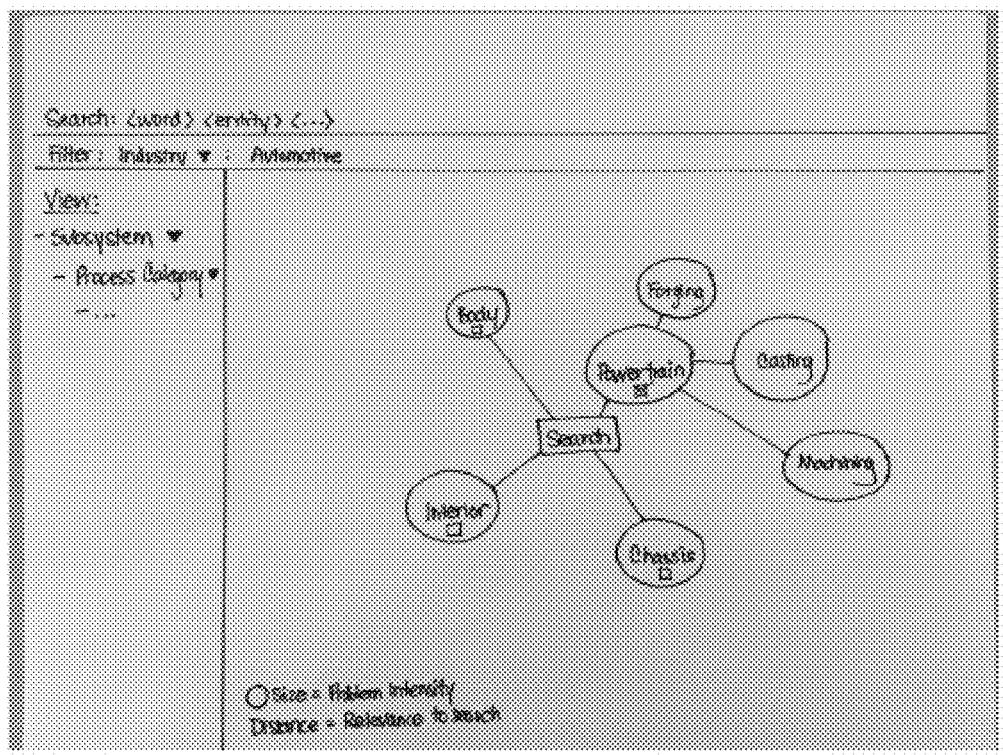

In some exemplary embodiments, a display like FIG. 15 is presented on a computer display in response to user input. This display presents another way to view problem kernels or problem elements by looking at individual Technology Elements, their problem intensity, and their problems' relevance/distance from the core search. In some exemplary embodiments, a display like FIG. 16 is presented on a computer display in response to user input. This display presents a network bubble map for exploring a technology element ontology or frequently co-occurring Technology Elements. This can allow the user to quickly uncover a number of systems, materials, processes, or characteristics related to their search. In other exemplary embodiments, FIG. 16 displays Technology Elements related to a problem kernel or problem element. This allows a user to quickly discover other Technology Elements, e.g., systems, materials, processes, that are experiencing the same or substantially similar problems. FIG. 13 shows an exemplary user view where a user has performed a search for "5G Wireless", clicked on a problem element ("Network Slicing"+"5G Wireless") and is now viewing the application Technology Elements associated with the problem element. In this example, the metric being shown to the user is the number of documents referencing both the application Technology Elements and the problem element.

According to exemplary embodiments, search logic scores the documents or subsets of the documents to identify problem kernels or problem elements associated with the user query search terms (or other user input) that mention Technology Elements. Thus, in exemplary embodiments, the exemplary method of FIG. 3 includes at 36 identifying Technology Elements associated with user input and at 38 automatically with a computer analyzing and scoring documents or subsets of documents (or a selected subset thereof) based on the Technology Elements associated with user input within or proximate problem kernels. In some exemplary embodiments, red flag words are used by the search logic to rank problem kernels or documents with such words higher priority (more likely the user will see them). In other exemplary embodiments, the degree of negativity of problem kernels (as identified by a sentiment analyzer) is used by search logic to assign problem kernels or documents higher or lower priority. In some exemplary embodiments, scoring is based on a measure of sentiment of different problem elements in the document, or sentiment associated with Technology Elements of the most interest.

Figure 18:
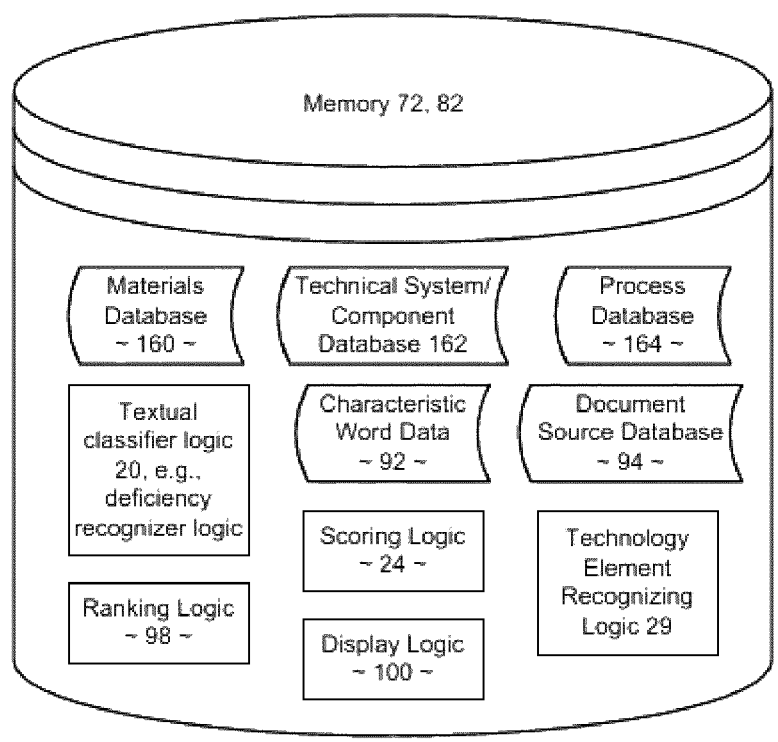
FIG. 18 is a schematic diagram of exemplary data storage devices herein.

In some exemplary embodiments, scoring is based on "problem intensity" as described above. For example, in FIG. 17, a user is viewing the number of documents in each time period (here in months), by their aggregate problem intensity. In other exemplary embodiments, the user could view documents based on their average problem intensity. In some exemplary embodiments, scoring is based on any two or more of the scoring methodologies discussed herein. In some exemplary embodiments, scoring is based on relevance based on user query input or a subset thereof. With reference to FIG. 18, scoring is done by textual classifier logic, e.g., deficiency recognizer logic, 20 and/or search logic 24 having computer code causing a processor of one of the computers 14, 16, 20, 22, 23, 24, 29, 160, 162, 164 to analyze and score the documents or subset of documents.

In some exemplary embodiments, scoring is done in two phases: (a) automatically identifying at least one problem kernel in each document and (b) scoring each problem kernel based on at least Technology Elements associated with user search input (and/or synonyms) in that problem kernel and/or in other parts of the document (and/or based on data external to the document, as discussed herein). In some exemplary embodiments, some of the user query input is "boosted" or scored higher than other parts of the user query input. Elasticsearch boosting can be used to create multiple levels of "boosting" for user input query. Automatically identifying problem kernels in each document facilitates display of individual unmet technical needs and/or technical problems to a user to provide additional context, i.e., in exemplary systems, the problem kernels are displayed to a user analyzing individual documents or individual unmet technical needs and/or technical problems. It is appreciated that, in exemplary embodiments, problem kernels are displayed as the identified problem kernel sentences as recognized by the Deficiency Recognizer, as entire paragraphs containing the problem kernel sentence, or as a summarized paragraph using a text summarization algorithm. The term "text summarization algorithm" as used herein refers to a method where, for a given subset of a document, sample clauses or sentences that best describe the subset are selected or combined to create a new piece of text that has fewer characters, words, clauses, and/or sentences than the original subset of the document. Many methods can be used including TextRank, LexRank, and sequence-to-sequence (seq2seq) neural networks. Display of the problem kernels may vary according to user preference.

In exemplary embodiments, the scored documents or problem kernels are ranked (to identify candidate documents) based on their score vis-à-vis the score of other documents or problem kernels. In some exemplary embodiments, the ranking of the documents is done based on their highest-scored problem kernel or highest-scored pair of sequential problem kernels. In some exemplary embodiments, the ranking of the documents is done based on their highest-scored problem kernel. In some exemplary embodiments, a user interface provides a user with options for ranking the documents and/or problem kernels, e.g., radio buttons for one of highest document score, highest-scored paragraph, or highest-scored pair of sequential paragraphs, highest-scored problem kernel, highest-scored pair of sequential problem kernels, etc. It is appreciated that ranking is accomplished by ranking logic (98 in FIG. 18) having computer code causing a processor of one of the computers 14, 16, 20, 22, 23, 24, 29, 160, 162, 164 to rank the documents or subset of documents based on ranking criteria input by the user.

With reference to FIG. 3, at 40, the method includes storing on a data storage device data corresponding to at least some of the identified documents or problem kernels associated with the user search input. In other embodiments, at step 40, at least some of the identified documents or problem kernels associated with the user search input are displayed on a computer display and/or printed in a report, as described herein.

In exemplary embodiments having a display, a user interface is provided for users using computers 16 to view the ranked candidate documents, subsets of the documents, or problem kernels, at 42. In some exemplary embodiments, the scored candidate documents are ranked highest-ranked documents or problem kernels first. In some exemplary embodiments, the text of individual documents, subsets of the documents, or problem kernels are displayed differently according to their characterization, for example, but not limited to, displaying words associated with Technology Elements in a different manner than words not associated with Technology Elements. Different types of display can be accomplished, for example, without limitation, by varying the font, color, size, or highlight of a word according to its characterization. Thus, in some embodiments, query input words are shown in one set of display characteristics (such as bolded black display text), some Technology Elements, e.g., applications, are shown in a different set of display characteristics (such as bold/underline red display text), and other Technology Elements, e.g., characteristics, are shown in a different set of display characteristics (such as bolded blue display text). An example of this is shown in FIG. 19, which shows an exemplary problem kernel from US patent application publication number US2007/0238067A1. As can be seen, a display like that of FIG. 19 allows one to quickly notice that this document identifies a technical issue or technical problem, i.e., the need for elastomeric hand piece components that will withstand repeated sterilizations with increased resistance to degradation. In some exemplary embodiments, a user interface provides a user with options (such as font color and other text attributes) for displaying the documents, e.g., radio buttons for each type of word, e.g., ordinary text, query-meeting text, Application Technology Elements, Characteristic Technology Elements, Material Technology Elements, Process Technology Elements, Scalar Technology Elements, nouns, synonyms, document specific words, etc. In all these embodiments, the display is generated by display logic (100 in FIG. 18) having computer code causing a processor of one of the computers 14, 16, 20, 22, 23, 24, 29, 160, 162, 164 to display the candidate documents based on display criteria input by the user.

In exemplary embodiments, the user interface will also provide means for a user to move from one ranked, scored document or problem kernel to the next, e.g., (a) computer code accepting left and right arrows on a keyboard or up and down arrows in a keyboard to move back and forth between ranked, scored documents or (b) computer code generating a graphical user interface that accepts inputs from a pointing device, such as a mouse or a finger on a fact sensitive input device, such as "previous" and "next" icons or (c) computer code implementing a voice-activated interface or (d) computer code implementing a gesture-recognition interface. In some exemplary embodiments, the user interface will also provide means for a user to flag a particular ranked, scored document or problem kernel to separate flagged documents from un-flagged documents, e.g., a keyboard key, or an icon, or a specific voice command or gesture (using the user interface computer code). In some exemplary embodiments, an interface is provided for a user to search Technology Elements and/or document classifications.

FIGS. 20-23 show exemplary user interfaces. FIG. 20 shows an exemplary basic search user interface containing a data field in which a user may enter query terms, such as technical terms, materials, applications, processes, etc., and a Search icon with which a user executes a search and analysis with the terms entered in the data field. FIG. 21 shows an exemplary basic results display and user interface showing at least problem kernels displayed with user-selected display parameters and an icon (or other user selection user interface device). The user interface can quickly move between ranked, scored documents or problem kernel displayed as described herein, such as with the characteristics described above, moving from document to document (or from problem kernel to problem kernel) to separate wheat from chaff so to speak, i.e., identify and flag documents pertinent to the search or otherwise subject to further processing. The basic results display and user interface FIG. 21 also displays a dashboard of Search Statistics, e.g., list of top assignees, patent date range, list of top products or industries. In exemplary embodiments, items in the search box include links to additional interfaces or browser tabs and displays Search Terms, i.e., a key or legend of user-selected display parameters for the various types of words in the search, such as query words, Technology Element words, etc. FIG. 22 shows a Search Statistics display, which shows various tabs with more detailed statistics including tables and graphs of assignees, countries, problem kernels by year, products, and industries, etc. This would be used to provide additional information to the user to create more focused search queries.

FIG. 23 shows another exemplary search user interface containing:
 a. a data field in which a user may enter query terms, such as technical terms, serious issue terms, etc.,
 b. a data field in which a user may enter search-specific problem terms,
 c. user interfaces, e.g., calendar objects or drop down selection objects, permitting a user to add additional filter criteria such as document start date, document and date, companies (e.g., assignee of a patent or patent application), country of publication, normalized problem (e.g., fluid leakage), specific products (e.g., hydroelectric turbines for hand tools), specific industries (e.g., by SIC code), or other filter criteria.
 d. user interfaces, e.g., drop down selection objects, permitting a user to add sort criteria to the analysis, e.g., automatic valuation (optionally using selected valuation methodologies and/or algorithms) and/or automatically determined problem intensity (optionally using selected problem intensity determination methodologies and/or algorithms, and
 e. a Search icon with which a user executes a search and analysis with the entered terms and the selected parameters.

In exemplary embodiments, Technology Elements associated with problem kernels are displayed in a ranked list each along with a negativity score calculated, e.g., based on the degree of negativity of problem kernels associated with that Technology Element (as determined by a sentiment analyzer as described above) and/or the degree of correlation between the Technology Element and user input (using common search criteria rankings, e.g., default ElasticSearch ranking algorithms).

Figure 4:
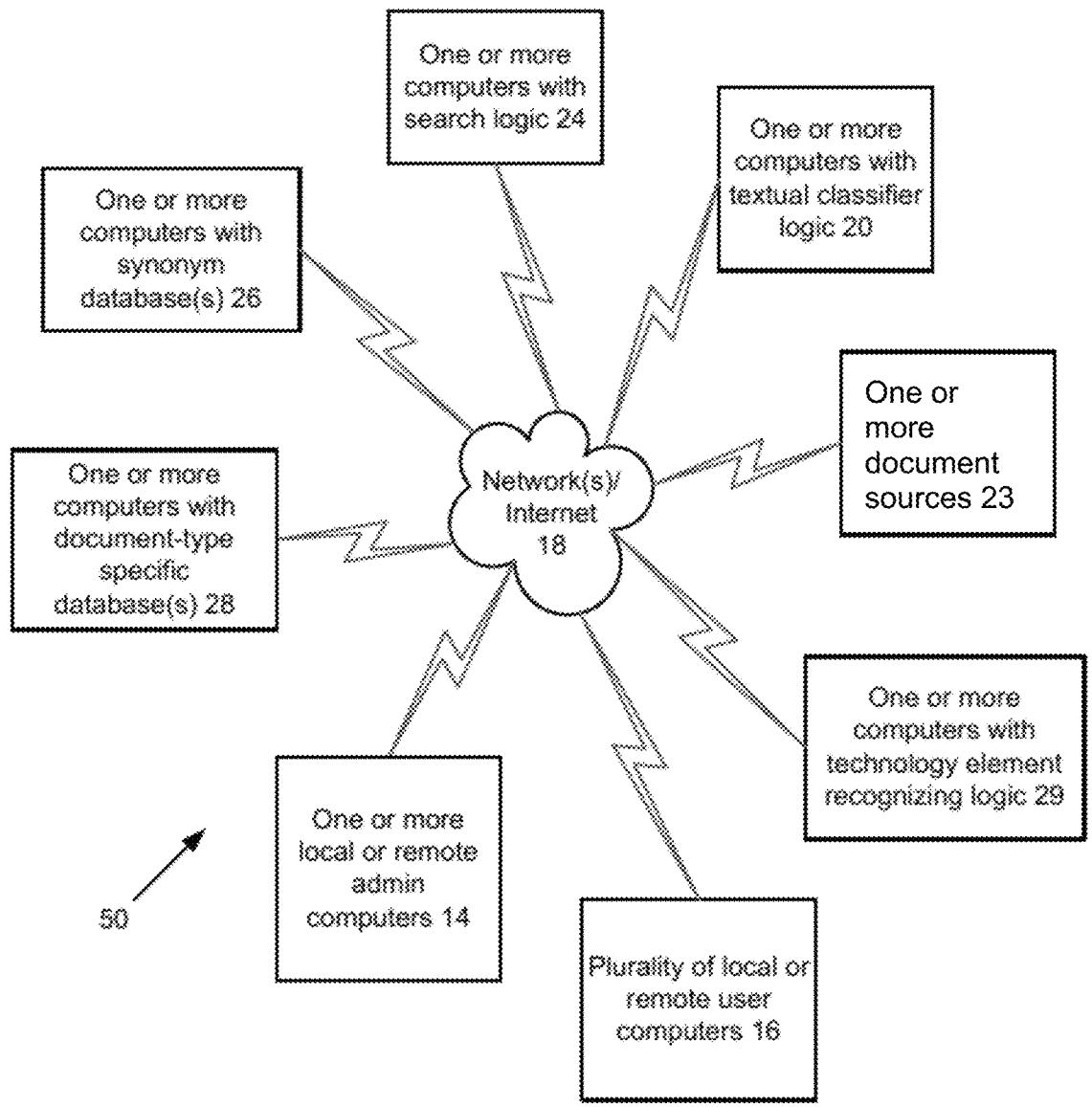
FIG. 4 is a schematic block diagram of another exemplary system.

Referring now to FIG. 4, another exemplary embodiment 50 includes (in addition to the system components shown in FIG. 1 and/or FIG. 2) one or more computers with technology element recognizing logic 29 and/or one or more computers with synonym databases 26. Thus, in some exemplary embodiments, the query search terms are expanded using the technology element recognizing logic and/or one or more synonym databases containing lists of synonyms for words at some point in the process of FIG. 3, such as expanding query words (user query input) prior to determination of problem kernels. Technology element recognizing logic 29 is described herein.

In addition, or in the alternative, exemplary embodiment 50 of FIG. 4 includes (in addition to the system components shown in FIG. 1 and/or FIG. 2) one or more computers with document-type specific databases 28. The document-type specific databases 28 include lists of words particular to specific document types and helpful for the systems and methods described herein. For example, in exemplary embodiments analyzing United States patents, the following patents-specific words would be helpful: "object of the invention," "object of the present invention," "improved," "improvement," "need for," etc. In some exemplary embodiments, document-type specific words are used during the analysis and scoring process of FIG. 3. That is, in exemplary embodiments, the candidate documents (or a selected subset thereof) are analyzed and scored based on at least negative tone, user query words, the number of negative tone Technology Elements, and the number of document-specific words (and perhaps their proximity). In some exemplary embodiments, the scoring is done by scoring every paragraph or other subset based on negative tone, user query words, Technology Elements, and the number of document-specific words (and perhaps their proximity). In other exemplary embodiments, the scoring is done by scoring every pair of (or three or four or more) sequential paragraphs or subsets based on negative tone, user query words, Technology Elements, and the number of document-specific words (and perhaps their proximity).

In some exemplary embodiments, the user interface is modified so that the document-specific words are displayed the same as the other types of words (different from other words) or document-specific words are displayed differently from the other types of words and different from other words. Thus, in some embodiments, query input words (and synonyms, if used) are shown in one set of display characteristics (such as bolded black display text), some Technology Elements (such as bold/underline red display text), other Technology Elements are shown in a different set of display characteristics (bolded blue display text), and document-type specific words are shown in a different set of display characteristics (bolded green display text). It is appreciated that other display characteristics can be used that will fall within the scope of this invention.

Figure 24:
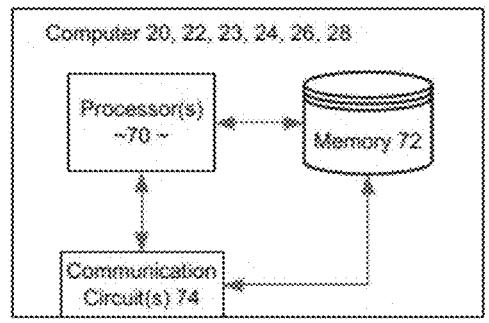
FIG. 24 is a schematic block diagram of exemplary computers herein.

Referring now to FIG. 24, exemplary computers 70, 72, 23, 74, 26, 28 are shown. The computers 70, 72, 23, 74, 26, 28 of FIG. 24 have one or more processors 70 in communication with a memory 72 and one or more communication circuits 74. Memory 72 includes one or more non-transitory computer readable media of one or more local or remote data storage devices. Data for the various computers 20, 22, 23, 24, 26, 28, 29, 160, 162, 164 and associated processes described herein can be stored on memory 72 permitting that data to be accessed by the remote user computers 16 over the networks 18 using the communication circuits 74. The software used by the computers 20, 22, 23, 24, 26, 28, 29, 160, 162, 164 to perform the various functions and processes herein can be stored on one or more data storage devices local to the computers 20, 22, 23, 24, 26, 28, 29, 160, 162, 164. Computers 20, 22, 23, 24, 26, 28, 29, 160, 162, 164 can communicate with user computers 16 and admin computers 14 and each other and other computers via network 18 utilizing, for example, a web browser or other client software stored in memory accessible by the computers 14, 16. For example, in exemplary embodiments, computers 14, 16 include client software specifically utilized for communication with computers 20, 22, 23, 24, 26, 28, 29, 160, 162, 164.

Figure 25:
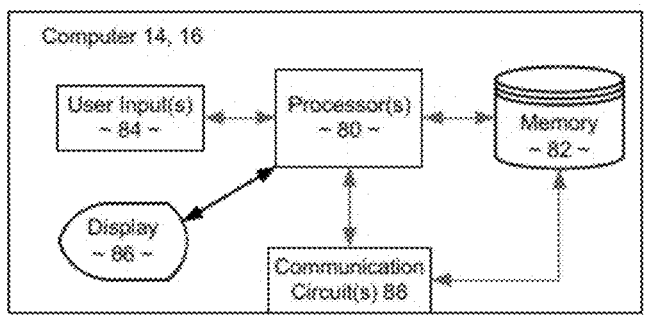
FIG. 25 is a schematic block diagram of other exemplary computers herein.

Referring now to FIG. 25, a block diagram of an exemplary computer 14, 16 is shown. Computers 14, 16 comprise one or more processors 80 in communication with a memory circuit 82, one or more user input circuits 84, a display circuit 86, and one or more communication circuits 88. Memory circuit 82 comprises one or more non-transitory computer readable media of one or more data storage devices. In the context of a handheld computer, this memory circuit might include flash memory and/or RAM and/or ROM memories. In the context of a desktop or laptop computer, this memory circuit might include one or more fixed disk drives and/or RAM and/or ROM memories. Memory circuit 82 will have stored thereon logic modules for performing the various functions and processes described herein or a program to access such logic modules from a remote memory, such as base memory 82 (e.g., a browser program to access such logic modules from memory 72 of computers 20, 22, 23, 24, 26, 28, 29, 160, 162, 164). In exemplary embodiments, user input circuits 84 include any one or more of buttons, keyboards, keys, touchpads, touchscreens, and associated support chips, and/or one or more communication circuits (e.g., RS-232 or USB) for an external keyboard or other external user input device, such as a mouse, track pad, or other pointing device, or other user input devices. In exemplary embodiments, display circuit 86 include any one or more of LEDs, NxM textual displays, matrix displays on which a graphical user interface ("GUI") can be presented, e.g., a color or monochrome liquid crystal display ("LCD") or organic light-emitting diode ("OLED") display, with associated drive chips, and/or one or more graphics circuits (e.g., VGA or HDMI) for an external display, a projection device for displaying onto a surface, or other displays. In exemplary embodiments, communication circuits 88 include antennas and/or data ports and driver chips for sending and receiving communications with devices external to the computer 14, 16. In exemplary embodiments, communication circuits 88 may include any one or more of WiFi antennas and circuitry, LTE antennas and circuitry, GPS antennas and circuitry, CDPD antennas and circuitry, GPRS antennas and circuitry, GSM antennas and circuitry, UMTS antennas and circuitry, and other antennas and circuitry, USB ports and circuitry (e.g., standard, micro, mini, etc.), RS-232 ports and circuitry, proprietary ports and circuitry (e.g., APPLE 30 pin and Lightning ports), RFID antennas and circuitry, NFC antennas and circuitry, bump technology antennas and circuitry, a Bluetooth antenna and circuitry, and other antennas, ports, circuitry, as will be apparent to those of skill in the art.

Referring now to FIG. 18, an exemplary memory 72, 82 is shown. Memory 72, 82 includes one or more non-transitory computer readable media of one or more local or remote data storage devices of one or more of computers 14, 16, 20, 22, 23, 24, 29, 160, 162, 164 having stored thereon (or having a pointer thereto stored thereon) any one or more of the following types of data and logic: textual classifier logic 20, e.g., deficiency recognizer logic, technology element recognizing logic 29, search logic 24, characteristic words data 92, e.g., in a characteristic database 22, a document source database 94, ranking logic 98, display logic 100, materials data in a materials database 160, an application database 162, and a process database 164, all discussed above. "Pointer" and "point to" as used herein in connection with data or software include, but are not limited to, storing on a non-transitory computer readable media of a data storage device one or more data indicating the location on another data storage device from where the data or software can be downloaded or otherwise accessed.

Figure 26:
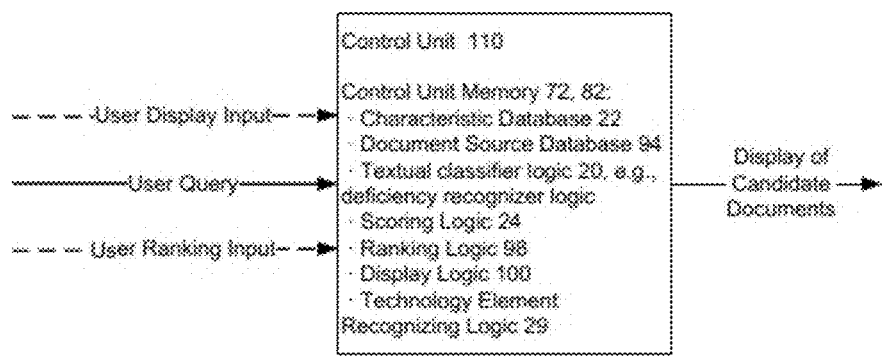
FIG. 26 is a schematic block diagram of an exemplary control unit for identifying and displaying candidate documents.

Referring now to FIG. 26, an exemplary control unit 110 is shown. The control unit 110 has one or more processors 70, 80 in communication with memory 72, 82 including one or more non-transitory computer readable media of one or more local or remote data storage devices comprising at least textual classifier logic 20, e.g., deficiency recognizer logic, a characteristic database 22, technology element recognizing logic 29, search logic 24, a document source database 94, ranking logic 98, and display logic 100, discussed herein. The control unit 110 accepts at least user query input and outputs at least a display of ranked candidate documents. In some exemplary embodiments, the control unit 110 also accepts user ranking criteria and user display criteria, discussed above.

In some exemplary embodiments, a user seeking to identify individual unmet technical needs, technical requirements, and/or technical problems performs the following (not necessarily at the same time; some of this could be done beforehand or later or by default; any subset of the steps would be used in some exemplary embodiments):

a. select one or more source document databases;
b. select a user display option, such as having the system automatically identify problem kernels, scored them, rank them, and display them using user-selected display parameters, e.g., Key Word in Context ("KWIC"), with user-selected display parameters for query words, Technology Element words, and document-specific words;
c. enter user query words into a user interface to narrow the scope of the analysis;
d. actuate a user interface object, such as an icon, initiating the automatic analysis of the documents meeting the user query criteria to automatically identify problem kernels using, e.g., deficiency recognizer;
e. examine on a computer display one or more problem kernels displayed using the user-selected display parameters;
f. actuate a user interface object, such as an icon, flagging the presently displayed problem kernel or a selected problem kernel as pertinent to the search or otherwise subject to further processing in causing the system to display the next problem kernel display;
g. actuate a user interface object, such as an icon, flagging the presently displayed problem kernel or a selected problem kernel as not pertinent to the search or otherwise not subject to further processing or to simply skip to the next problem kernel display;
h. actuate a user interface object, such as an icon or clicking on the problem kernel being displayed or a selected problem kernel to cause the system to display more of the document associated with that problem kernel, such as surrounding paragraphs or the entire document, optionally using user-selected display parameters; and
i. actuate a user interface object, such as an icon, causing the system to list or export the flagged problem kernels.

The systems and methods of the present application are generally directed toward finding individual unmet technical needs, technical requirements, and/or technical problems for specific technologies, i.e., the user query input. The described embodiments are not so limited and can be used to analyze a corporation for a potential supplier, partner, or acquirer, identify problems a companies' customers are experiencing, identify problems a companies' competitors have worked on, etc.

In some exemplary embodiments, a user seeking to identify the unmet technical needs and/or technical problems of a specific corporation performs the following (not necessarily at the same time; some of this could be done beforehand or later or by default; any subset of the steps would be used in some exemplary embodiments):
a. select one or more source document databases;
b. select a user display option, such as having the system automatically identify problem kernels, scored them, rank them, and display them using user-selected display parameters, e.g., KWIC with user-selected display parameters for query words, Technology Element words, and document-specific words;
c. enter user query words into a user interface to narrow the scope of the analysis, such as one or more corporations or normalized assignee codes and optionally a technical area (which technical area might correspond to a particular business unit of the specific corporation);
d. actuate a user interface object, such as an icon, initiating the automatic filtering of the documents using the user query words and automatic analysis of the documents meeting the user query criteria, including filtering the documents based on being owned by, authored by, or mentioning the specific corporation, to automatically identify problem kernels;
e. examine on a computer display one or more problem kernels of the corporation displayed using the user-selected display parameters;
f. actuate a user interface object, such as an icon, flagging the presently displayed problem kernel or a selected problem kernel as pertinent to the search or otherwise subject to further processing in causing the system to display the next problem kernel display;
g. actuate a user interface object, such as an icon, flagging the presently displayed problem kernel or a selected problem kernel as not pertinent to the search or otherwise not subject to further processing or to simply skip to the next problem kernel display;
h. actuate a user interface object, such as an icon or clicking on the problem kernel being displayed or a selected problem kernel to cause the system to display more of the document associated with that problem kernel, such as surrounding paragraphs or the entire document, optionally using user-selected display parameters; and
i. actuate a user interface object, such as an icon, causing the system to list or export the flagged problem kernels for that corporation.

In some exemplary embodiments, a user seeking to identify the unmet technical needs and/or technical problems associated with a specific technology area may perform the following (not necessarily at the same time; some of this could be done beforehand or later or by default; any subset of the steps would be used in some exemplary embodiments):
a. select one or more source document databases;
b. select a user display option, such as having the system return results as documents, document subsets, problem kernels, problem elements, etc., whether to show specific fields, labels, or highlighted keywords, concepts, etc., and/or whether to sort or visualize results according to various metrics;
c. enter user query words into a user interface to narrow the scope of the analysis, such as one or more technical areas, e.g., elastomers, fiber-reinforced polymers, etc.;
d. actuate a user interface object, such as an icon, initiating the automatic filtering of the documents using the user query words and automatic analysis of the documents meeting the user query criteria, including filtering the documents based on being owned by, authored by, or mentioning the specific corporation, mentioning specific technology or problem elements, mentioning specific industries, etc.;
e. examine on a computer display one or more documents, document subsets, problem kernels, Technology Elements, problem elements, etc. of the search topic displayed using the user-selected display parameters;
f. actuate a user interface object, such as an icon, flagging the presently displayed document, document subset, problem kernel, or problem element, as pertinent to the search or otherwise subject to further processing in causing the system to display the next result;
g. actuate a user interface object, such as an icon, flagging the presently displayed document, document subset, problem kernel, or problem element as not pertinent to the search or otherwise not subject to further processing or to simply skip to the next result;
h. actuate a user interface object, such as an icon or clicking on the document, document subset, problem kernel, or problem element displayed or selected to cause the system to display more data associated with the result, such as associated text sources, associated documents, additional text within the document, associated industries, companies, etc., problem trend, etc. and optionally using user-selected display parameters; and
i. actuate a user interface object, such as an icon, causing the system to list or export the flagged problem kernels or problem elements for that technical area of interest.

In some exemplary embodiments, a user seeking to identify the unmet technical needs and/or technical problems associated with a specific company or organization or subset of companies or organizations, e.g., a current/potential customer or set of current/potential customers, a current/potential supplier/partner or set of current/potential suppliers/partners, or a current/potential competitor or set of current/potential competitors, may perform the following (not necessarily at the same time; some of this could be done beforehand or later or by default; any subset of the steps would be used in some exemplary embodiments):

a. select one or more source document databases;
b. select a user display option, such as having the system return results as documents, document subsets, problem kernels, problem elements, etc., whether to show specific fields, labels, or highlighted keywords, concepts, etc., and/or whether to sort or visualize results according to various metrics;
c. enter user query words into a user interface to narrow the scope of the analysis, such as one or more companies or organizations, one or more industries, etc.;
d. actuate a user interface object, such as an icon, initiating the automatic filtering of the documents using the user query words and automatic analysis of the documents meeting the user query criteria, including filtering the documents based on being owned by, authored by, or mentioning the specific corporation(s) or organization(s) with specific financial, demographic, geographic metrics, etc. mentioning specific technology or problem elements, mentioning specific industries, etc.;
e. examine on a computer display one or more documents, document subsets, problem kernels, Technology Elements, problem elements, etc. of the search topic displayed using the user-selected display parameters;
f. actuate a user interface object, such as an icon, flagging the presently displayed document, document subset, problem kernel, or problem element, as pertinent to the search or otherwise subject to further processing in causing the system to display the next result;
g. actuate a user interface object, such as an icon, flagging the presently displayed document, document subset, problem kernel, or problem element as not pertinent to the search or otherwise not subject to further processing or to simply skip to the next result;
h. actuate a user interface object, such as an icon or clicking on the document, document subset, problem kernel, or problem element displayed or selected to cause the system to display more data associated with the result, such as associated text sources, associated documents, additional text within the document, associated industries, companies, etc., problem trend, etc. and optionally using user-selected display parameters; and
i. actuate a user interface object, such as an icon, causing the system to list or export the flagged problem kernels or problem elements for that technical area of interest, and/or the specific companies that have most mentioned that problem kernel or problem element.

Figure 27:
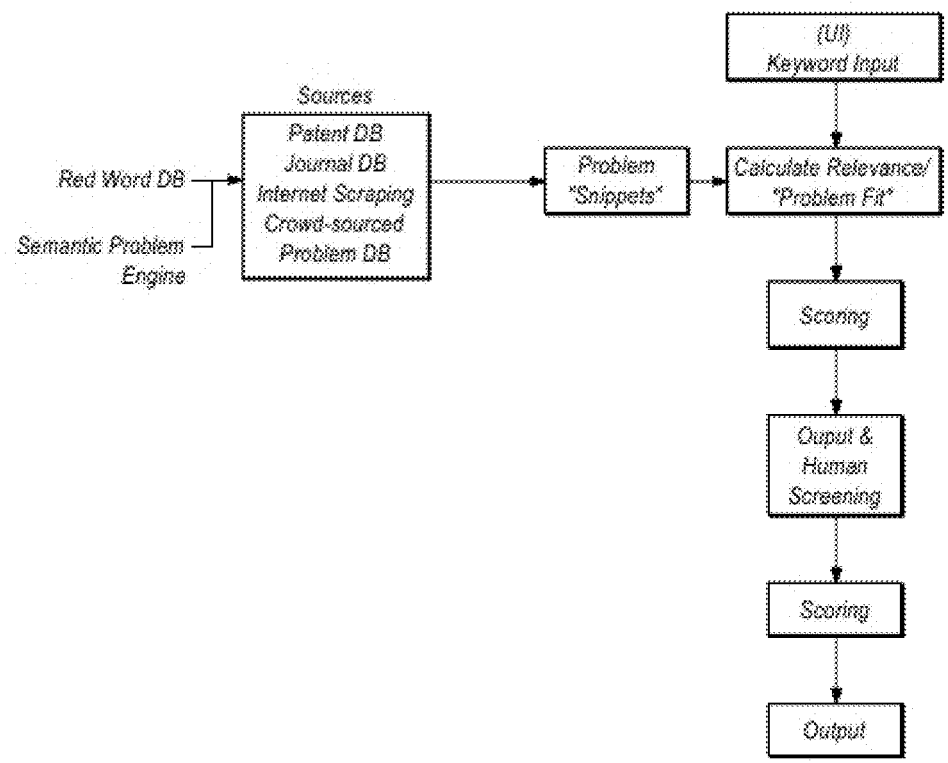
FIG. 27 is a data flow diagram for exemplary embodiments.

Referring now to FIG. 27, a data flow diagram is shown for other exemplary embodiments. In this embodiment, potentially high value opportunities across virtually all technologies are automatically identified. In FIG. 27, the semantic engine corresponds to the search logic 24, described above. The various sources correspond to numerous document source databases 94 and the problem kernels correspond to the various portions of ranked, scored documents (with scores above a certain threshold), such as the problem kernels of key words in context (KWIC) text shown in FIG. 19. In an embodiment of FIG. 27, however, the problem kernels are not displayed to a user until later in the process. In contrast with the method shown in FIG. 3, the system of FIG. 27 identifies many problem kernels (perhaps across numerous technologies) which are further processed before being displayed to a user. In the area labeled calculate relevance/problem fit, a computer automatically (algorithmically) analyzes the identified problem kernels (or the entire text of the highest ranked documents) to determine which have the highest relevance or fit a particular user query the best. In exemplary embodiments, this is accomplished using any one or any two or more of the following: Keyword Search, TF-IDF (Term Frequency-Inverse Document Frequency), Co-Occurrence, and Topic Modeling approaches like LDA (Latent Dirichlet Allocation), etc. Exemplary systems use the Keyword Search and to identify which problem kernels include the keywords included in the user's query and sorting problem kernels by the frequency of the keyword's occurrence. Exemplary systems use the TF-IDF algorithm to automatically calculate relevance/problem fit as follows: searching for the frequency queried keywords in problem kernels and, prior to sorting problem kernels, weighting key words in the query more or less based on how common they are within problem kernels in the corpus, combining the TF-IDF scores of each query term within a document (e.g., by summing) to obtain a final TF-IDF score for the document then sorting based on the final TF-IDF score. Exemplary systems use the Co-Occurrence method to automatically calculate relevance/problem fit as follows: analyzing the corpus of problem kernels and creating a co-occurrence matrix containing each unique word in the problem kernel corpus (where a unique word appears in less than a certain percentage of the documents, e.g., 50%) and the frequency that other unique words in the corpus co-occur with that word within a pre-defined proximity (e.g., within the same sentence or paragraph), and then identifying problem kernels with words that co-occur with the queried keywords, and sorting them based on the number of co-occurring words and their frequency.

Another exemplary system uses a variant of the Co-Occurrence method where one axis of the co-occurrence matrix is Technology Elements and the frequency that each unique word in the corpus co-occurs with each Technology Element is recorded, and then identifying problem kernels that contain Technology Elements that co-occur with the queried keywords, and sorting the problem kernels based on the number of co-occurring Technology Elements and their frequency. Exemplary systems use Topic Modeling approaches, such as Latent Dirichlet Allocation (LDA) to automatically calculate a relevance or problem fit as follows: analyzing the corpus of problem kernels, clustering co-occurring words in those problem kernels into topics, creating a matrix of topics containing, for each topic, the words associated with that topic and their frequency of co-occurrence, identifying the topics associated with the queried keywords based on the frequency of the keywords in those topics, and then identifying problem kernels that contain the most words with the highest frequency to the various topics. The output of this step is a list of the problem kernels/documents with a corresponding relevance score and/or problem fit score.

As shown in FIG. 27, problem kernels or documents are scored (and ranked) and then displayed to the user, for example, FIG. 19. The human screening in FIG. 27 corresponds to the user flagging documents of particular interest, e.g., flagging documents that actually describe relevant technical issues, described above. The screened (flagged) problem kernels or documents are next scored using any one or any two or more of the following: automated calculation of problem intensity, user's assessment of the likely severity or importance of the kernels, the average sentiment of the problem kernel, relevance to the user search query, likely market size and growth of the system/industry, etc. As shown in FIG. 27, these flagged problem kernels or documents are then scored (and ranked) and then displayed to the user, for example, FIG. 19. Thus, the system of FIG. 27 can be used to identify potentially high value technical issues across numerous technologies. In exemplary embodiments, problems can be aggregated as follows to allow for calculation of a problem intensity score, e.g.: Cooperative Patent Classification (CPC) analysis (analysis of all patents/applications with the same CPC as a document of interest or a document containing a problem kernel), correlated problem kernel analysis (analysis of all patents/applications expressing substantially the same problem kernel, as discussed elsewhere herein), assignee analysis, etc.

In exemplary embodiments, trends over time are automatically calculated and analyzed over N years, e.g., five or ten or twenty years, for trends, such as, but not limited to, steadily increasing year after year, steadily decreasing year after year, cyclic, periodic with an approximate period of N, periodic with an approximate period of N (and currently rising or falling based on the period and most-recent data), steadily persistent problem over the years, random changes, follows one or more economic indicators, inversely related to one or more economic indicators, follows the average of all documents, inversely related to the average of all documents, mostly assigned to individuals, mostly assigned to universities, at the beginning of the relevant period mostly assigned to individuals and at the end of the relevant period mostly assigned to corporations, at the beginning of the relevant period assigned to universities and at the end of the relevant period assigned to corporations, numbers of documents across all document types, numbers of documents of only one document type (e.g., journals but not patents), in specific document types (in conference proceedings or in news articles), etc. In exemplary embodiments, a user interface provides a user with the ability to selectively choose one or more of all these options, e.g., increasing trends being weighted higher from a problem intensity standpoint, trends with the highest recent growth rates, trends which are increasingly associated with corporations, etc. which can increase the likelihood a particular problem kernel will be scored high enough rise to the point that it is displayed, depending on user display settings.

In yet another embodiment of FIG. 27, the system is more focused, i.e., identify potentially high value technical issues in a single technical area, e.g., by limiting the result set using a user query. The optional user interface (UI), e.g., keyboard input corresponds to a user query input, can be used to filter the problem kernels.

Figure 28:
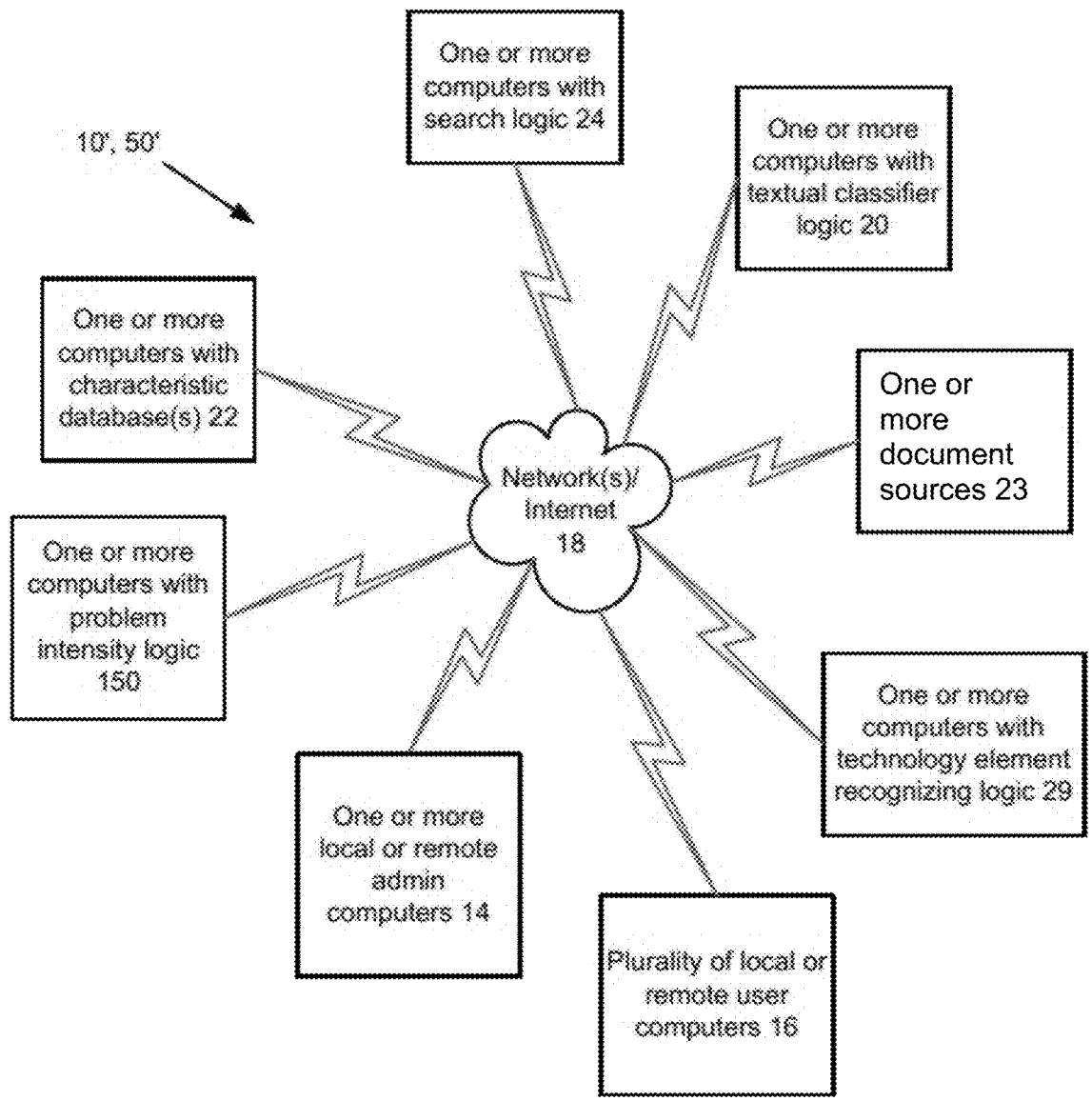
FIG. 28 is a schematic block diagram of another exemplary system.

As shown schematically in FIG. 28, in some exemplary embodiments, the systems 10, 50 also include one or more computers with problem intensity logic 150. In general, problem intensity logic 150 analyzes documents and determines the magnitude of problem kernels. In exemplary embodiments, problem kernels with a higher intensity are more relevant than problem kernels with a lower intensity, i.e., technical issues with a higher intensity might indicate a higher need in the marketplace or simply a bigger market for any solution to that technical issue. In general, problem intensity logic 150 analyzes problem kernels or documents in the aggregate, determining which problem kernels or documents contain the most intense problems, i.e., the problems that may be most valuable to solve. In some exemplary embodiments, problem intensity logic 150 calculates problem intensity by any one of or any two or more of: the average number of documents in a given problem area over a time period, the growth and/or persistence/recency of documents over that time period, the commercial relevance associated with different types of document sources, the importance of the specific sources/publications, the importance of the specific companies/organizations that are actively discussing these topics, etc. In exemplary embodiments, a value representing the average number of documents in a given problem area over a time period is automatically calculated as follows: after normalizing data via standard deviation from the mean of the entire dataset in the database, the average number of documents in a given problem area over a time period, e.g., 1, 5, 10, or N years, can be calculated. In exemplary embodiments, a value representing the growth and/or persistence/recency of documents over that time period is automatically calculated as follows: after normalizing data via standard deviation from the mean of the entire dataset in the database, the change in the number of documents in a given problem area over a time period, e.g., 1, 5, 10, or N years, can be calculated over the entire time period or compared to recent changes in number of documents. In exemplary embodiments, a value representing the commercial timing associated with different document types (e.g., patents, scientific journals, financial documents) is calculated as follows: each document type is analyzed for its correlation between publication date for a given topic and the dates of first relevant commercial activity and scored with a relative value. In exemplary embodiments, a value representing the commercial relevance associated with different types of document sources is calculated as follows: each document type (patents, scientific journals, etc.) is analyzed for its correlation between publication activity for a given topic and the likelihood of relevant commercial activity and scored with a relative value, the total value is then scaled with respect to the total number of documents, if desired. In exemplary embodiments, a value representing the number and importance of the specific companies/organizations that are actively discussing these topics is automatically calculated using one or more combinations of the number of companies publishing, the average revenues or market capitalizations of the companies publishing, their approximate market shares in select industries, etc. (e.g., the number of public companies active in the area; one can also use the company revenues or market caps to scale this number further). Some of the foregoing rely on normalization of problem kernels and aggregation of problem kernels, i.e., recognizing that two different problem kernels in two different documents actually present essentially the same technical problem or unmet technical need (normalizing them) and aggregating the documents presenting essentially the same technical problem or unmet technical need, e.g., by adding data to a field in each indicating that they present essentially the same technical problem or unmet technical need or by linking the documents as being related or by simply incrementing a counter for that normalized technical problem or unmet technical need. In some exemplary embodiments, automatically recognizing that two different problem kernels in two different documents actually present essentially the same technical problem or unmet technical need is done using the correlation algorithms discussed herein. All of the algorithms herein have processor code associated therewith the cause the one or more processors to use the algorithm to analyze the documents or data as indicated.

In some exemplary embodiments, problem intensity logic 150 is used upstream of any user flagging to filter documents as part of the upstream processes before ranked, scored documents (candidate documents) are shown to a user or flagged by a user. In other exemplary embodiments, problem intensity logic 150 is used downstream of a user flagging documents to rank flagged candidate documents (i.e., rank documents flagged by a user as indicating a relevant problem) by the intensity of the problem. In still other exemplary embodiments, problem intensity logic 150 is used both upstream and downstream of a user flagging documents to both filter documents by problem intensity and rank flagged candidate documents by problem intensity.

Figure 29:
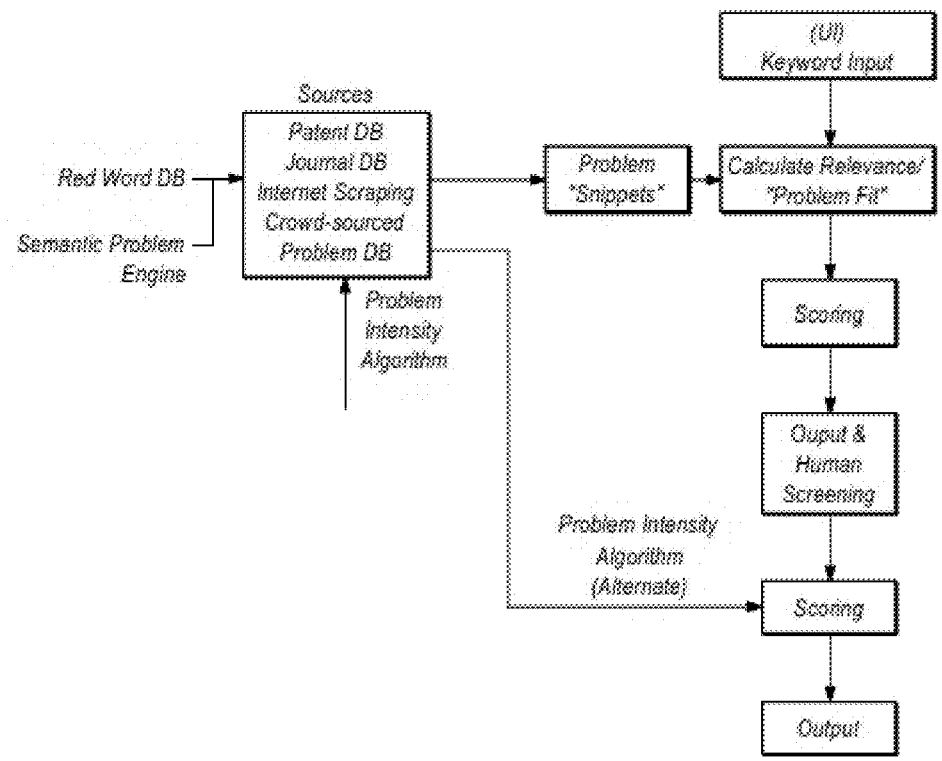
FIG. 29 is another data flow diagram for other exemplary embodiments.

FIG. 29 is the same as FIG. 27, described above, except it includes the use of problem intensity logic 150 at one or two points in the process. Referring now to FIG. 29, problem intensity logic 150 is used either upstream, or downstream, or both upstream and downstream of a user flagging documents to both filter documents by problem intensity and rank flagged candidate documents by problem intensity.

In some exemplary embodiments, the user query is input by a user using a structured inquiry. For example, the following set of structured questions would typically yield a more helpful user query word set than a wide-open search field: What do you sell? What kind? What is special about yours? What else is special about yours? An exemplary session might include:

What do you sell? Polymers
What kind? Elastomers
What is special about your elastomers? Temperature stability
What else is special about your elastomers? Abrasion resistance
What else is special about your elastomers? Done Accordingly, the terms elastomer, temperature stability, abrasion resistance (and perhaps synonyms) would be used as a query to filter the documents (or problem kernels) at any of the various parts of the various respective processes. Some embodiments herein optionally use structured questions leading to robust user query data.

In some exemplary embodiments, a user inputs more than several words to initiate the search, such as a paragraph or paragraphs of text and/or one or more entire documents, e.g., input a patent or group of patents (or applications), a selected portion of text, or product specifications sheet, as the starting point for the search. In response, the system will analyze the text within that input, recognize the Technology Elements in the input text or documents, identify the most related other Technology Elements in the database, and generate a display to the user (or save the results to a data storage device and/or print the results in a report).

In some exemplary embodiments, a user inputs the name of an entity (e.g., company, organization, or individual) to initiate the search. In response, the system will analyze the text of all documents associated with the entity (e.g., authored by or containing the entity name), recognize the Technology Elements in the entity-related documents, identify the most related other Technology Elements in the database, and generate a display to the user (or save the results to a data storage device and/or print the results in a report). In other exemplary embodiments, a user inputs the name of an entity, the system analyzes the text of all documents associated with the entity, recognizes the Technology Elements in the entity-related documents, identifies problem kernels that contain those Technology Elements, and then generates a display to the user (or saves the results to a data storage device and/or prints the results in a report).

In some exemplary embodiments, a user seeking to identify high-value unmet technical needs, technical requirements, and/or technical problems performs the following (not necessarily at the same time; some of this could be done beforehand or later or by default; any subset of the steps would be used in some exemplary embodiments):

a. select one or more source document databases;
b. select a user display option, such as having the system automatically identify problem kernels, scored them, rank them, and display them using user-selected display parameters, e.g., KWIC with user-selected display parameters for query search terms, Technology Elements, and document-specific words;
c. using a user-interface, select filtering criteria, including the problem type, optionally, the intensity of the problem kernel, and, optionally, aggregation of problem kernels for problem kernel intensity purposes;
d. enter user query words into a user interface to narrow the scope of the analysis, e.g., "coatings";
e. actuate a user interface object, such as an icon, initiating the automatic filtering of the documents using the user query words, automatic analysis of the documents meeting the user query criteria to identify problem kernels, aggregate identified problem kernels, calculate the relative monetary value of aggregated problem kernels, calculate the intensity of aggregated problem kernels, and sort the problems problem kernels using all these;
f. examine on a computer display one or more problem kernels displayed using the user-selected display parameters;
g. actuate a user interface object, such as an icon, flagging the presently displayed problem kernel or a selected problem kernel as pertinent to the search or otherwise subject to further processing in causing the system to display the next problem kernel display;
h. actuate a user interface object, such as an icon, flagging the presently displayed problem kernel or a selected problem kernel as not pertinent to the search or otherwise not subject to further processing or to simply skip to the next problem kernel display;
i. actuate a user interface object, such as an icon or clicking on the problem kernel being displayed or a selected problem kernel to cause the system to display more of the document associated with that problem kernel, such as surrounding paragraphs or the entire document, optionally using user-selected display parameters; and
j. actuate a user interface object, such as an icon, causing the system to list or export the flagged problem kernels.

Some of the exemplary embodiments herein use correlation of documents or problem kernels setting forth substantially the same unmet technical need and/or technical problem. Some exemplary systems use Topic Modeling algorithms, e.g., Latent Dirichlet Allocation, to identify other documents or problem kernels having essentially the same unmet technical need and/or technical problem as follows: analyzing the corpus of problem kernels, clustering co-occurring words in those problem kernels into topics, creating a matrix of topics containing, for each topic, the words associated with that topic and the frequency in which they are associated with that topic, and for each problem kernel, based on the topic words that occur in the problem kernel, listing the topics contained in the problem kernel by percentage of problem kernel relating to that topic. The correlated documents or problem kernels (that is, those documents or problem kernels that relate to a topic above a threshold (e.g., 20%)) can be aggregated for various aggregate analyses, as described herein. These are preferably done in real time so that, without user intervention, these aggregated calculations can be used to rank documents or problem kernels presented to the user. In some embodiments, the topics are generated across all documents or problem kernels prior to user interaction and the previously generated topics are used to group results in subsequent user queries, while in other exemplary embodiments, the topics are generated automatically and behind the scenes based on the documents or problem kernels returned by a user search query and the topics are then used to group or otherwise aggregate the only the documents or problem kernels relevant to the user's query. All of the algorithms herein and methods herein have code associated therewith that cause the one or more processors to use the algorithm to analyze the documents or data as indicated and perform the other method steps as indicated.

In some exemplary embodiments, all of the foregoing are preferably done in real-time so that without user intervention (except, e.g., for selecting which algorithms to use via a user interface) and these aggregated calculations are used to rank documents and present them to the user on a computer display.

In some exemplary embodiments, the generated topics that are used to group or otherwise aggregate the documents or problem kernels relevant to the user's query can be selected by the user as input for querying the database. The user may select one or more topics, the words associated with that topic (from the matrix of topics) will be used as user input queries and a new set of documents or problem kernels will be returned to display to the user (the results will be saved to a data storage device and/or printed in a report).

In some exemplary embodiments, a user interface is provided to analyze the assignees or authors of documents containing correlated problem kernels, e.g., using one of the above methods herein to identify problem kernels that are correlated (e.g., using similar Technology Elements, relating to the same topics identified by an LDA topic model) and actuating a user interface object to display on a computer display the assignees of documents containing correlated problem kernels. In some exemplary embodiments, analytics about the assignees are displayed, e.g., the total number of assignees, the percentage of overall documents each assignee or author is associated with, the annual revenue for each assignee or author, etc. All of the algorithms herein have processor code associated therewith that cause the one or more processors to use the algorithm to analyze the documents or data as indicated.

In some exemplary embodiments, deficiency recognition is performed in real-time, e.g., user search input is accepted and then problem kernels are recognized in real-time in documents that relate to the query search terms to generate any of the various outputs described herein (e.g., any of the computer displays, printouts, reports, saved data, etc.).

In some exemplary embodiments, a database of pre-identified problem kernels is provided, which database is searched by users in any of the various ways described herein (vis-á-vis user search input and/or identified Technology Elements associated with user input) to generate any of the various outputs described herein (e.g., any of the computer displays, printouts, reports, saved data, etc.).

In some exemplary embodiments, above, the results or output are described herein as being "displayed." In the alternative, or in addition thereto, the output can be displayed to the user, stored on a computer (either local or remote) for later use, or transferred to another computer.

Some of the steps, acts, and other processes and portions of processes are described herein as being done "automatically." In the alternative, or in addition thereto, those steps, acts, and other processes and portions of processes are done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the computers 20, 22, 23, 24, 26, 28, 29, 160, 162, 164 and/or computers 14, 16 can be modified to include logic to perform any one or more of the various functions and processes herein. As another example, the steps of all processes and methods herein can be performed in any order, unless two or more steps are expressly stated as being performed in a particular order, or certain steps inherently require a particular order. As yet another example, streams of data, e.g., live audio data from a microphone or pre-recorded audio data in an audio recording or a video recording, can be analyzed using any of the various methods described herein. Accordingly, departures may be made from such details without departing from the spirit or scope of the applicant's general inventive concept.

What is claimed is:

1. A computer implemented method of analyzing documents and identifying at least one problem kernel, the method comprising:

accessing a database of documents;

analyzing a plurality of documents in the database of documents using deficiency recognizer logic to identify at least one problem kernel, wherein a problem kernel comprises a subset of a document describing a technical problem or unmet technical need;

generating data corresponding to the identified at least one problem kernel, wherein the data comprises at least a problem intensity score based on a problem kernel magnitude; and, at least one of displaying, printing, storing, or transmitting the data corresponding to the identified at least one problem kernel.

2. The method according to claim 1, further comprising:

accepting user search input;

applying the user search input to the identified documents with at least one problem kernel;

identifying subsets of the documents that contain at least one problem kernel associated with the user search input; and at least one of displaying, printing, storing, or transmitting the identified subsets of the documents that contain at least one problem kernel associated with the user search input.

3. The method according to claim 1, wherein the problem intensity score is further based on at least one problem intensity metric including one or any two or more of: industry size, problem growth, problem severity, entity importance, commercial relevance, and industry value;

ranking the identified documents or problem kernels according to their score; and displaying the results of the ranking on at least one computer display.

4. The method according to claim 1, wherein the data corresponding to the identified at least one problem kernel comprises one or more of the following: companies associated with the identified subsets of documents, industries associated with the identified subsets of documents, and geography associated with the identified subsets of documents.

5. The method according to claim 1, further comprising:

summarizing the identified problem kernels according to text summarization logic.

6. A computer implemented method of analyzing documents and identifying at least one problem element, comprising:

accessing a database of documents;
analyzing a plurality of documents in the database of documents using deficiency recognizer logic to identify at least one problem kernel, wherein a problem kernel comprises a subset of a document describing a technical problem or unmet technical need;
identifying one or more problem elements associated with the identified at least one problem kernel;
generating data corresponding to the identified at least one problem kernel, wherein the data comprises at least a problem intensity score based on a problem kernel magnitude; and,
at least one of displaying, printing, storing, or transmitting the data corresponding the identified at least one problem kernel and at least one associated problem element.

7. The method according to claim 6,
wherein the data corresponding to the identified at least one problem kernel comprises at least one problem element score for associated problem elements, wherein scoring the identified problem elements is based on at least one problem element metric including one or any two or more of: problem intensity, industry size, problem growth, problem severity, entity importance, commercial relevance, high change score, market maturity score, and industry value;
ranking the problem elements according to their score; and
at least one of (a) displaying data corresponding to the problem element ranking, (b) printing a report showing data corresponding to the problem element ranking, (c) storing on a data storage device data corresponding to the problem element ranking, and (d) transmitting to a computer data corresponding to the problem element ranking.

8. The method according to claim 6,
wherein the data corresponding to the identified at least one problem kernel further comprises companies associated with the identified problem elements, industries associated with the identified problem elements, and geography associated with the identified problem elements.

9. The method according to claim 6, further comprising:
providing a user interface allowing a user to filter the search results to further reduce the number of documents, problem kernels, or problem elements displayed or incorporated into metrics by allowing the user to select at least one of: a keyword, a problem element, companies, industries, geography; display;
applying a selected filter to the search results; and,
displaying the filtered search results on at least one computer display.

10. The method according to claim 6, further comprising:
accepting user search input;
applying the user search input to the identified problem elements;
identifying subsets of the documents that contain problem elements associated with the user search input.

11. The method according to claim 6, further comprising:
identifying a plurality of problem elements that are substantially identical; and
linking the plurality of problem elements that are substantially identical.

12. The method according to claim 11, further comprising:
creating problem ontologies using the identified plurality of problem elements that are substantially identical;
displaying the problem ontologies on at least one computer display.

13. The method according to claim 11, further comprising:
identifying Technology Elements within the identified problem elements; and
linking the identified Technology Elements that are substantially identical.

14. The method according to claim 13, further comprising:
associating a plurality of the identified Technology Elements to create an ontology of identified Technology Elements; and
displaying the ontology of identified Technology Elements on at least one computer display.

15. The method according to claim 13, further comprising:
accepting user search input;
identifying Technology Elements within the user search input;
applying the identified Technology Elements within the user search input and any remaining user search input to one of identified Technology Elements, identified problem elements, and both identified Technology Elements and identified problem elements;
identifying subsets of the documents that contain identified Technology Elements or identified problem elements associated with the user search input; and
at least one of (a) displaying data corresponding to the identified subsets of documents that contain identified Technology Elements or identified problem elements associated with the user search input, (b) printing a report showing data corresponding to the identified subsets of documents that contain identified Technology Elements or identified problem elements associated with the user search input, (c) storing on a data storage device data corresponding to the identified subsets of documents that contain identified Technology Elements or identified problem elements associated with the user search input, and (d) transmitting to a computer data corresponding to the identified subsets of documents that contain identified Technology Elements or identified problem elements associated with the user search input.

16. A computer implemented method of analyzing documents and identifying at least one problem kernel, comprising:
accessing a database of documents;
analyzing a plurality of documents in the database of documents using deficiency recognizer logic to identify at least one problem kernel, wherein a problem kernel comprises a subset of a document describing a technical problem or unmet technical need;
identifying Technology Elements associated with within the identified at least one problem kernel;
generating data corresponding to the identified at least one problem kernel, wherein the data comprises at least a problem intensity score based on a problem kernel magnitude;
linking the identified Technology Elements associated with the at least one problem kernel that are substantially identical;
at least one of displaying, printing, storing, or transmitting the data corresponding the identified at least one problem kernel and associated Technology Elements.

17. The method according to claim 16, further comprising:
- associating a plurality of the identified Technology Elements to create an ontology of identified Technology Elements;
- accepting user search input;
- applying the user search input to one of identified Technology Elements, identified problem kernels, and both identified Technology Elements and identified problem kernels;
- identifying subsets of the documents that contain identified Technology Elements, Technology Elements that are subsets of the identified Technology Elements, or identified problem kernels associated with the user search input; and
- at least one of (a) displaying data corresponding to the identified subsets of documents that contain identified Technology Elements or identified problem kernels associated with the user search input, (b) printing a report showing data corresponding to the identified subsets of documents that contain identified Technology Elements or identified problem kernels associated with the user search input, (c) storing on a data storage device data corresponding to the identified subsets of documents that contain identified Technology Elements or identified problem kernels associated with the user search input, and (d) transmitting to a computer data corresponding to the identified subsets of documents that contain identified Technology Elements or identified problem kernels associated with the user search input.

18. The method according to claim 16, further comprising:
- accepting user search input;
- identifying Technology Elements within the user search input;
- applying the identified Technology Elements within the user search input and any remaining user search input to one of identified Technology Elements, identified problem kernels, and both identified Technology Elements and identified problem kernels;
- identifying subsets of the documents that contain identified Technology Elements or identified problem kernels associated with the user search input; and
- at least one of (a) displaying data corresponding to the identified subsets of documents that contain identified Technology Elements or identified problem kernels associated with the user search input, (b) printing a report showing data corresponding to the identified subsets of documents that contain identified Technology Elements or identified problem kernels associated with the user search input, (c) storing on a data storage device data corresponding to the identified subsets of documents that contain identified Technology Elements or identified problem kernels associated with the user search input, and (d) transmitting to a computer data corresponding to the identified subsets of documents that contain identified Technology Elements or identified problem kernels associated with the user search input.

19. The method according to claim 16, further comprising:
- identifying a subset of the identified Technology Elements having negative tone;
- at least one of (a) displaying data corresponding to the identified Technology Elements having negative tone, (b) printing a report showing data corresponding to the identified Technology Elements having negative tone, (c) storing on a data storage device data corresponding to the identified Technology Elements having negative tone, and (d) transmitting to a computer data corresponding to the identified Technology Elements having negative tone.

20. The method according to claim 19, further comprising:
- associating a plurality of the identified Technology Elements to create an ontology of identified Technology Elements; and
- displaying the ontology of identified Technology Elements on at least one computer display.

21. The according to claim 16, further comprising:
- accepting user search input;
- identifying Technology Elements within the user search input;
- applying the identified Technology Elements within the user search input and any remaining user search input to one of identified Technology Elements, identified problem elements, and both identified Technology Elements and identified problem elements;
- identifying subsets of the documents that contain identified Technology Elements or identified problem kernels associated with the user search input;
- identifying for the identified subsets of documents one or more of the following: companies associated with the identified subsets of documents, industries associated with the identified subsets of documents, and geography associated with the identified subsets of documents; and
- at least one of (a) displaying data corresponding to the identified companies associated with the identified subsets of documents, identified industries associated with the identified subsets of documents, and identified geography associated with the identified subsets of documents, (b) printing a report showing data corresponding to the identified companies associated with the identified subsets of documents, identified industries associated with the identified subsets of documents, and identified geography associated with the identified subsets of documents, (c) storing on a data storage device data corresponding the identified companies associated with the identified subsets of documents, identified industries associated with the identified subsets of documents, and identified geography associated with the identified subsets of documents, and (d) transmitting to a computer data corresponding to the identified companies associated with the identified subsets of documents, identified industries associated with the identified subsets of documents, and identified geography associated with the identified subsets of documents.

22. The method according to claim 16, further comprising:
- providing a user interface allowing a user to filter the search results to further reduce the number of documents, problem kernels, or Technology Elements displayed or incorporated into metrics by allowing the user to select at least one of a keyword, Technology Element, companies, industries, geography;
- applying a selected filter to the search results; and,
- displaying the filtered search results on at least one computer display.

23. The method according to claim 16, further comprising:
- scoring the identified Technology Elements based on a variety of possible metrics including relevance to search input, high change score, market maturity score, industry size or value, or a combination of such metrics;
- ranking the Technology Elements according to their score; and
- at least one of (a) displaying data corresponding to the results of the Technology Element ranking, (b) printing a report showing data corresponding to the results of the Technology Element ranking, (c) storing on a data corresponding to the results of the Technology Element ranking, and (d) transmitting to a computer data corresponding to the results of the Technology Element ranking.

* * * * *